United States Patent
Michel et al.

(10) Patent No.: US 7,362,379 B2
(45) Date of Patent: Apr. 22, 2008

(54) IMAGE PROCESSING APPARATUS AND METHOD, RECORDING MEDIUM, AND PROGRAM

(75) Inventors: Xavier Michel, Chiba (JP); Kazuhiko Nishibori, Kanagawa (JP); Koji Aoyama, Saitama (JP); Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 11/090,738

(22) Filed: Mar. 25, 2005

(65) Prior Publication Data

US 2005/0212974 A1  Sep. 29, 2005

(30) Foreign Application Priority Data

Mar. 29, 2004  (JP)  ............................ P2004-094790

(51) Int. Cl.
*H04N 7/01* (2006.01)
*H04N 11/20* (2006.01)

(52) U.S. Cl. .................. 348/452; 348/451; 348/699; 348/402.1; 348/416.1; 375/240.27

(58) Field of Classification Search ................ 348/452, 348/451, 699, 620, 700, 425.2, 416.1, 417.1, 348/418.1, 409.1, 402.1; 375/240.16, 240.24, 375/240.27; 382/236

See application file for complete search history.

(56) References Cited

U.S. PATENT DOCUMENTS

| | | | |
|---|---|---|---|
| 5,025,495 A | 6/1991 | Avis | |
| 5,400,076 A | 3/1995 | Iwamura | |
| 6,327,391 B1 | 12/2001 | Ohnishi et al. | |
| 6,473,460 B1 | 10/2002 | Topper | |

(Continued)

FOREIGN PATENT DOCUMENTS

EP       0 395 268       10/1990

(Continued)

OTHER PUBLICATIONS

Reillo C: "Motion-compensation-based algorithm for deinterlacing and up-conversion" Proceedings of the SPIE, vol. 2182, Feb. 7, 1994, Feb. 9, 1994 pp. 150-161, XP002330471US.

*Primary Examiner*—Tuan Ho
*Assistant Examiner*—Jean W. Désir
(74) *Attorney, Agent, or Firm*—Finnegan, Henderson, Farabow, Garrett & Dunner, L.L.P.

(57) ABSTRACT

Inter-field-interpolation spatial transition is calculated based on the sum of absolute values of differences between pixel values of an inter-field-interpolated pixel and adjacent pixels on the same field. Inter-field-interpolation temporal transition is calculated based on the sum of absolute values of differences between pixel values of the inter-field-interpolated pixel and pixels at corresponding positions on previous delayed field and present field. Intra-field-interpolation temporal transition is calculated based on the sum of absolute values of differences between pixel values of an intra-field-interpolated pixel and the pixels at the corresponding positions on the previous delayed field and the present field. The amounts of error in the interpolated pixels are calculated based on information of the inter-field-interpolation spatial transition, inter-field-interpolation temporal transition, and intra-field-interpolation temporal transition, and a pixel is generated by switching between inter-field interpolation and intra-field interpolation accordingly.

9 Claims, 52 Drawing Sheets

U.S. PATENT DOCUMENTS 7,116,372 B2 * 10/2006 Kondo et al. ................ 348/448
7,142,247 B2 * 11/2006 Jung .......................... 348/452

FOREIGN PATENT DOCUMENTS

| EP | 0 645 933 | 3/1995 |
| EP | 0 732 849 | 9/1996 |
| EP | 1 143 712 | 10/2001 |
| JP | 05-219529 | 8/1993 |

* cited by examiner

FIG. 20

| EV \ EH | −  | 0 | + |
|---------|----|---|---|
| −       | 1  | 2 | 3 |
| 0       | 8  | 0 | 4 |
| +       | 7  | 6 | 5 |

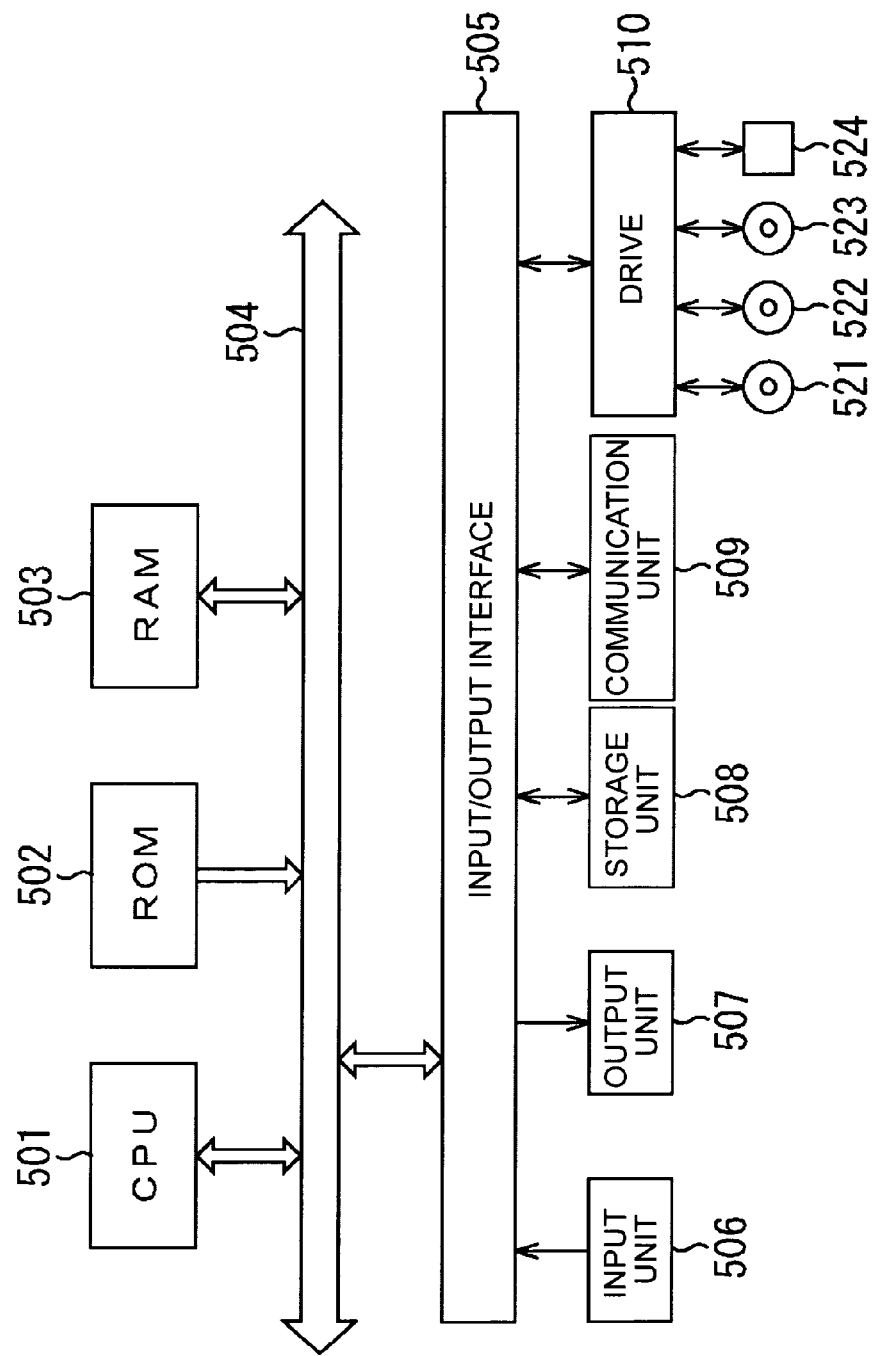

IMAGE PROCESSING APPARATUS AND METHOD, RECORDING MEDIUM, AND PROGRAM

BACKGROUND OF THE INVENTION

1. Field of the Invention

The present invention relates to image processing apparatuses and methods, recording media, and programs. More specifically, the present invention relates to an image processing apparatus and method, a recording medium, and a program for accurately calculating motion vectors on a pixel-by-pixel basis and for switching the method of generating pixels in accordance with the amounts of error that occurs in pixels generated based on the motion vectors calculated.

2. Description of the Related Art

Techniques for generating new pixels based on pixels of an existing image to convert the resolution or field frequency of the image are becoming common.

In one known method for generating pixels of a moving picture, motion vectors are used. A motion vector indicates a direction and a distance of movement of a pixel having temporally the same pixel value in a moving picture or the like.

FIG. 1 shows the construction of an image processing apparatus 1 according to the related art, which converts the number of scanning lines using motion vectors.

The image processing apparatus 1 includes image memories 11-1 and 11-2, a block-motion-vector detector 12, and an image synthesizer 13. The image processing apparatus 1 receives input of interlaced image signals that are obtained via a video source, supplied from, for example, a television (TV) tuner or a digital versatile disc (DVD) player (not shown), and that are digitized by an analog to digital (AD) converter, converts the number of scanning lines of the input data, and outputs the resulting data.

Each of the image memories 11-1 and 11-2 stores input field data corresponding to one field, and outputs the field data with a delay corresponding to one field. Thus, the image memory 11-1 supplies delayed field data that is delayed by one field relative to a present field to the image synthesizer 13. The image memory 11-2 supplies previous-delayed-field data that is further delayed by one field. Thus, the image memory 11-2 supplies field data that is delayed by two fields in total (i.e., previous-delayed-field data) to the block-motion-vector detector 12 and the image synthesizer 13.

The block-motion-vector detector 12 obtains present-field data and previous-delayed-field data supplied from the image memory 11-2, detecting motion vectors based on correlation between these pieces of field data of two fields. More specifically, for example, the block-motion-vector detector 12 detects motion vectors on a block-by-block basis by block matching. In block matching, for example, a reference block consisting of a predetermined number of pixels in a present field is set, and a search block in a previous delayed field having the same size as the reference block is set. Then, pixels in the search block are sequentially extracted while moving the search block sequentially in the previous delayed field, and the sum of the absolute values of differences between pixels at corresponding positions in the reference block and the search block is calculated with the search block at each position. Then, a motion vector is calculated based on positional relationship of the search block and reference block that minimizes the sum of the absolute values of differences.

The image synthesizer 13 obtains present-field data, delayed-field data and previous-delayed-field data supplied from the image memories 11-1 and 11-2, respectively, and block motion vectors supplied from the block-motion-vector detector 12, synthesizes an image based on these pieces of information, converts the number of scanning lines, and outputs the resulting data to a subsequent stage.

Next, the operation of the image processing apparatus shown in FIG. 1 will be described.

First, the image memory 11-1 stores the first field data. At a next timing, the image memory 11-1 supplies the field data stored therein to the image memory 11-2 and the image synthesizer 13 as delayed-field data. At a further next timing, the image memory 11-1 supplies delayed-field data stored therein to the image memory 11-2 and the image synthesizer 13. Furthermore, the image memory 11-2 supplies the previous-delayed-field data stored therein to the block-motion-vector detector 12 and the image synthesizer 13.

At this time, the block-motion-vector detector 12 calculates motion vectors on a block-by-block basis by block matching using the present-field data and the previous-delayed-field data, and supplies the motion vectors to the image synthesizer 13.

The image synthesizer 13 generates pixels by inter-field interpolation using pixels on the present field data and the previous-delayed-field data, the pixels corresponding to points where motion vectors passing through pixels on scanning lines that must be newly generated for a progressive image of the delayed field supplied thereto cross the present field and the previous delayed field, thereby converting an interlaced delayed-field image into a progressive image and outputting the progressive image.

Furthermore, for example, according to techniques disclosed in Japanese Unexamined Patent Application Publication No. 5-219529, motion vectors are detected by detecting movement of color-difference signals as well as movement of luminance signals so that motion vectors can be detected accurately.

However, according to the method of detecting motion vectors by block matching, the accuracy of detecting motion vectors decreases when the block size is large, but the accuracy of detecting motion vectors does not improve even when the block size is chosen to be smaller than a certain value. Furthermore, in block matching, the amount of computation becomes huge when the block size is small, resulting in excessive computational cost.

Furthermore, in order to meet incompatible requirements of improving the accuracy of detecting motion vectors and reducing computational cost to achieve real-time processing, motion vectors are calculated on a basis of individual blocks having a predetermined size. Thus, when pixels having two or more motion vectors exist in a search block in which a motion vector is to be detected, in an image consisting of pixels generated by interpolation, distortion could occur on a block-by-block basis, mismatch could occur between pixels generated by interpolation and peripheral pixels, or the spatial resolution could be apparently degraded since the same motion vectors are used on a block-by-block basis.

SUMMARY OF THE INVENTION

The present invention has been made in view of the situation described above, and it is an object of the present invention to accurately calculate motion vectors on a pixel-by-pixel basis, particularly in motion-compensating image processing based on motion vectors, and to obtain the degree of occurrence of error in pixels generated by interpolation to switch the method of generating pixels by interpolation, so that computational cost is reduced and so that image quality is improved by suppressing image distortion caused by block-based interpolation or mismatch between pixels generated by interpolation and peripheral pixels.

According to an aspect of the present invention, an image processing apparatus is provided. The image processing apparatus includes a block-motion-vector detector for detecting, by block matching, respective block motion vectors of a block including a subject pixel and a plurality of blocks adjacent to the block including the subject pixel; a difference calculator for calculating difference between pixel values of a pixel on a first field and a pixel on a second field, these pixels being used to generate the subject pixel, based on each of the block motion vectors detected by the block-motion-vector detector; a pixel-motion-vector selector for selecting, as a pixel motion vector of the subject pixel, one of the block motion vectors that minimizes the difference calculated by the difference calculator; an inter-field-interpolation pixel generator for generating a pixel value of the subject pixel by inter-field interpolation using the pixel on the first field and the pixel on the second field, based on the pixel motion vector selected by the pixel-motion-vector selector; an intra-field-interpolation pixel generator for generating a pixel value of the subject pixel by intra-field interpolation using pixels vertically or horizontally adjacent to the subject pixel; an amount-of-error calculator for calculating an amount of error that occurs, based on the pixel value of the subject pixel generated by the inter-field-interpolation pixel generator, pixel values of the pixels vertically or horizontally adjacent to the subject pixel, the pixel value of the subject pixel generated by the intra-field-interpolation pixel generator, and pixel values of pixels on fields temporally preceding and succeeding a field where the subject pixel exists, the pixels being located at positions corresponding to the subject pixel; and a pixel-value determiner for determining a pixel value of the subject pixel based on the amount of error calculated by the amount-of-error calculator, using the pixel value generated by the intra-field-interpolation pixel generator and the pixel value generated by the inter-field-interpolation pixel generator.

The image processing apparatus may further include an auxiliary-information generator for generating respective pieces of auxiliary information for the pixel on the first field and the pixel on the second field, wherein the pixel-motion-vector selector selects, as a pixel motion vector of the subject pixel, one of the block motion vectors with which the piece of auxiliary information for the pixel on the first field and the piece of auxiliary information for the pixel on the second field coincide with each other and with which the difference calculated by the difference calculator is minimized.

In the image processing apparatus, the respective pieces of auxiliary information may be codes representing directions of edges for the respective pixels.

The image processing apparatus may further include a pixel-motion-vector calculator for calculating a pixel motion vector of the subject pixel by smoothing the block motion vectors of the plurality of blocks in accordance with distances between the subject pixel and respective reference positions of the plurality of blocks when the piece of auxiliary information for the pixel on the first field and the piece of auxiliary information for the pixel on the second field do not coincide with each other.

The image processing apparatus may further include an inter-field-interpolated-pixel spatial-transition-information calculator for calculating, as inter-field-interpolated-pixel spatial-transition information, a sum of absolute values of differences between the pixel value of the subject pixel generated by the inter-field-interpolation pixel generator and the pixel values of the pixels vertically or horizontally adjacent to the subject pixel; an inter-field-interpolated-pixel temporal-transition-information calculator for calculating, as inter-field-interpolated-pixel temporal-transition information, a sum of absolute values of differences between the pixel value of the subject pixel generated by the inter-field-interpolation pixel generator and the pixel values of the pixels on the fields temporally preceding and succeeding the field where the subject pixel exists, the pixels being located at the positions corresponding to the subject pixel; and an intra-field-interpolated-pixel temporal-transition-information calculator for calculating, as intra-field-interpolated-pixel temporal-transition information, a sum of absolute values of differences between the pixel value of the subject pixel generated by the intra-field-interpolation pixel generator and the pixel values of the pixels on the fields temporally preceding and succeeding the field where the subject pixel exists, the pixels being located at the positions corresponding to the subject pixel. In that case, the amount-of-error calculator calculates an amount of error based on the inter-field-interpolated-pixel spatial-transition information, the inter-field-interpolated-pixel temporal-transition information, and the intra-field-interpolated-pixel temporal-transition information.

According to another aspect of the present invention, an image processing method is provided. The image processing method includes a block-motion-vector detecting step of detecting, by block matching, respective block motion vectors of a block including a subject pixel and a plurality of blocks adjacent to the block including the subject pixel; a difference calculating step of calculating difference between pixel values of a pixel on a first field and a pixel on a second field, these pixels being used to generate the subject pixel, based on each of the block motion vectors detected in the block-motion-vector detecting step; a pixel-motion-vector selecting step of selecting, as a pixel motion vector of the subject pixel, one of the block motion vectors that minimizes the difference calculated in the difference calculating step; an inter-field-interpolation pixel generating step of generating a pixel value of the subject pixel by inter-field interpolation using the pixel on the first field and the pixel on the second field, based on the pixel motion vector selected in the pixel-motion-vector selecting step; an intra-field-interpolation pixel generating step of generating a pixel value of the subject pixel by intra-field interpolation using pixels vertically or horizontally adjacent to the subject pixel; an amount-of-error calculating step of calculating an amount of error that occurs, based on the pixel value of the subject pixel generated in the inter-field-interpolation pixel generating step, pixel values of the pixels vertically or horizontally adjacent to the subject pixel, the pixel value of the subject pixel generated in the intra-field-interpolation pixel generating step, and pixel values of pixels on fields temporally preceding and succeeding a field where the subject pixel exists, the pixels being located at positions corresponding to the subject pixel; and a pixel-value determining step of determining a pixel value of the subject pixel based on the amount of error calculated in the amount-of-error calculating step, using the pixel value generated in the intra-field-interpolation pixel generating step and the pixel value generated in the inter-field-interpolation pixel generating step.

According to another aspect of the present invention, a recording medium having recorded thereon a computer-readable program is provided. The program comprises a block-motion-vector detection controlling step of controlling detection, by block matching, of respective block motion vectors of a block including a subject pixel and a plurality of blocks adjacent to the block including the subject pixel; a difference calculation controlling step of controlling calculation of difference between pixel values of a pixel on a first field and a pixel on a second field, these pixels being used to generate the subject pixel, based on each of the block motion vectors detected in the block-motion-vector detection controlling step; a pixel-motion-vector selection controlling step of controlling selection, as a pixel motion vector of the subject pixel, one of the block motion vectors that minimizes the difference calculated in the difference calculation controlling step; an inter-field-interpolation pixel generation controlling step of controlling generation of a pixel value of the subject pixel by inter-field interpolation using the pixel on the first field and the pixel on the second field, based on the pixel motion vector selected in the pixel-motion-vector selection controlling step; an intra-field-interpolation pixel generation controlling step of controlling generation of a pixel value of the subject pixel by intra-field interpolation using pixels vertically or horizontally adjacent to the subject pixel; an amount-of-error calculation controlling step of controlling calculation of an amount of error that occurs, based on the pixel value of the subject pixel generated in the inter-field-interpolation pixel generation controlling step, pixel values of the pixels vertically or horizontally adjacent to the subject pixel, the pixel value of the subject pixel generated in the intra-field-interpolation pixel generation controlling step, and pixel values of pixels on fields temporally preceding and succeeding a field where the subject pixel exists, the pixels being located at positions corresponding to the subject pixel; and a pixel-value determination controlling step of controlling determination of a pixel value of the subject pixel based on the amount of error calculated in the amount-of-error calculation controlling step, using the pixel value generated in the intra-field-interpolation pixel generation controlling step and the pixel value generated in the inter-field-interpolation pixel generation controlling step.

According to another aspect of the present invention, a program that allows a computer to execute processing is provided. The processing includes a block-motion-vector detection controlling step of controlling detection, by block matching, of respective block motion vectors of a block including a subject pixel and a plurality of blocks adjacent to the block including the subject pixel; a difference calculation controlling step of controlling calculation of difference between pixel values of a pixel on a first field and a pixel on a second field, these pixels being used to generate the subject pixel, based on each of the block motion vectors detected in the block-motion-vector detection controlling step; a pixel-motion-vector selection controlling step of controlling selection, as a pixel motion vector of the subject pixel, one of the block motion vectors that minimizes the difference calculated in the difference calculation controlling step; an inter-field-interpolation pixel generation controlling step of controlling generation of a pixel value of the subject pixel by inter-field interpolation using the pixel on the first field and the pixel on the second field, based on the pixel motion vector selected in the pixel-motion-vector selection controlling step; an intra-field-interpolation pixel generation controlling step of controlling generation of a pixel value of the subject pixel by intra-field interpolation using pixels vertically or horizontally adjacent to the subject pixel; an amount-of-error calculation controlling step of controlling calculation of an amount of error that occurs, based on the pixel value of the subject pixel generated in the inter-field-interpolation pixel generation controlling step, pixel values of the pixels vertically or horizontally adjacent to the subject pixel, the pixel value of the subject pixel generated in the intra-field-interpolation pixel generation controlling step, and pixel values of pixels on fields temporally preceding and succeeding a field where the subject pixel exists, the pixels being located at positions corresponding to the subject pixel; and a pixel-value determination controlling step of controlling determination of a pixel value of the subject pixel based on the amount of error calculated in the amount-of-error calculation controlling step, using the pixel value generated in the intra-field-interpolation pixel generation controlling step and the pixel value generated in the inter-field-interpolation pixel generation controlling step.

According to the image processing apparatus and method, recording medium, and program of the present invention, respective block motion vectors of a block including a subject pixel and a plurality of blocks adjacent to the block including the subject pixel are detected by block matching. Difference between pixel values of a pixel on a first field and a pixel on a second field, these pixels being used to generate the subject pixel, is calculated based on each of the block motion vectors detected. As a pixel motion vector of the subject pixel, one of the block motion vectors that minimizes the difference calculated is selected. A pixel value of the subject pixel is generated by inter-field interpolation using the pixel on the first field and the pixel on the second field, based on the pixel motion vector selected. A pixel value of the subject pixel is generated by intra-field interpolation using pixels vertically or horizontally adjacent to the subject pixel. An amount of error that occurs is calculated based on the pixel value of the subject pixel generated by inter-field interpolation, pixel values of the vertically or horizontally adjacent pixels, the pixel value of the subject pixel generated by intra-field interpolation, and pixel values of pixels on fields temporally preceding and succeeding a field where the subject pixel exists, the pixels being located at positions corresponding to the subject pixel. A pixel value of the subject pixel is determined based on the amount of error calculated, using the pixel value generated by intra-field interpolation and the pixel value generated by inter-field interpolation.

An image processing apparatus according to the present invention may be an independent apparatus or a block for executing image processing.

According to the present invention, computational cost is reduced, and image distortion that occurs due to block-based interpolation or mismatch between pixels generated by interpolation and peripheral pixels can be suppressed.

BRIEF DESCRIPTION OF THE DRAWINGS

FIG. 20 is a diagram for explaining codes representing edge directions, which serve as attached information;

FIG. 52 is a diagram for explaining a recording medium.

DESCRIPTION OF THE PREFERRED EMBODIMENTS

Figure 1:
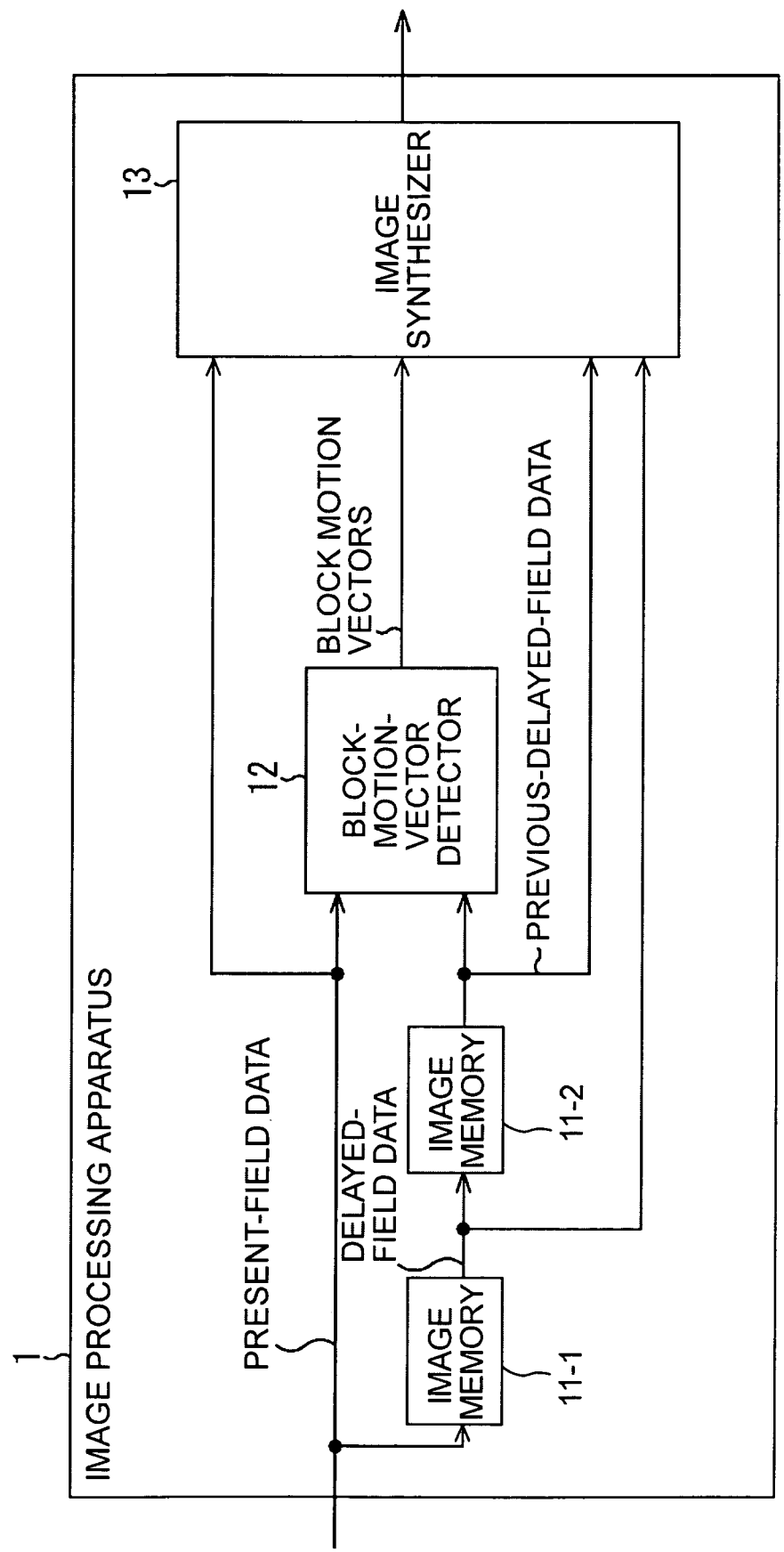
FIG. 1 is a block diagram showing the construction of an image processing apparatus according to the related art.

An image processing apparatus according to the present invention includes a block-motion-vector detector (e.g., a block-motion-vector detector 12 shown in FIG. 2) for detecting, by block matching, respective block motion vectors of a block including a subject pixel and a plurality of blocks adjacent to the block including the subject pixel; a difference calculator (e.g., a motion compensator 36 shown in FIG. 3) for calculating difference between pixel values of a pixel on a first field and a pixel on a second field, these pixels being used to generate the subject pixel, based on each of the block motion vectors detected by the block-motion-vector detector; a pixel-motion-vector selector (e.g., a condition checker 37 shown in FIG. 3) for selecting, as a pixel motion vector of the subject pixel, one of the block motion vectors that minimizes the difference calculated by the difference calculator; an inter-field-interpolation pixel generator (e.g., a temporal interpolator 112 shown in FIG. 33) for generating a pixel value of the subject pixel by inter-field interpolation using the pixel on the first field and the pixel on the second field, based on the pixel motion vector selected by the pixel-motion-vector selector; an intra-field-interpolation pixel generator (e.g., a spatial interpolator 111 shown in FIG. 33) for generating a pixel value of the subject pixel by intra-field interpolation using pixels vertically or horizontally adjacent to the subject pixel; an amount-of-error calculator (e.g., an error processor shown in FIG. 33) for calculating an amount of error that occurs, based on the pixel value of the subject pixel generated by the inter-field-interpolation pixel generator, pixel values of the pixels vertically or horizontally adjacent to the subject pixel, the pixel value of the subject pixel generated by the intra-field-interpolation pixel generator, and pixel values of pixels on fields temporally preceding and succeeding a field where the subject pixel exists, the pixels being located at positions corresponding to the subject pixel; and a pixel-value determiner (e.g., a pixel generator 114 shown in FIG. 33) for determining a pixel value of the subject pixel based on the amount of error calculated by the amount-of-error calculator, using the pixel value generated by the intra-field-interpolation pixel generator and the pixel value generated by the inter-field-interpolation pixel generator.

Figure 16:
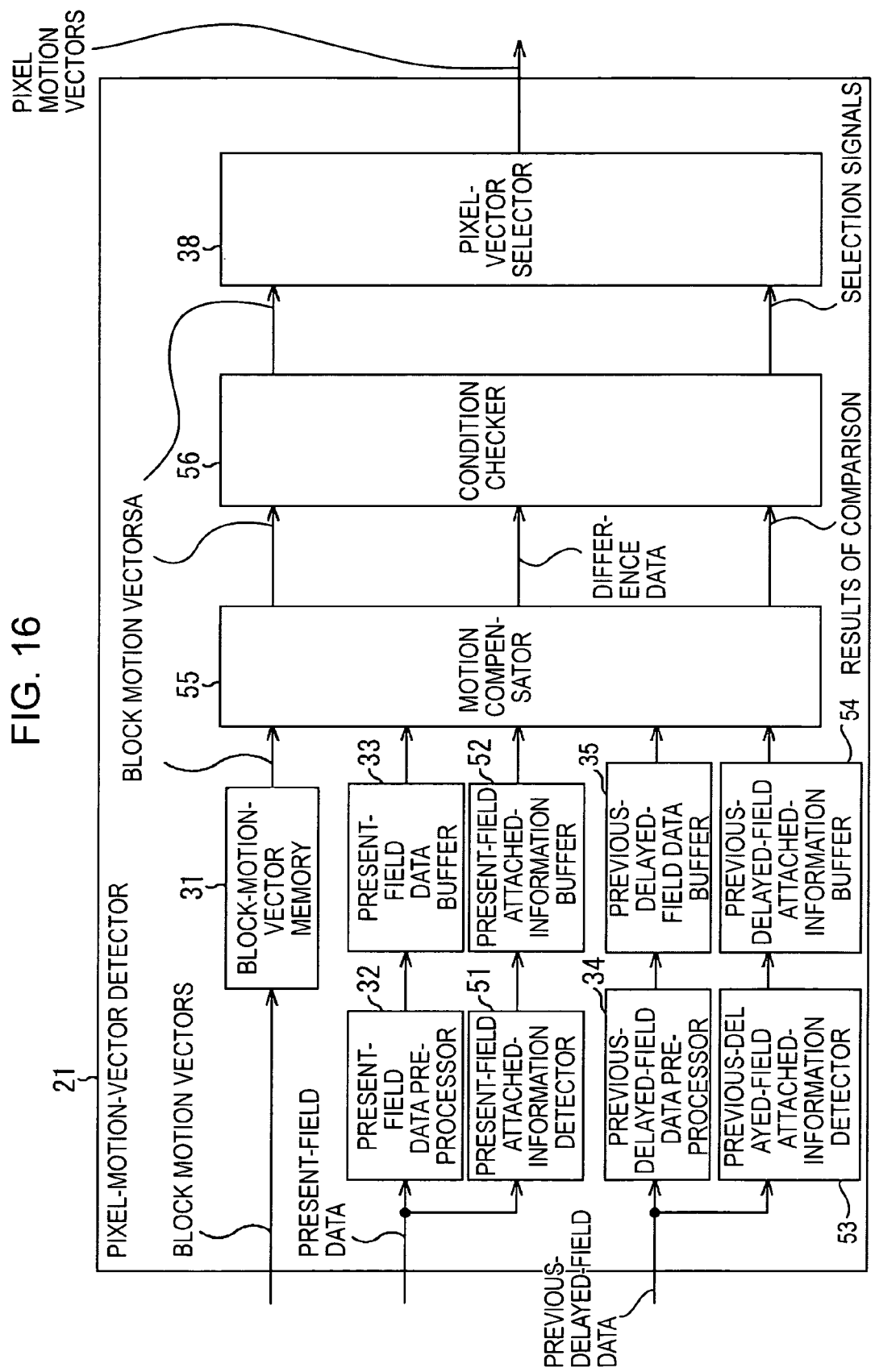
FIG. 16 is a diagram showing another construction of the pixel-motion-vector detector.

The image processing apparatus may further include an auxiliary-information generator (e.g., a present-field data attached-information detector 51 shown in FIG. 16) for generating respective pieces of auxiliary information for the pixel on the first field and the pixel on the second field, wherein the pixel-motion-vector selector selects, as a pixel motion vector of the subject pixel, one of the block motion vectors with which the piece of auxiliary information for the pixel on the first field and the piece of auxiliary information for the pixel on the second field coincide with each other and with which the difference calculated by the difference calculator is minimized.

The image processing apparatus may further include a pixel-motion-vector calculator (e.g., a motion-vector smoother 82 shown in FIG. 27) for calculating a pixel motion vector of the subject pixel by smoothing the block motion vectors of the plurality of blocks in accordance with distances between the subject pixel and respective reference positions of the plurality of blocks when the piece of auxiliary information for the pixel on the first field and the piece of auxiliary information for the pixel on the second field do not coincide with each other.

Figure 34:
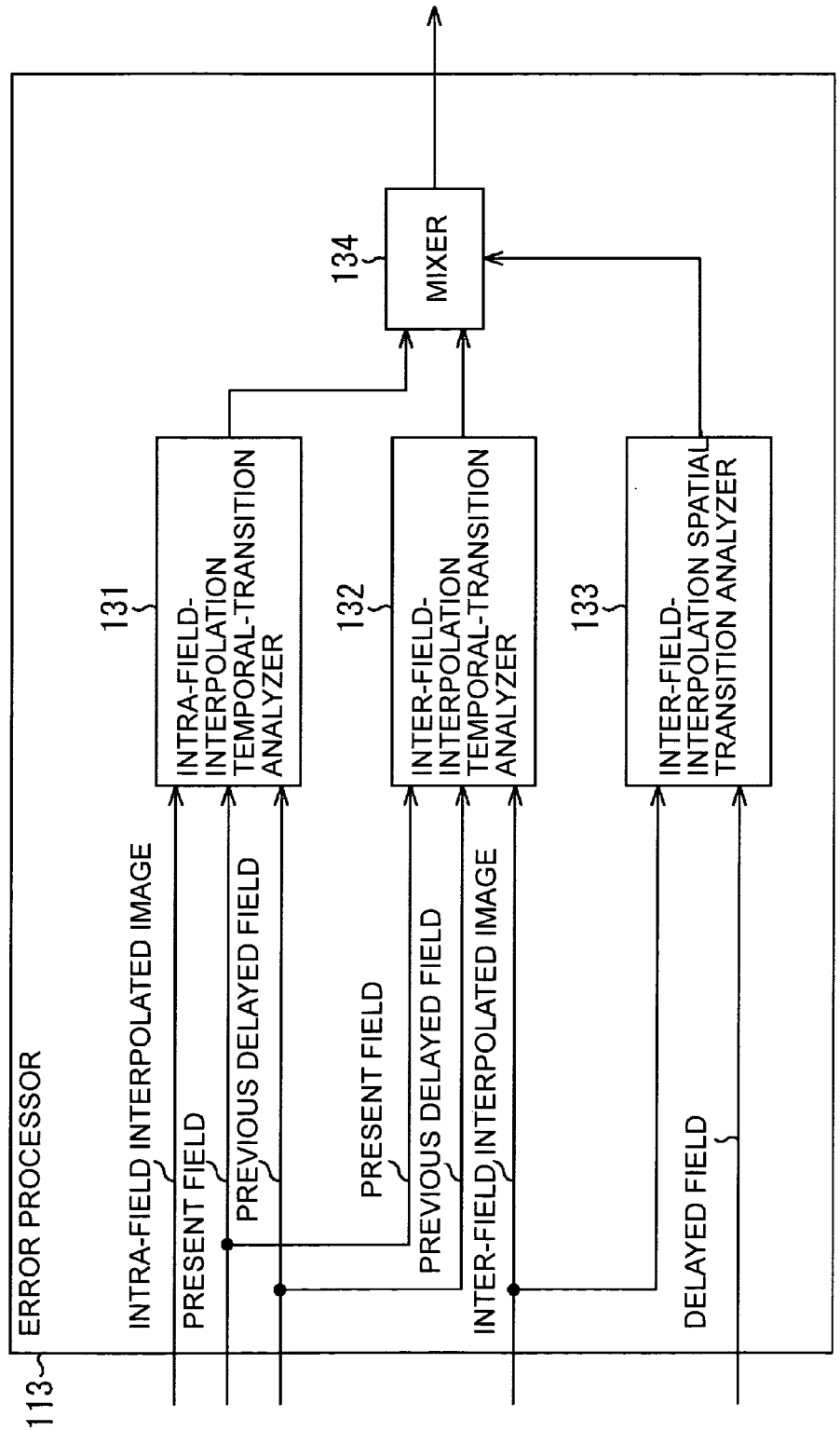
FIG. 34 is a block diagram showing the construction of an error processor shown in FIG. 33.

The image processing apparatus may further include an inter-field-interpolated-pixel spatial-transition-information calculator (e.g., an inter-field-interpolation spatial-transition analyzer 133 shown in FIG. 34) for calculating, as inter-field-interpolated-pixel spatial-transition information, a sum of absolute values of differences between the pixel value of the subject pixel generated by the inter-field-interpolation pixel generator and the pixel values of the pixels vertically or horizontally adjacent to the subject pixel; an inter-field-interpolated-pixel temporal-transition-information calculator (e.g., an inter-field-interpolation temporal-transition analyzer 132 shown in FIG. 34) for calculating, as inter-field-interpolated-pixel temporal-transition information, a sum of absolute values of differences between the pixel value of the subject pixel generated by the inter-field-interpolation pixel generator and the pixel values of the pixels on the fields temporally preceding and succeeding the field where the subject pixel exists, the pixels being located at the positions corresponding to the subject pixel; and an intra-field-interpolated-pixel temporal-transition-information calculator (e.g., an intra-field-interpolation temporal-transition analyzer 131 shown in FIG. 34) for calculating, as intra-field-interpolated-pixel temporal-transition information, a sum of absolute values of differences between the pixel value of the subject pixel generated by the intra-field-interpolation pixel generator and the pixel values of the pixels on the fields temporally preceding and succeeding the field where the subject pixel exists, the pixels being located at the positions corresponding to the subject pixel. In that case, the amount-of-error calculator calculates an amount of error based on the inter-field-interpolated-pixel spatial-transition information, the inter-field-interpolated-pixel temporal-transition information, and the intra-field-interpolated-pixel temporal-transition information.

An image processing method according to the present invention includes a block-motion-vector detecting step (e.g., step S1 in a flowchart shown in FIG. 4) of detecting, by block matching, respective block motion vectors of a block including a subject pixel and a plurality of blocks adjacent to the block including the subject pixel; a difference calculating step (e.g., steps S13 to S17 in a flowchart shown in FIG. 5) of calculating difference between pixel values of a pixel on a first field and a pixel on a second field, these pixels being used to generate the subject pixel, based on each of the block motion vectors detected in the block-motion-vector detecting step; a pixel-motion-vector selecting step (e.g., step S4 in the flowchart shown in FIG. 4) of selecting, as a pixel motion vector of the subject pixel, one of the block motion vectors that minimizes the difference calculated in the difference calculating step; an inter-field-interpolation pixel generating step (e.g., step S322 in a flowchart shown in FIG. 36) of generating a pixel value of the subject pixel by inter-field interpolation using the pixel on the first field and the pixel on the second field, based on the pixel motion vector selected in the pixel-motion-vector selecting step; an intra-field-interpolation pixel generating step (e.g., step S321 in the flowchart shown in FIG. 36) of generating a pixel value of the subject pixel by intra-field interpolation using pixels vertically or horizontally adjacent to the subject pixel; an amount-of-error calculating step (e.g., step S323 in the flowchart shown in FIG. 36) of calculating an amount of error that occurs, based on the pixel value of the subject pixel generated in the inter-field-interpolation pixel generating step, pixel values of the pixels vertically or horizontally adjacent to the subject pixel, the pixel value of the subject pixel generated in the intra-field-interpolation pixel generating step, and pixel values of pixels on fields temporally preceding and succeeding a field where the subject pixel exists, the pixels being located at positions corresponding to the subject pixel; and a pixel-value determining step (e.g., steps S325 and S327 in the flowchart shown in FIG. 36) of determining a pixel value of the subject pixel based on the amount of error calculated in the amount-of-error calculating step, using the pixel value generated in the intra-field-interpolation pixel generating step and the pixel value generated in the inter-field-interpolation pixel generating step.

Corresponding relationships for the recording medium and the program are the same as the corresponding relationship for the image processing method, so that descriptions thereof will be omitted.

Figure 2:
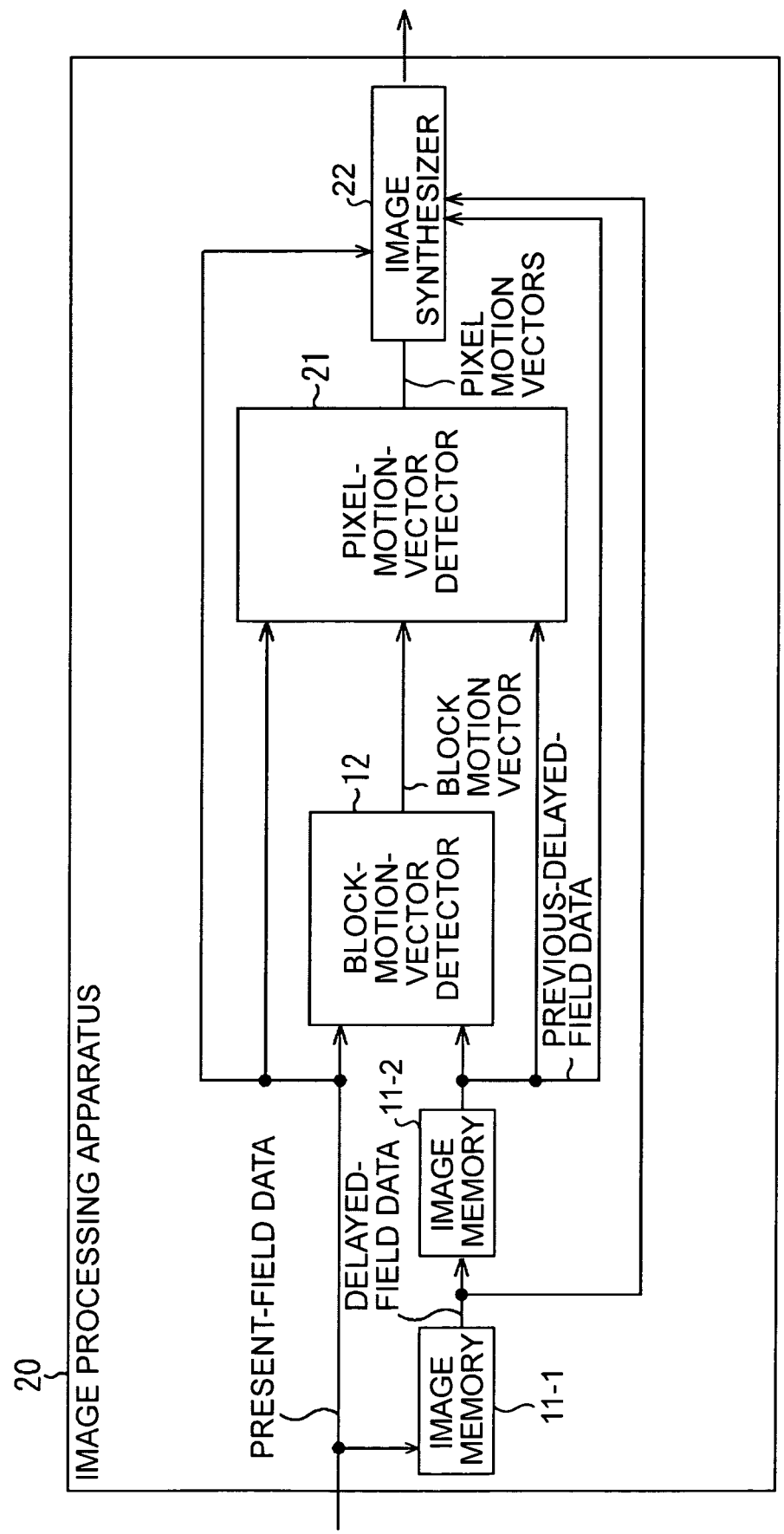
FIG. 2 is a block diagram showing the construction of an image processing apparatus according to an embodiment of the present invention.

FIG. 2 is a diagram showing the construction of an image processing apparatus 20 according to an embodiment of the present invention. In the construction of the image processing apparatus 20 shown in FIG. 2, parts corresponding to those in the construction of the image processing apparatus 1 shown in FIG. 1 are designated by the same numerals, and descriptions thereof will be omitted as appropriate.

A pixel-motion-vector detector 21 generates motion vectors for respective pixels, based on present-field data as input data, previous-delayed-field data supplied from the image memory 11-2, and block motion vectors supplied from the block-motion-vector detector 12, and supplies the pixel motion vectors to an image synthesizer 22.

The image synthesizer 22, based on present-field data as input data, delayed-field data supplied from the image memory 11-1, previous-delayed-field data supplied from the image memory 11-2, and pixel motion vectors supplied from the pixel-motion-vector detector 21, generates a new field by combining the present field and the previous delayed field, outputting the new field to a device at a subsequent stage.

The image synthesizer 22 outputs data including the new field generated. For example, in a process of converting the number of scanning lines, the image synthesizer 22 converts an input interlaced image into a progressive image and outputs the progressive image, or converts resolution or field frequency. The device at a subsequent stage refers to, for example, another image processing apparatus, an image display apparatus such as a television receiver, or an image recording apparatus such as a video tape recorder (VTR).

Next, the construction of the pixel-motion-vector detector 21 will be described in detail with reference to FIG. 3.

A block-motion-vector memory 31 stores block motion vectors supplied from the block-motion-vector detector 12, and supplies a plurality of motion vectors including a motion vector of a subject block and motion vectors of adjacent blocks simultaneously to a motion compensator 36. A subject pixel refers to a pixel to be processed, and a subject block refers to a block consisting of a plurality of pixels including a subject pixel to be processed.

A present-field data pre-processor 32 is implemented, for example, by a low-pass filter (LPF). The present-field data pre-processor 32 executes pre-processing for removing the effect of noise on present-field data input thereto, and supplies the pre-processed present-field data with the noise removed therefrom to a present-field data buffer 33. The present-field data pre-processor 32 is not limited to an LPF, and may be implemented, for example, by a median filter. Alternatively, the present-field data pre-processor 32 may be omitted so that pre-processing is not executed.

The present-field data buffer 33 stores pre-processed present-field data supplied from the present-field data pre-processor 32. The present-field data buffer 33 is implemented, for example, by a memory, having a capacity sufficient to hold an amount of present-field data needed for processing. The present-field data buffer 33, in response to a request from the motion compensator 36, randomly accesses the memory and supplies data read to the motion compensator 36.

A previous-delayed-field data pre-processor 34 is implemented, for example, by an LPF, similarly to the present-field data pre-processor 32. The previous-delayed-field data pre-processor 34 executes pre-processing for removing the effect of noise on previous-delayed-field data supplied from the image memory 11-2, and supplies the result to a previous-delayed-field data buffer 35 as pre-processed previous-delayed-field data.

The previous-delayed-field data buffer 35 is implemented, for example, by a memory, similarly to the present-field data buffer 33. The previous-delayed-field data buffer 35 stores pre-processed previous-delayed-field data supplied from the previous-delayed-field data pre-processor 34. The previous-delayed-field data buffer 35, in response to a request from the motion compensator 36, randomly accesses the memory and supplies previous-delayed-field data read to the motion compensator 36.

The motion compensator 36 executes a motion compensating process. More specifically, the motion compensator 36 reads block motion vectors of a subject block and a plurality of adjacent blocks from the block-motion-vector memory 31. Then, for each of the motion vectors, the motion compensator 36 calculates the difference between the pixel values of pixels on the previous delayed field and the present field temporally preceding and succeeding the field including the subject pixel, the pixels corresponding to points on the previous delayed field and the present field where the motion vector starts and ends when the motion vector passes the subject pixel, and outputs the difference as difference data for the motion vector to a condition checker 37. At this time, the motion compensator 36 also supplies the motion vectors associated with the difference data to the condition checker 37.

The condition checker 37 executes a condition checking process. More specifically, the condition checker 37 selects difference data that is smallest among pieces of difference data calculated for the respective motion vectors, and supplies a selection signal identifying a motion vector associated with the smallest difference data, together with the motion vector associated with the difference data, to the pixel-vector selector 38.

The pixel-vector selector 38 executes a selecting process. More specifically, the pixel-vector selector 38, based on a selection signal supplied from the condition checker 37, selects a block motion vector that minimizes difference data as a pixel motion vector of the subject pixel, outputting the block motion vector to the image synthesizer 22.

Next, image processing executed by the image processing apparatus 20 shown in FIG. 2 will be described with reference to a flowchart shown in FIG. 4.

In step S1, the block-motion-vector detector 12, based on present-field data input thereto and previous-delayed-field data supplied from the image memory 11-2, obtains block motion vectors for respective blocks by block matching, and outputs the block motion vectors to the pixel-motion-vector detector 21. The method for detecting block motion vectors is the same as the method based on block matching according to the related art, so that description thereof will be omitted.

In step S2, the motion compensator 36 of the pixel-motion-vector detector 21 executes a motion compensating process, outputting block motion vectors used for processing and associated pieces of difference data to the condition checker 37.

Figure 5:
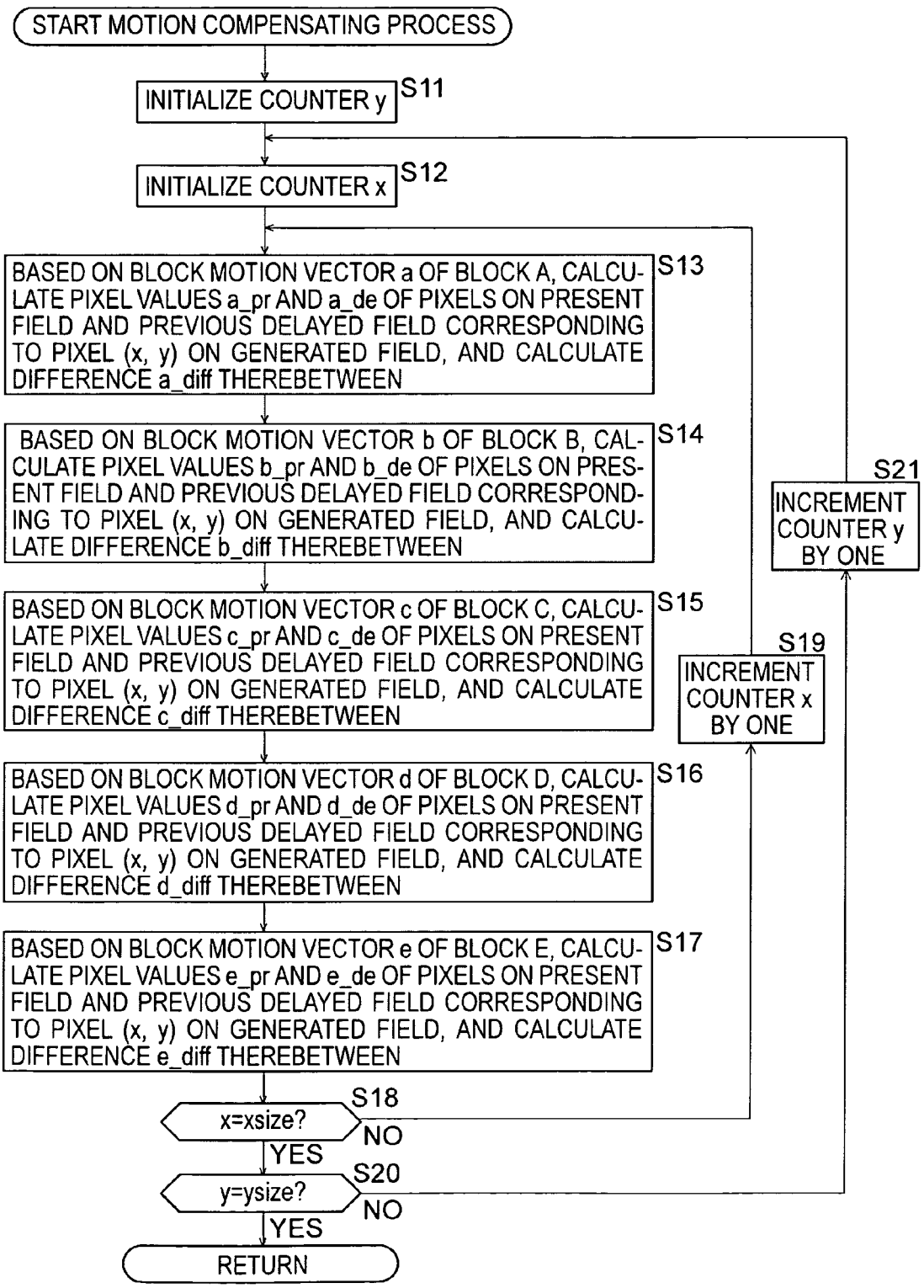
FIG. 5 is a flowchart of a motion-compensating process in step S2 shown in FIG. 4.

Now, the motion compensating process executed by the motion compensator 36 will be described with reference to a flowchart shown in FIG. 5.

In step S11, the motion compensator 36 initializes a counter y (not shown) for counting the number of iterations of processing to zero. In step S12, the motion compensator 36 initializes a counter x (not shown) for counting the number of iterations of processing to zero.

In step S13, the motion compensator 36 reads present-field data pre-processed by the present-field data pre-processor 32 from the present-field data buffer 33, and previous-delayed-field data pre-processed by the previous-delayed-field data pre-processor 34 from the previous-delayed-field data buffer 35. Furthermore, the motion compensator 36, based on a block motion vector a of a block A among blocks A to E including a subject block to which a subject pixel (x, y) to be generated in FIG. 5 belongs and including a plurality of blocks adjacent to the subject block, obtains pixel values of a pixel a_pr on the present field and a pixel a_de on the previous delayed field, used to generate the subject pixel (x, y), and further calculates a difference a_diff between the pixel values, outputting the difference a_diff in association with the block motion vector a used for calculation to the condition checker 37. In the following description, a block including a subject pixel will be referred to as a subject block, blocks adjacent to a subject block will be referred to as adjacent blocks, and a field including a subject pixel will be referred to as a generated field.

Figure 6:
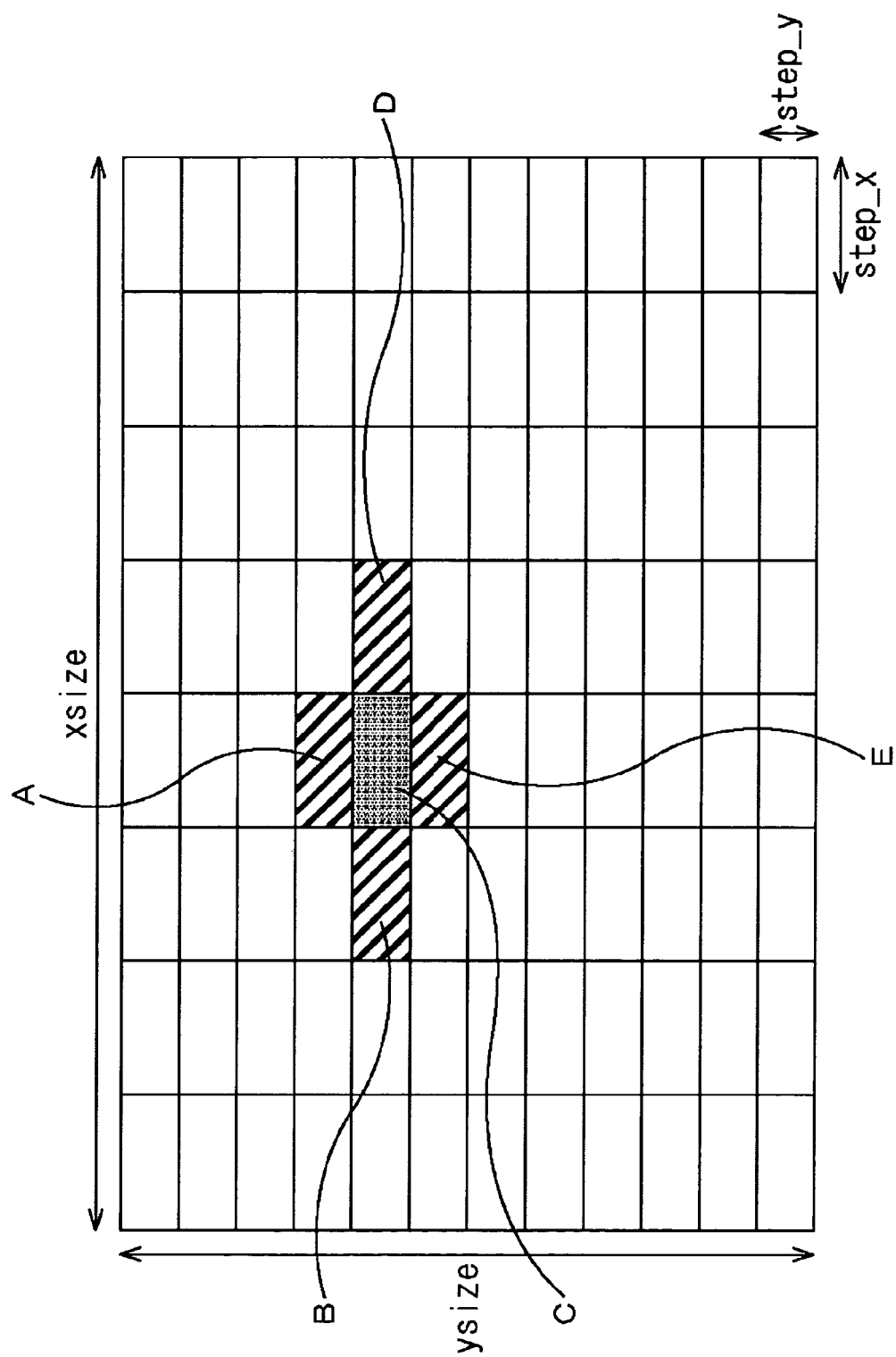
FIG. 6 is a diagram for explaining a subject block and adjacent blocks.
Figure 7:
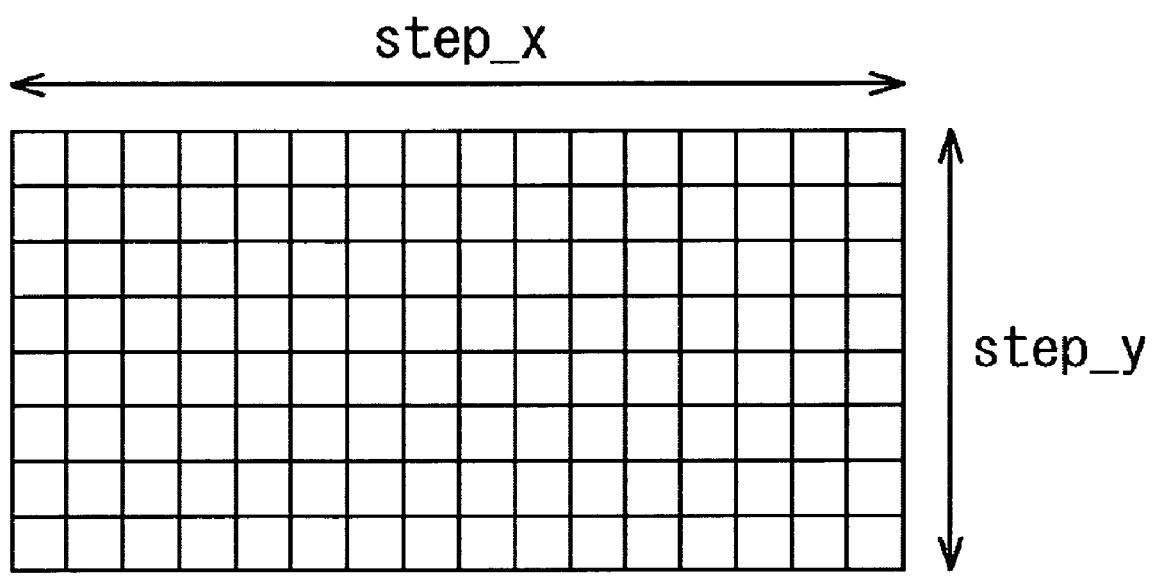
FIG. 7 is a diagram for explaining a block size.
Figure 8:
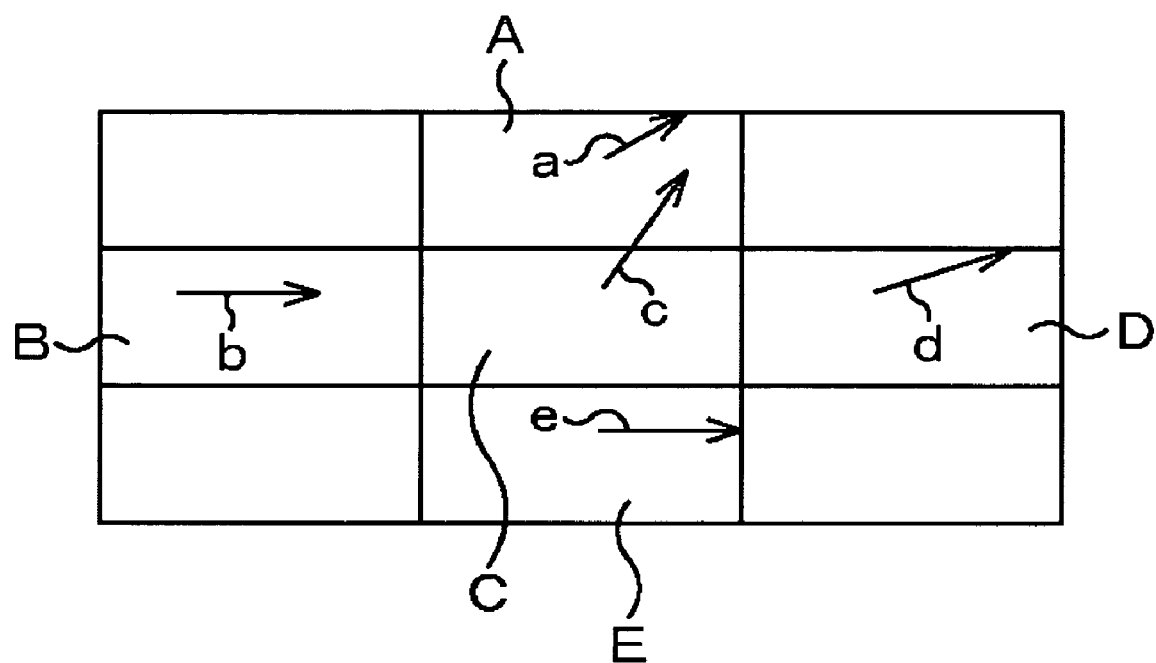
FIG. 8 is a diagram for explaining block motion vectors of a subject block and adjacent blocks.

More specifically, for example, when the size of a generated field including a subject pixel is xsize×ysize and the subject block is a block C (indicated by black) as shown in FIG. 6, the adjacent blocks are four blocks A, B, D, and E (blocks hatched in FIG. 6). The sizes of the respective blocks are all the same, for example, step_x×step_y as shown in FIG. 7. For example, the block motion vectors of the subject block and the adjacent blocks, i.e., the blocks A to E, are motion vectors a to e, respectively, as shown in FIG. 8.

Figure 9:
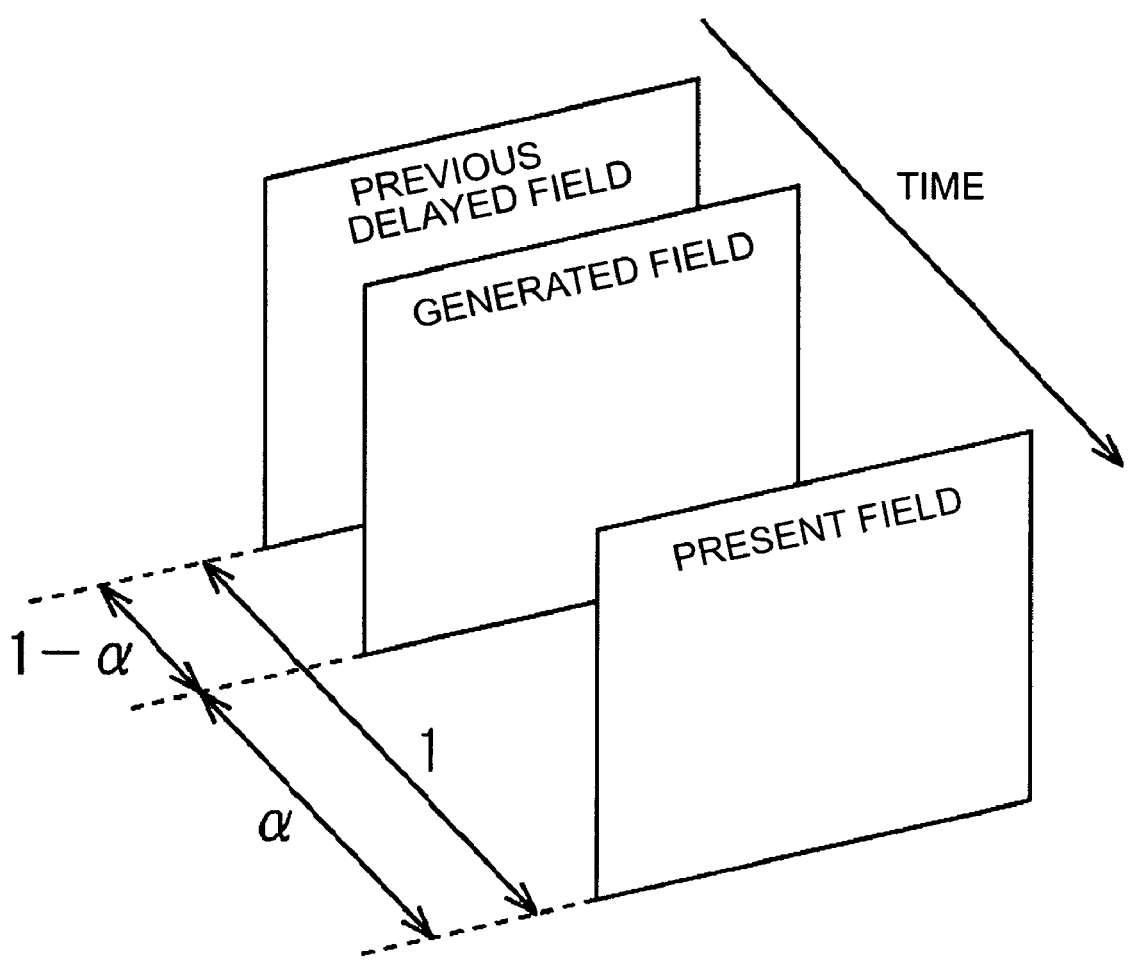
FIG. 9 is a diagram for explaining a generated field including generated pixels.

The generated field exists temporally between the previous delayed field and the present field. Assuming that the distance between the previous delayed field and the present field is 1, when the distance to the present field is $\alpha$, the distance to the previous delayed field is $(1-\alpha)$, as shown in FIG. 9.

Figure 10:
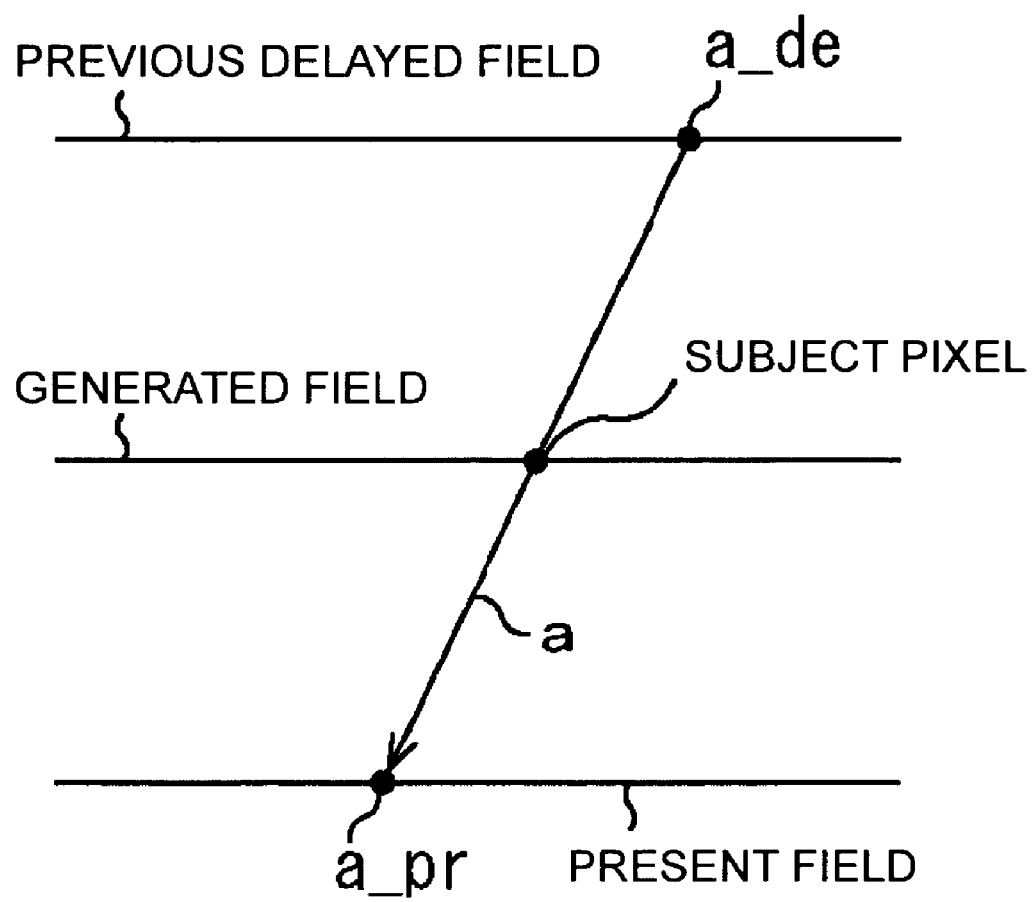
FIG. 10 is a diagram for explaining pixels for calculating difference.

When, for example, the block motion vector a of the block A is (Xa, Ya), the pixel a_pr on the present field and the pixel a_de on the previous delayed field, used to generate the subject pixel (x, y), are a pixel at coordinates $(x+\alpha \times Xa, y+\alpha \times Ya)$ on the present field and a pixel at coordinates $(x-(1-\alpha) \times Xa, y-(1-\alpha) \times Ya)$ on the previous delayed field, respectively, as shown in FIG. 10.

Thus, when the block motion vector a is (Xa, Ya), the motion compensator 36 calculates a difference a_diff between the pixel values of the pixel at coordinates $(x+\alpha \times Xa, y+\alpha \times Ya)$ on the present field and the pixel at coordinates $(x-(1-\alpha) \times Xa, y-(1-\alpha) \times Ya)$ on the previous delayed field, and supplies the difference a_diff in association with the block motion vector a used for calculation to the condition checker 37.

That is, the motion compensator 36 calculates, as a difference a_diff, the difference between pixel values of pixels at a point on the previous delayed field where the block motion vector a shown in FIG. 10 starts and a pixel at a point on the present field where the block motion vector a shown in FIG. 10 ends when the block motion vector a passes through the subject pixel (x, y) on the generated field.

In step S14, similarly to step S13, the motion compensator 36, based on the block motion vector b of the block B, calculates pixel values of a pixel b_pr on the present field and a pixel b_de on the previous delayed field, used to generate the subject pixel (x, y), further calculates a difference b_diff between the pixel values, and outputs the difference b_diff in association with the motion vector b used for calculation to the condition checker 37.

In step S15, similarly to step S13, the motion compensator 36, based on the block motion vector c of the block C, calculates pixel values of a pixel c_pr on the present field and a pixel c_de on the previous delayed field, used to generate the subject pixel (x, y), further calculates a difference c_diff between the pixel values, and outputs the difference c_diff in association with the motion vector c used for calculation to the condition checker 37.

In step S16, similarly to step S13, the motion compensator 36, based on the block motion vector d of the block D, calculates pixel values of a pixel d_pr on the present field and a pixel d_de on the previous delayed field, used to generate the subject pixel (x, y), further calculates a difference d_diff between the pixel values, and outputs the difference d_diff in association with the motion vector d used for calculation to the condition checker 37.

In step S17, similarly to step S13, the motion compensator 36, based on the block motion vector e of the block E, calculates pixel values of a pixel e_pr on the present field and a pixel e_de on the previous delayed field, used to generate the subject pixel (x, y), further calculates a difference e_diff between the pixel values, and outputs the difference e_diff in association with the motion vector e used for calculation to the condition checker 37.

In step S18, the motion compensator 36 determines whether the value of the counter x is xsize corresponding to the size of the field with respect to the horizontal direction. When it is determined that the value of the counter x is not xsize, in step S19, the motion compensator 36 increments the value of the counter x by one. The process then returns to step S13.

When it is determined in step S18 that the value of the counter x is not xsize, in step S20, the motion compensator 36 determines whether the value of the counter y is ysize corresponding to the size of the field with respect to the vertical direction. When it is determined that the value of the counter y is not ysize, in step S21, the motion compensator 36 increments the value of the counter y by one. The process then returns to step S12, and subsequent steps are repeated.

When it is determined in step S20 that the value of the counter y is ysize, the process is exited.

That is, steps S13 to S17 are repeated on each of the pixels on the generated field to calculate differences a_diff to e_diff between pixel values at the start points on the previous delayed field and the end points on the present field of the block motion vectors of the block the generated field belongs to and the adjacent blocks, and the differences a_diff to e_diff are supplied to the condition checker 37 in association with the block motion vectors used for calculation. The process is repeated until it is determined in steps S18 to S21 that steps the process has been executed on all the pixels on the generated field.

Figure 4:
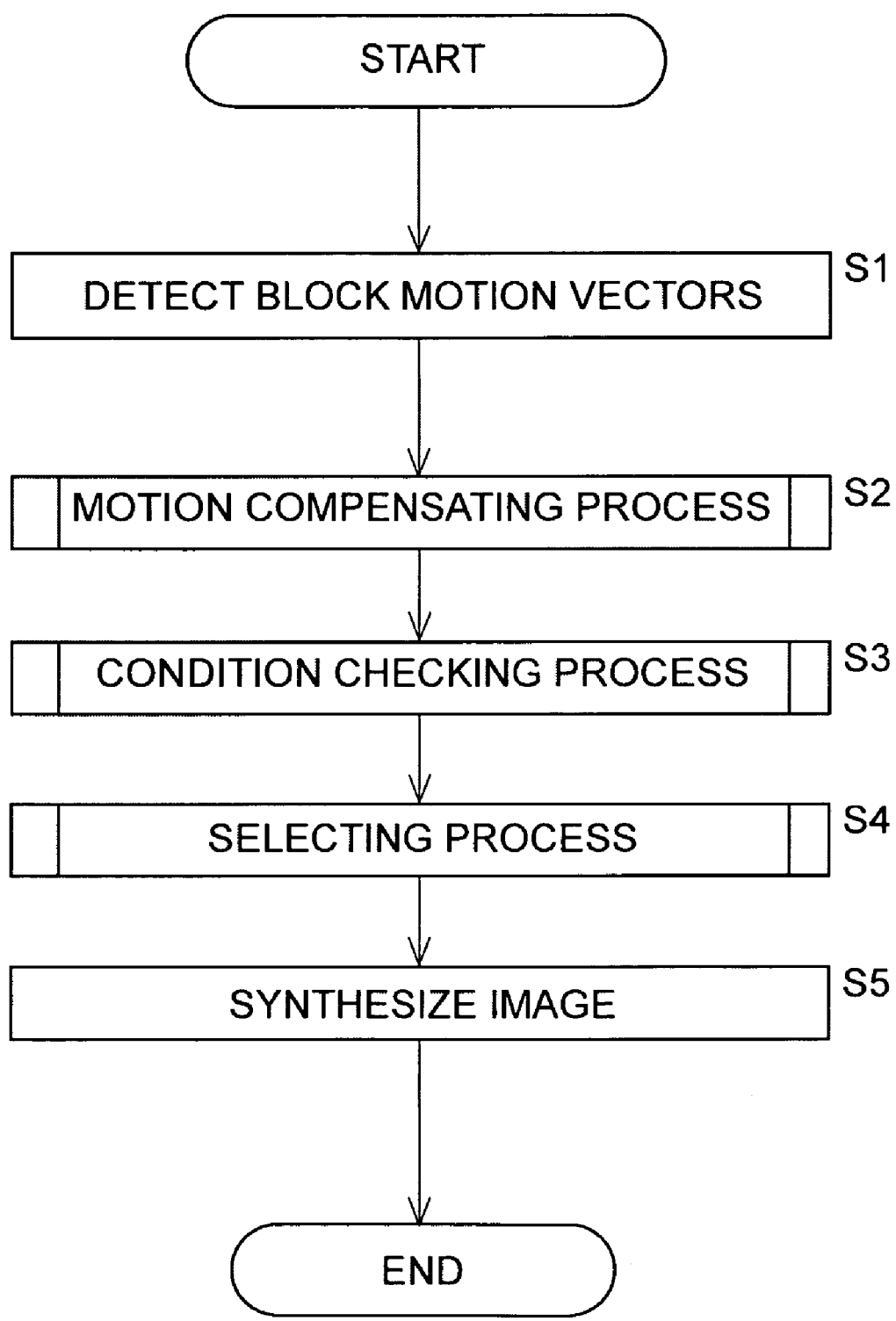
FIG. 4 is a flowchart of image processing executed by the image processing apparatus shown in FIG. 1.

Now, the description returns to the flowchart shown in FIG. 4.

After the motion compensating process is executed in step S4, in step S5, the condition checker 37 executes a condition checking process, supplying a signal for selecting one of the block motion vectors a to e that serve as candidates of pixel motion vector to the pixel-vector selector 38 for each of the pixels.

Figure 11:
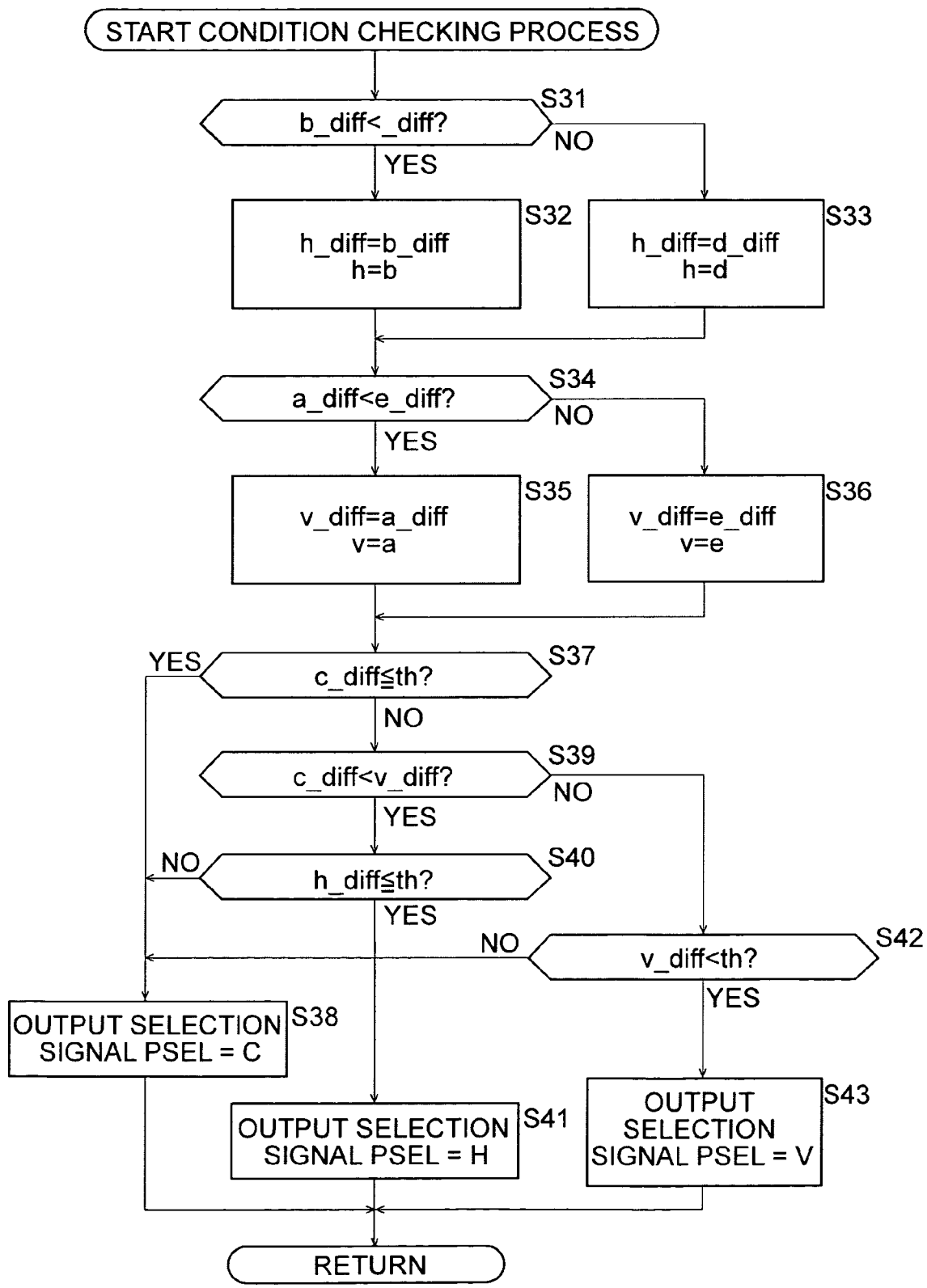
FIG. 11 is a flowchart of a condition checking process in step S3 shown in FIG. 4.

Now, the condition checking process executed by the condition checker 37 will be described with reference to a flowchart shown in FIG. 11.

In step S31, the condition checker 37 compares the differences b_diff and d_diff supplied from the motion compensator 36 to determine whether the difference b_diff is less than the difference d_diff. That is, the condition checker 37 compares the magnitudes of the differences b_diff and d_diff of blocks horizontally adjacent to the subject block.

When it is determined in step S31 that the difference b_diff is less than the difference d_diff, in step S32, the condition checker 37 sets the difference b_diff as a horizontal difference h_diff (i.e., h_diff=b_diff), and sets the motion vector b as a motion vector h representative of the horizontally adjacent blocks (i.e., h=b).

On the other hand, when it is determined in step S31 that the difference b_diff is not less than the difference d_diff, in step S33, the condition checker 37 sets the difference d_diff as the horizontal difference h_diff (i.e., h_diff=d_diff), and sets the motion vector d as the motion vector h representative of the horizontally adjacent blocks (i.e., h=d).

In step S34, the condition checker 37 compares the differences a_diff and e_diff supplied from the motion compensator 36 to determine whether the difference a_diff is less than the difference e_diff. That is, the condition checker 37 compares the magnitudes of the differences a_diff and e_diff of blocks vertically adjacent to the subject block.

When it is determined in step S34 that the difference a_diff is less than the difference e_diff, in step S35, the condition checker 37 sets the difference a_diff as a vertical difference v_diff (i.e., v_diff=a_diff), and sets the motion vector a as a motion vector v representative of the vertically adjacent blocks (i.e., v=a).

On the other hand, when it is determined in step S34 that the difference a_diff is not less than the difference e_diff, in step S36, the condition checker 37 sets the difference e_diff as the vertical difference v_diff (i.e., v_diff=e_diff), and sets the motion vector e as the motion vector v representative of the vertically adjacent blocks (i.e., v=e).

In step S37, the condition checker 37 determines whether the difference c_diff is less than a predetermined threshold th. When it is determined that the difference c_diff is less than the predetermined threshold th, in step S38, the condition checker 37 supplies the block motion vector c, together with a selection signal PSEL having a value C indicating that the difference c_diff has been selected, to the pixel-vector selector 38.

On the other hand, when it is determined in step S37 that the difference c_diff is not less than the threshold th, in step S39, the condition checker 37 determines whether the difference h_diff is less than the difference v_diff. When it is determined that the difference h_diff is less than the difference v_diff, the process proceeds to step S40.

In step S40, the condition checker 37 determines whether the difference h_diff is less than the predetermined threshold th. When it is determined that the difference h_diff is less than the predetermined threshold th, in step S41, the condition checker 37 supplies the block motion vector h, together with a selection signal PSEL having a value H indicating that the difference h_diff has been selected, to the pixel-vector selector 38. On the other hand, when it is determined in step S40 that the difference h_diff is not less than the predetermined threshold th, the process proceeds to step S38.

When it is determined in step S39 that the difference h_diff is not less than the difference v_diff, in step S42, the condition checker 37 determines whether the difference v_diff is less than the predetermined threshold th. When it is determined that the difference v_diff is less than the predetermined threshold th, in step S43, the condition checker 37 supplies the block motion vector v, together with a selection signal PSEL having a value V indicating that the difference v_diff has been selected, to the pixel-vector selector 38. On the other hand, when it is determined in step S42 that the difference v_diff is not less than the predetermined threshold th, the process proceeds to step S38.

That is, by steps S31 to S33, the smaller one of the differences between the subject block and the blocks horizontally adjacent to the subject block is chosen as a horizontal difference, and by steps S34 to S36, the smaller one of the differences between the subject block and the blocks vertically adjacent to the subject block is chosen as a vertical difference.

When it is determined in step S37 that the difference associated with the subject block is less than the predetermined threshold th, in step S38, a selection signal having a value C, indicating that the difference c_diff has been selected, is supplied to the pixel-vector selector 38. On the other hand, when it is determined in step S37 that the difference associated with the subject block is not less than the predetermined threshold th, in step S39, the smaller one of the horizontal difference h_diff and the vertical difference v_diff is selected. When it is determined in steps S40 and S42 that the horizontal and vertical differences h_diff and v_diff are less than the predetermined threshold th, in steps S41 and S43, selection signals PSEL having values H and V, indicating that the differences h_diff and v_diff have been selected, respectively, are supplied to the pixel-vector selector 38. On the other hand, when it is determined in steps S40 and S42 that the differences h_diff and v_diff are not less than the predetermined threshold th, in step S38, a selection signal having a value C, indicating that the difference c_diff has been selected, is supplied to the pixel-vector selector 38.

Accordingly, of the differences a_diff to e_diff, when the difference c_diff is less than the predetermined threshold th, a selection signal PSEL=C is supplied to the pixel-vector selector 38. When the difference c_diff is not less than the predetermined threshold th, a selection signal PSEL=H or V, indicating a difference that is smallest among the differences a_diff, b_diff, d_diff, and e_diff and that is less than the predetermined threshold th is supplied to the pixel-vector selector 38. When none of the differences is less than the predetermined threshold th, a selection signal PSEL=C is supplied to the pixel-vector selector 38.

Figure 12:
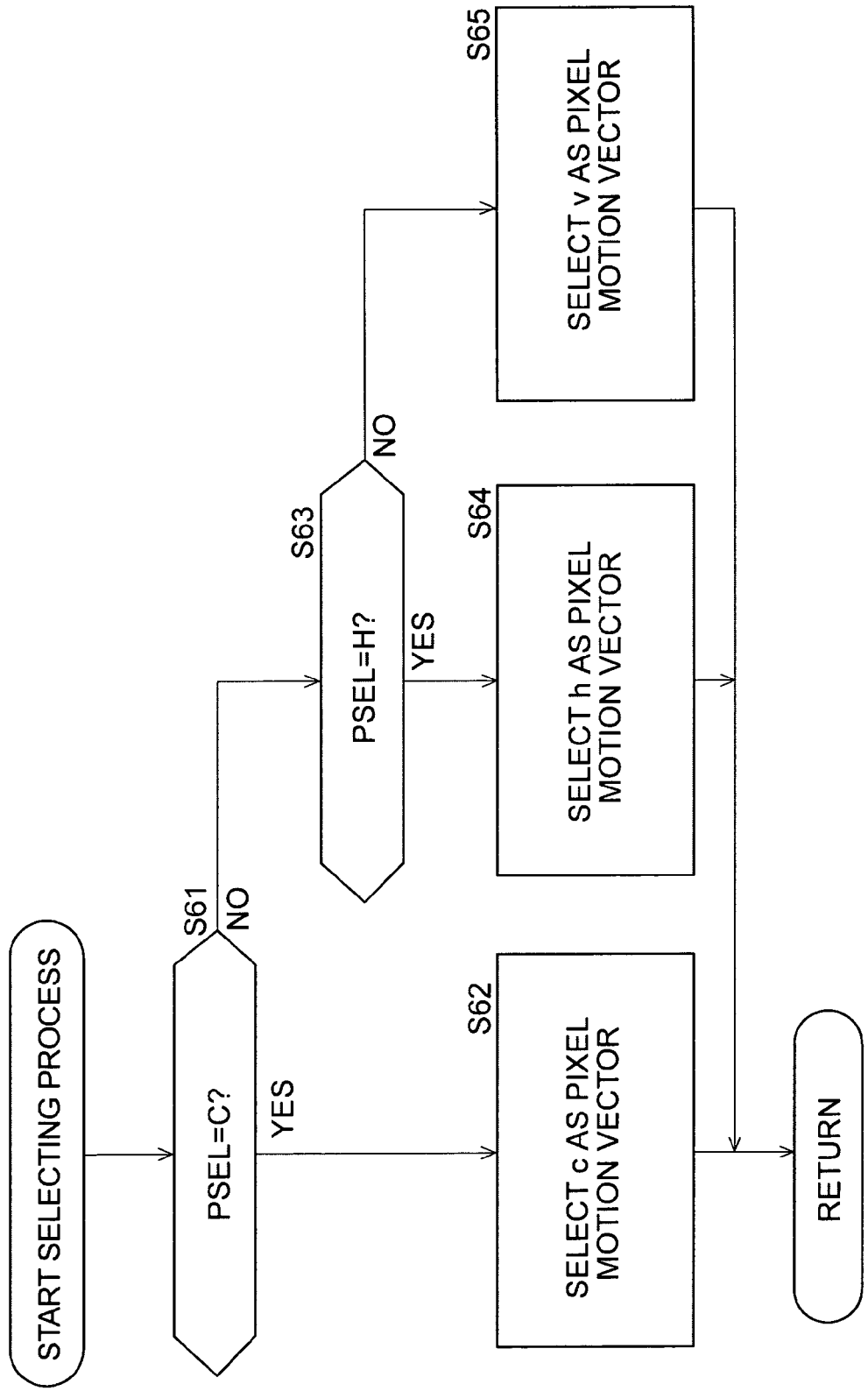
FIG. 12 is a flowchart of a selecting process in step S4 shown in FIG. 4.

Next, the selecting process executed by the pixel-vector selector 38 will be described with reference to a flowchart shown in FIG. 12.

In step S61, the pixel-vector selector 38 determines whether the selection signal PSEL has the value C. When it is determined that the selection signal PSEL has the value C, in step S62, the pixel-vector selector 38 sets the block motion vector c as a pixel motion vector of the subject pixel (x, y), and outputs the pixel motion vector, together with position information of the pixel, to the image synthesizer 22.

On the other hand, when it is determined in step S61 that the selection signal PSEL does not have the value C, in step S63, the pixel-vector selector 38 determines whether the selection signal has the value H. When it is determined that the selection signal has the value H, in step S64, the pixel-vector selector 38 sets the block motion vector h (i.e., the block motion vector b or d) as the pixel motion vector of the subject pixel (x, y), and outputs the pixel motion vector, together with position information of the pixel, to the image synthesizer 22.

On the other hand, when it is determined in step S63 that the selection signal PSEL does not have the value H, i.e., when it is determined that the selection signal has the value V, in step S65, the pixel-vector selector 38 sets the block motion vector v (i.e., the block motion vector a or e) as the pixel motion vector of the subject pixel (x, y), and outputs the pixel motion vector, together with position information of the pixel, to the image synthesizer 22.

By the process described above, pixel motion vectors in accordance with selection signals are chosen.

Now, the description returns to the flowchart shown in FIG. 4.

In step S5, the image synthesizer 13, based on information of pixel motion vectors, combines present-field data, delayed-field data, and previous-delayed-field data, outputting image data in which resolution has been converted. For example, when the pixel motion vector of a subject pixel on a generated field is the block motion vector a, as shown in FIG. 10, the image synthesizer 13, with respect to the subject pixel on the generated field, using the associated pixel motion vector a, generates a pixel using pixel values of pixels at a point on the previous delayed field and a point on the present field where the pixel motion vector a starts and ends when the pixel motion vector a passes through the subject pixel, for example, by carrying out inter-field interpolation by taking the average of the pixel values, and combines the result with the delayed-field data as needed to generate an image, and outputs the image.

By the process described above, block motion vectors of a block to which a pixel to be generated belongs and adjacent blocks are considered as candidates of a pixel motion vector of the pixel to be generated, and using the block motion vectors as candidates, one of the block motion vectors that minimizes difference between pixel values of pixels actually used for inter-field interpolation, i.e., one of the block motion vectors with which a new pixel generated by inter-field interpolation is most highly correlated with the pixels used for inter-field interpolation, is chosen as a pixel motion vector. Thus, each pixel generated by inter-field interpolation using a pixel motion vector has high correlation with peripheral pixels, so that a more natural image is formed compared with a case where block motion vectors are used.

Figure 13:
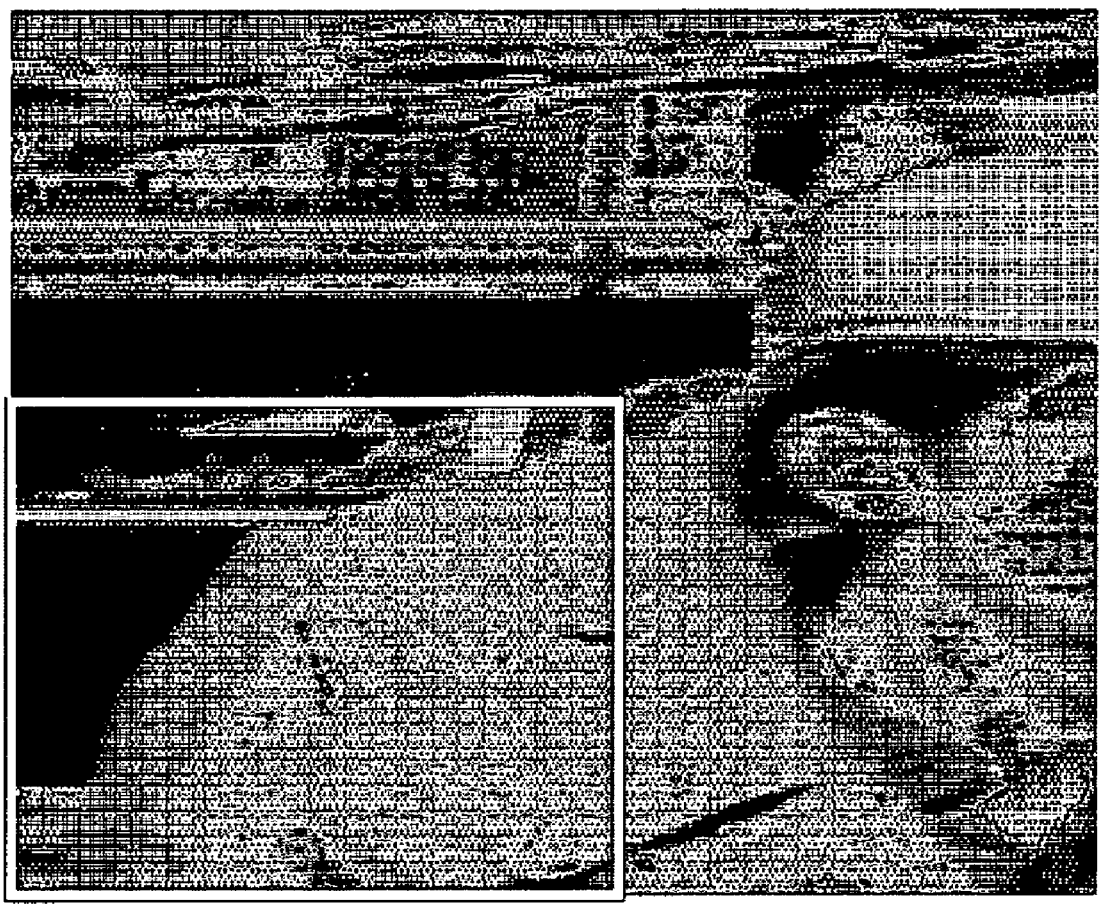
FIG. 13 is a diagram showing an example of an image before processing.
Figure 14:
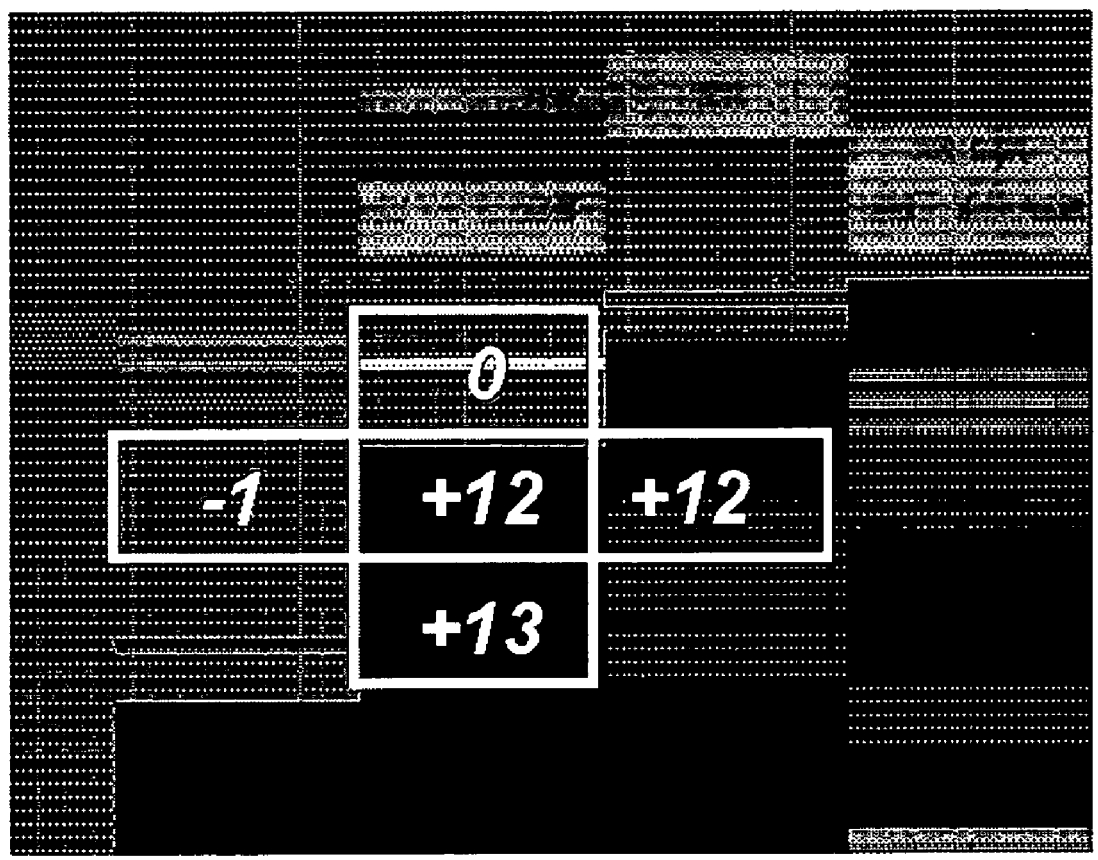
FIG. 14 is a diagram showing an example where the resolution of the image shown in FIG. 13 is converted by a method according to the related art.
Figure 15:
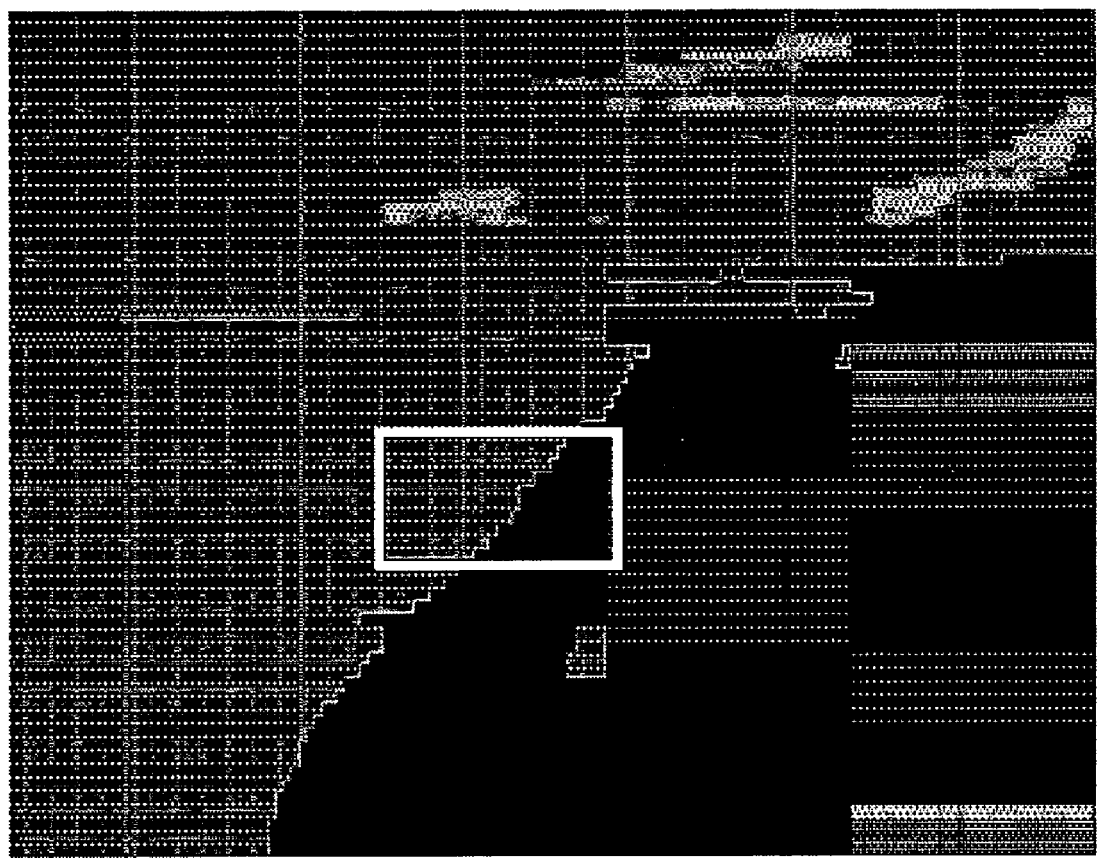
FIG. 15 is a diagram showing an example where the resolution of the image shown in FIG. 13 is converted by a method according to the embodiment.

Furthermore, for example, in the case of an image of a region indicated by a white frame in FIG. 13, according to the process according to the related art described earlier, since motion vectors are chosen on a block-by-block basis, even when a pixel moves differently from the other pixels in a region corresponding to a block (in FIG. 13, the background is still and the shoulder of a person is moving), the same motion vector is used for the entire block. Thus, as shown in FIG. 14, pixels on the present field and the previous delayed field at corresponding positions are used on a block-by-block basis, so that, for example, stairs-like shaggy could occur on the image including generated pixels. FIGS. 14 and 15 shows the magnitudes of motion vectors of the respective pixels with respect to the horizontal direction in terms of density. In FIG. 14, numeric values are shown in blocks indicated by white frames, representing the magnitudes of block motion vectors for pixels in the respective blocks with respect to the horizontal direction. In this example, the subject block has a value of +12, the upper adjacent block has a value of 0, the lower adjacent block has a value of +13, the left adjacent block has a value of −1, and the right adjacent block has a value of +12. As shown in FIG. 14, although a region where pixels with movement exist and a region where pixels without movement coexist in the subject block, the same motion vector is applied for the entire subject block.

In contrast, by the process according to this embodiment, motion vectors are chosen on a pixel-by-pixel basis, and since the motion vectors are chosen so that pixels are generated using motion vectors that minimize difference between pixel values of pixels used for interpolation among block motion vectors of peripheral blocks, correlation with peripheral pixels is high. For example, regarding the boundary between the region where pixels with movement exist and the region where pixels without movement exist in a subject block indicated by a white frame in FIG. 15, distinct motion vectors are chosen for the respective regions. This serves to achieve naturalness of pixels generated.

Fields can be classified into two fields having different phases, namely, a top field and a bottom field. In the top field, pixels exist on every other line starting from the topmost horizontal scanning line while pixels do not exist on the other lines. In the bottom field, pixels exist on every other line staring from the second topmost horizontal scanning line while pixels do not exist on the other lines. That is, lines where pixels exist differ by one line between the top field and the bottom field. Thus, in this example, the present field and the previous delayed field have the same phase, while the delayed field has a phase different from that of the present field and the previous delayed field, in which the pixel arrangement is shifted by one line.

Thus, when α shown in FIG. 9 is chosen to be ½, the generated field is the delayed field itself. In this case, based on information of pixels on the present field and the previous delayed field, pixels are generated on lines where pixels do not exist on the delayed field, and the pixels generated are combined with the delayed-field data, whereby an interlaced image is converted into a progressive image.

The above description has been made in the context of an example where, in addition to a block motion vector of a subject block, block motion vectors of adjacent blocks horizontally and vertically adjacent to the subject block are used as candidates of pixel motion vectors. However, adjacent blocks at other positions may be used, and the number of adjacent blocks used is not limited to four. For example, eight adjacent blocks additionally including blocks diagonally left and right above the subject block and blocks diagonally left and right below the subject block may be used. Also, blocks on different fields having the same phase may be used as adjacent blocks. For example, blocks having the same phase as and preceding and succeeding the generated field, i.e., the field previous by two and the field subsequent by two relative to the generated field, at positions corresponding to the subject block may be used.

Figure 3:
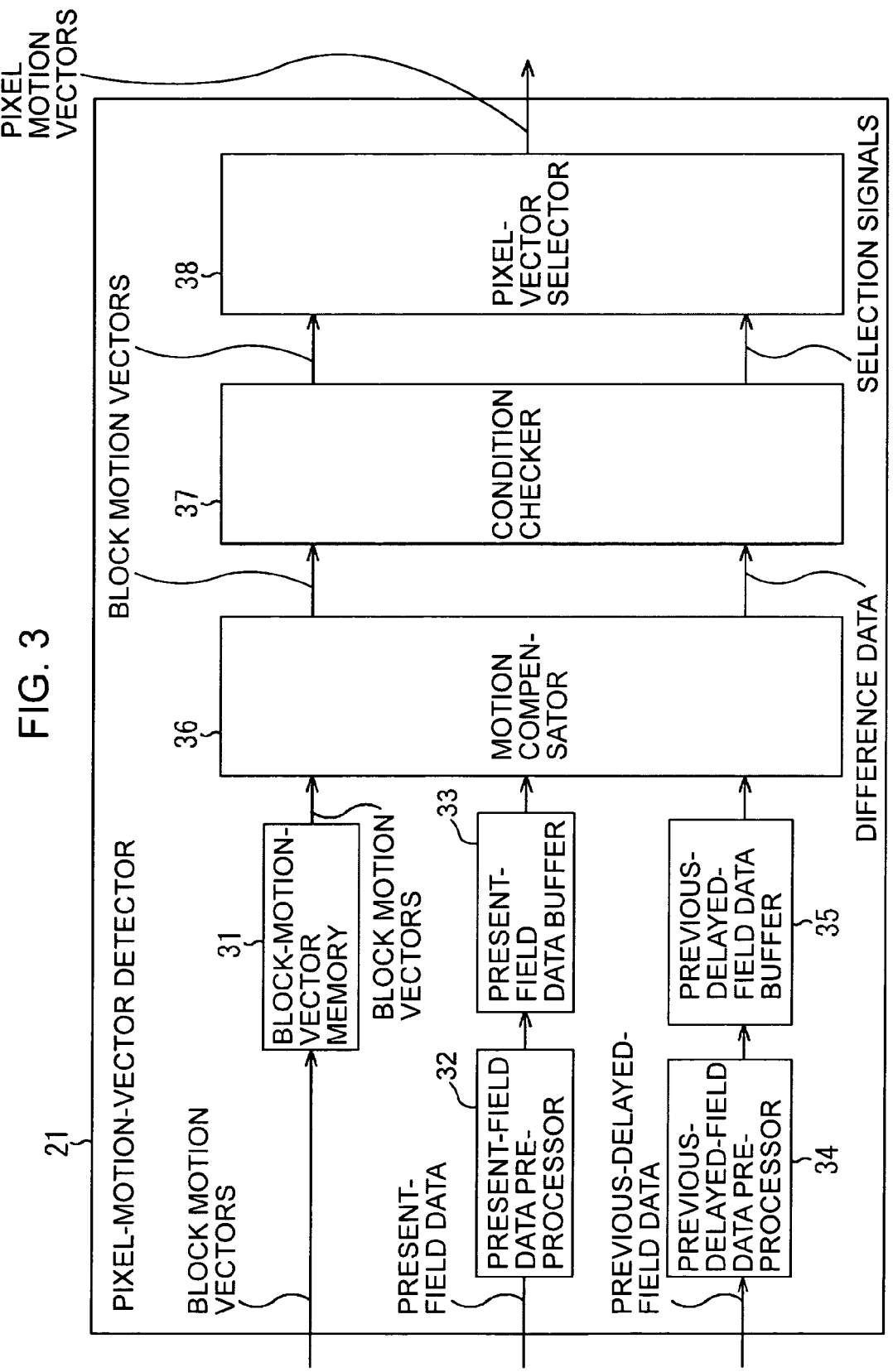
FIG. 3 is a block diagram showing the construction of a pixel-motion-vector detector shown in FIG. 1.

In the case of the pixel-motion-vector detector 21 shown in FIG. 3, according to the method described above, when deriving motion vectors on a pixel-by-pixel basis using a plurality of block motion vectors as candidates, in order that difference between pixel values of pixels used for inter-field interpolation be small, i.e., in order that a motion vector that starts and ends at pixels having high correlation be chosen as a pixel motion vector, for example, in an image including a repetition of similar shapes or including a complex shape, pixel motion vectors could be detected incorrectly. When the incorrect pixel motion vectors are used for inter-field interpolation, spatial or temporal discontinuity could occur in an image consisting of pixels generated by interpolation, causing degradation in image quality.

Thus, when motion vectors of a subject block and adjacent blocks are considered as candidates of a pixel motion vector and one of the motion vectors is selected, in addition to difference between pixel values of pixels associated with motion vectors and used for inter-field interpolation, selecting condition based on attached information may be used to improve the accuracy of selecting pixel motion vectors.

FIG. 16 shows the construction of a pixel-motion-vector detector 21. The pixel-motion-vector detector 21 shown in FIG. 16 uses block motion vectors of a subject block and adjacent blocks as candidates of pixel motion vectors. When selecting one of the block motion vectors, the pixel-motion-vector detector 21 uses, in addition to difference between pixel values of pixels associated with the motion vectors and used for inter-field interpolation, a selecting condition based on attached information, so that pixel motion vectors can be selected more accurately. In FIG. 16, parts corresponding to those of the pixel-motion-vector detector 21 shown in FIG. 3 are designated by the same numerals, and descriptions thereof will be omitted as appropriate.

The pixel-motion-vector detector 21 shown in FIG. 16 differs from the pixel-motion-vector detector 21 shown in FIG. 3 in that a present-field attached-information detector 51, a present-field attached-information buffer 52, a previous-delayed-field attached-information detector 53, and a previous-delayed-field attached-information buffer 54 are provided, and in that a motion compensator 55 and a condition checker 56 are provided instead of the motion compensator 36 and the condition checker 37.

The present-field attached-information detector 51 obtains present-field data, and calculates, as attached information, a code representing a direction of a two-dimensional edge of each pixel according to a predefined procedure. The present-field attached-information detector 51 may calculate a code representing a direction of a two-dimensional edge of each pixel using the present-field data itself, as shown in FIG. 16. Alternatively, the present-field attached-information detector 51 may calculate a code representing a direction of a two-dimensional edge of each pixel using present-field data that has been pre-processed by the present-field data pre-processor 32.

The present-field attached-information buffer 52 obtains and stores attached information supplied from the present-field attached-information detector 51. The present-field attached-information buffer 52 supplies data to the motion compensator 55 in response to a request from the motion compensator 55.

The previous-delayed-field attached-information detector 53 obtains previous-delayed-field data, and calculates, as attached information, a code representing a direction of a two-dimensional edge of each pixel according to a predefined procedure. The previous-delayed-field attached-information detector 53 may calculate a code representing a direction of a two-dimensional edge of each pixel using the previous-delayed-field data itself, as shown in FIG. 16. Alternatively, the previous-delayed-field attached-information detector 53 may calculate a code representing a direction of a two-dimensional edge of each pixel using previous-delayed-field data that has been pre-processed by the previous-delayed-field data pre-processor 34.

The previous-delayed-field attached-information buffer 54 obtains and stores information supplied from the previous-delayed-field attached-information detector 53. The previous-delayed-field attached-information buffer 54 supplies data to the motion compensator 55 in response to a request from the motion compensator 55.

The motion compensator 55 executes a motion compensating process that is basically the same as that executed by the motion compensator 36. The motion compensator 55, in addition to supplying difference data and block motion vectors to the condition checker 56, compares attached information of pixels used for inter-field interpolation for each of the block motion vectors that serve as candidates, based on the attached information obtained from the present-field attached-information buffer 52 and the attached information obtained from the previous-delayed-field attached-information buffer 54, outputting a result of comparison to the condition checker 56.

The condition checker 56 executes a condition checking process to determine, with consideration of the result of comparison and the difference data, a selection signal identifying a motion vector with which difference is small and with which the result of comparison indicates matching, supplying the selection signal and the motion vector associated with the difference data to the pixel-vector selector 38.

Next, image processing executed by the image processing apparatus 20 including the pixel-motion-vector detector 21 shown in FIG. 16 will be described with reference to a flowchart shown in FIG. 17. Steps S71, S75, and S76 shown in FIG. 17 correspond to steps S1, S4, and S5 described with reference to the flowchart shown in FIG. 4, so that descriptions thereof will be omitted.

In step S72, each of the present-field attached-information detector 51 and the previous-delayed-field attached-information detector 53 executes an attached-information detecting process to calculate codes representing direction of edges for individual pixels in the present-field data and previous-delayed field data, and stores the codes in the present-field attached-information buffer 52 and the previous-delayed-field attached-information buffer 54.

Figure 18:
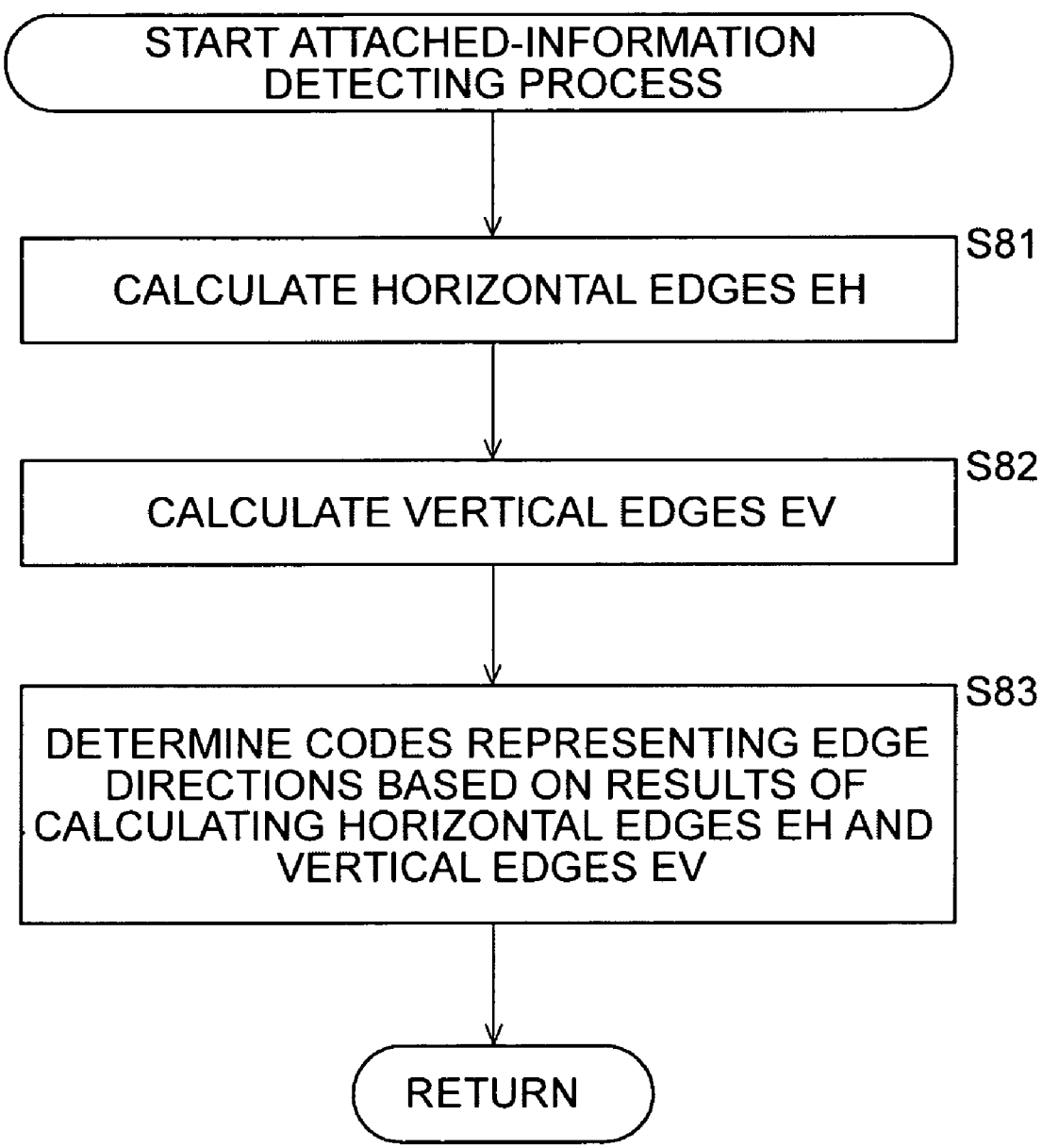
FIG. 18 is a flowchart of an attached-information detecting process in step S72 shown in FIG. 17.

Now, the attached-information detecting process executed by the present-field attached-information detector 51 will be described with reference to a flowchart shown in FIG. 18.

Figure 19:
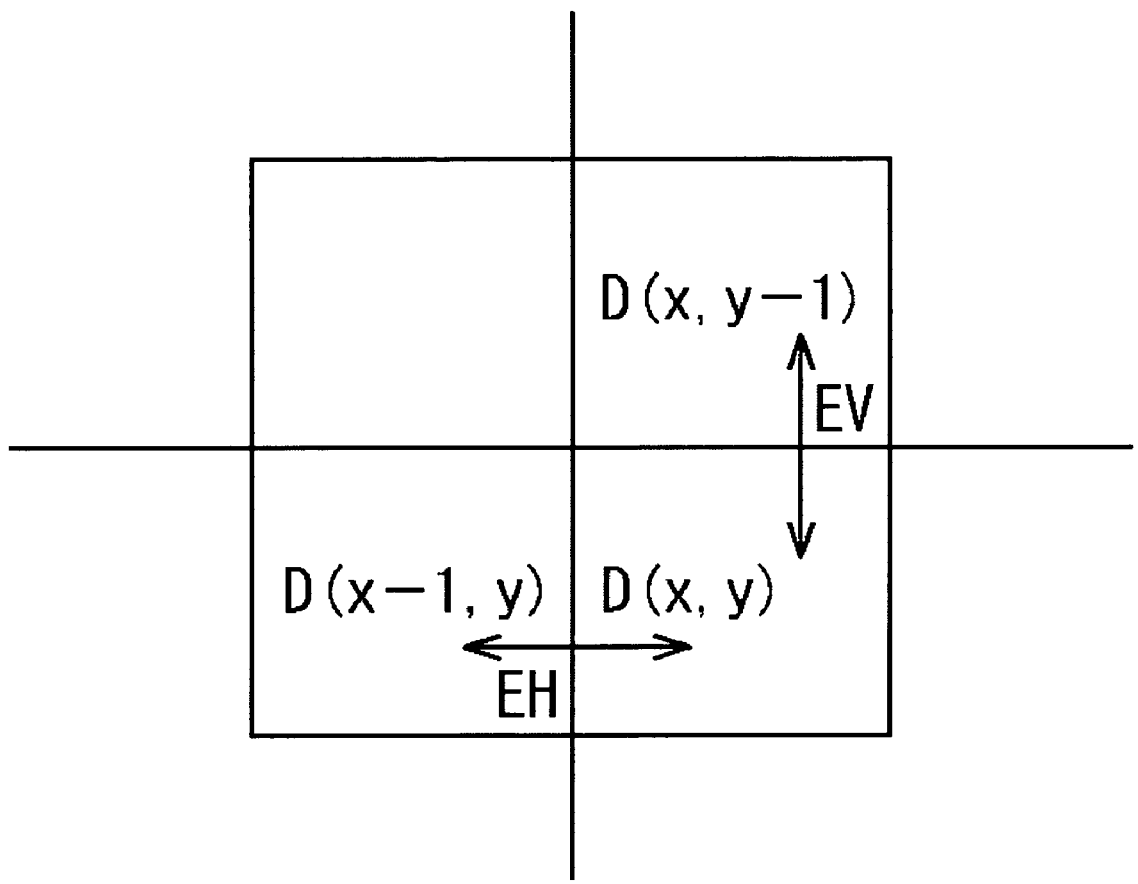
FIG. 19 is a diagram for explaining codes representing edge directions, which serve as attached information.

In step S81, the present-field attached-information detector 51 calculates a horizontal-edge code EH representing the presence or absence of a horizontal edge for each pixel on a present field. For example, when the subject pixel is a pixel D(x, y) as shown in FIG. 19, the present-field attached-information detector 51 calculates, as the horizontal-edge code EH, the difference (D(x, y)−D(x−1, y)) between the pixel values of the subject pixel and the pixel D(x−1, y) that is left adjacent to the subject pixel as viewed in FIG. 19.

In step S82, the present-field attached-information detector 51 calculates a vertical-edge code EV representing the presence or absence of a vertical edge for each pixel on the present field. For example, when the subject pixel is the pixel D(x, y) as shown in FIG. 19, the present-field attached-information detector 51 calculates, as the vertical-edge code EV, the difference (D(x, y)−D(x, y−1)) between the pixel values of the subject pixel and a pixel D(x, y−1) that is adjacent above the subject pixel as viewed in FIG. 19. In FIG. 19, it is assumed that horizontal coordinate value increases rightward and vertical coordinate value increases downward.

In step S83, the present-field attached-information detector 51 determines a code representing an edge direction for each pixel on the present field according to a predefined table, based on whether each of the values of the horizontal-edge code EH and the vertical-edge code EV is positive, zero, or negative, and stores the code representing the edge direction in the present-field attached-information buffer 52 in association with information representing the pixel position.

Figure 20:
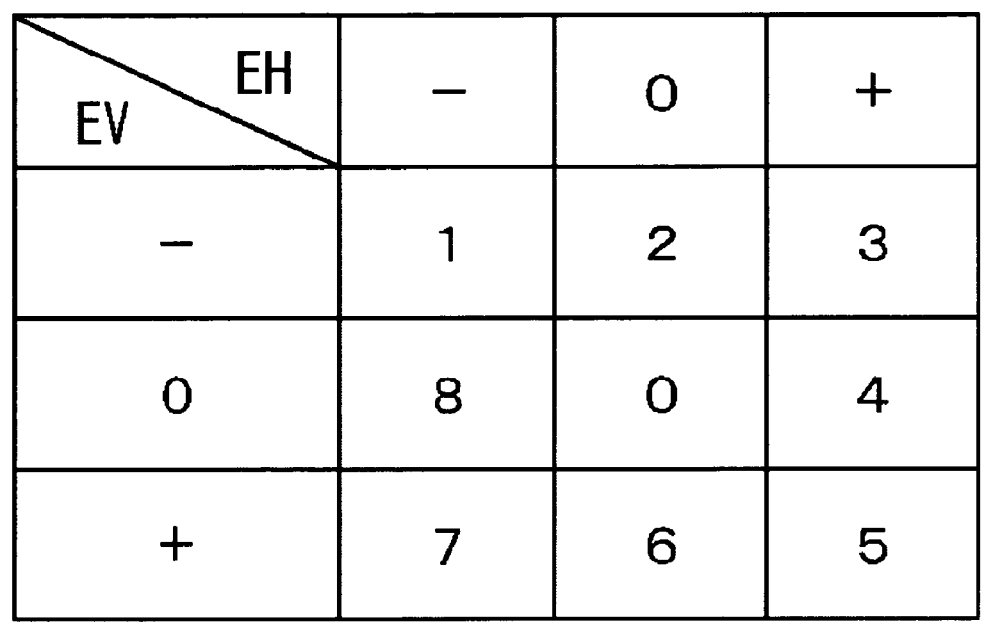

The table defining codes of edge directions is, for example, as shown in FIG. 20. The table defines edge directions based on whether each of the values of the horizontal-edge code EH and the vertical edge code EV is positive, negative, or zero. Thus, when the table shown in FIG. 20 is used, the present-field attached-information detector 51 determines that no edge exists when the horizontal-edge code EH and the vertical edge code EV are both zero, selecting a code having a value of 0. The present-field attached-information detector 51 determines that an edge exists diagonally left above the subject pixel when the horizontal-edge code EH and the vertical-edge code EV are both negative, selecting a code having a value of 1. The present-field attached-information detector 51 determines that an edge exists above the subject pixel when the horizontal-edge code EH is zero and the vertical edge code EV is negative, selecting a code having a value of 2. The present-field attached-information detector 51 determines that an edge exists diagonally right above the subject pixel when the horizontal-edge code EH is positive and the vertical-edge code EV is negative, selecting a code having a value of 3. The present-field attached-information detector 51 determines that an edge exists rightward of the subject pixel when the horizontal-edge code EH is positive and the vertical-edge code is zero, selecting a code having a value of 4. The present-field attached-information detector 51 determines that an edge exists diagonally right below the subject pixel when the horizontal-edge code EH and the vertical-edge code EV are both positive, selecting a code having a value of 5. The present-field attached-information detector 51 determines that an edge exists below the subject pixel when the horizontal-edge code EH is zero and the vertical-edge code EV is positive, selecting a code having a value of 6. The present-field attached-information detector 51 determines that an edge exists diagonally left below the subject pixel when the horizontal-edge code EH is negative and the vertical-edge code EV is positive, selecting a code having a value of 7. The present-field attached-information detector 51 determines that an edge exists leftward of the subject pixel when the horizontal-edge code EH is negative and the vertical-edge code EV is zero, selecting a code having a value of 8.

By the process described above, information representing the possibility of the presence of an edge based on the relationship of magnitudes of pixel values of each pixel on the present-field data and adjacent pixels can be attached to each pixel as a code representing an edge direction. Although the attached-information detecting process executed by the present-field attached-information detector 51 has been described above, the previous-delayed-field attached-information detector 53 also detects attached information from the previous delayed field by a similar process, so that description of the process will be omitted.

Figure 17:
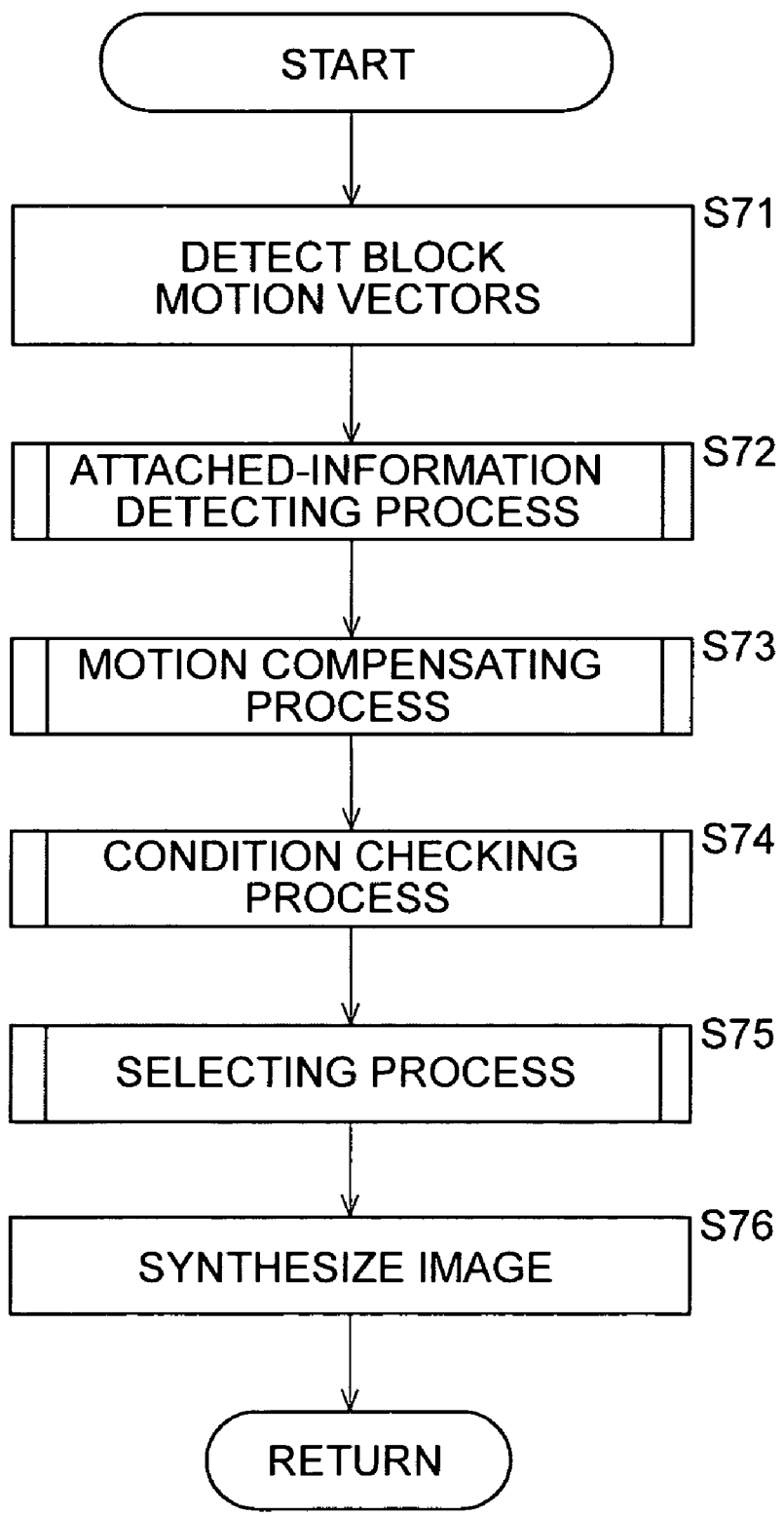
FIG. 17 is a flowchart of image processing executed by an image processing apparatus including the pixel-motion-vector detector shown in FIG. 16.

Now, the description returns to the flowchart shown in FIG. 17.

After the attached-information detecting process is executed in step S72, in step S73, the motion compensator 55 executes a motion compensating process, outputting difference data and results of comparison to the condition checker 56.

Figure 21:
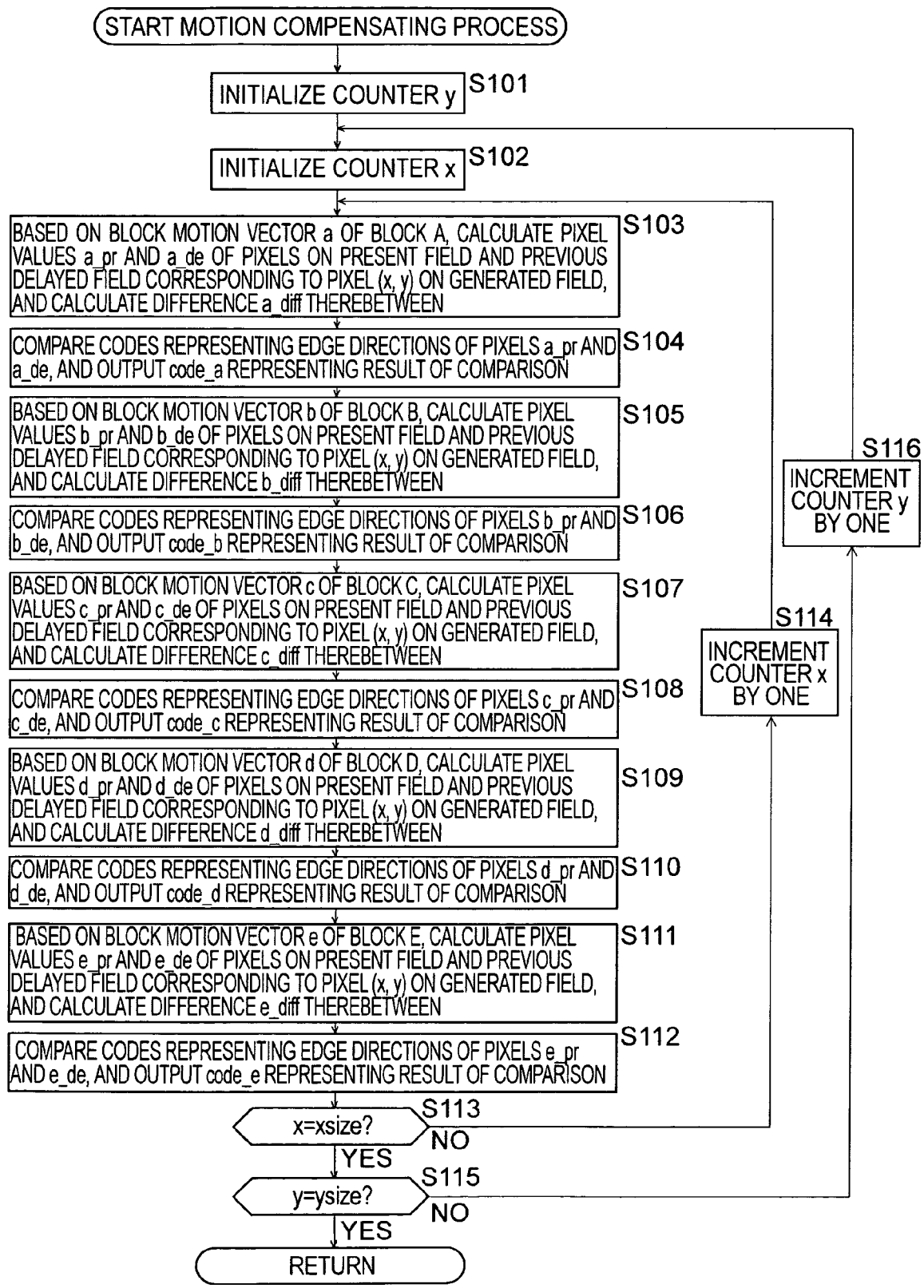
FIG. 21 is a flowchart of a motion compensating process in step S73 shown in FIG. 17.

Now, the motion compensating process executed by the motion compensator 55 will be described with reference to a flowchart shown in FIG. 21. Steps S101 to S103, S105, S107, S109, and S111, and S113 to S116 in the flowchart shown in FIG. 21 correspond to steps S11 to S21 described with reference to FIG. 5, so that descriptions thereof will be omitted.

In step S104, the motion compensator 55 compares codes representing edge directions for a pixel a_pr and a pixel a_de, outputting a comparison result code_a to the condition checker 56. More specifically, the motion compensator 55 compares codes representing edge directions for a pixel a_pr and a pixel a_de, and outputs to the condition checker 56 a comparison result code_a=1 when these codes match while outputting a comparison result code_a=0 when these codes do not match.

In step S106, the motion compensator 55 compares codes representing edge directions for a pixel b_pr and a pixel b_de, outputting a comparison result code_b to the condition checker 56. More specifically, the motion compensator 55 compares codes representing edge directions for a pixel b_pr and a pixel b_de, and outputs to the condition checker 56 a comparison result code_b=1 when these codes match while outputting a comparison result code_b=0 when these codes do not match.

In step S108, the motion compensator 55 compares codes representing edge directions for a pixel c_pr and a pixel c_de, outputting a comparison result code_c to the condition checker 56. More specifically, the motion compensator 55 compares codes representing edge directions for a pixel c_pr and a pixel c_de, and outputs to the condition checker 56 a comparison result code_c=1 when these codes match while outputting a comparison result code_c=0 when these codes do not match.

In step S110, the motion compensator 55 compares codes representing edge directions for a pixel d_pr and a pixel d_de, outputting a comparison result code_d to the condition checker 56. More specifically, the motion compensator 55 compares codes representing edge directions for a pixel d_pr and a pixel d_de, and outputs to the condition checker 56 a comparison result code_d=1 when these codes match while outputting a comparison result code_d=0 when these codes do not match.

In step S112, the motion compensator 55 compares codes representing edge directions for a pixel e_pr and a pixel e_de, outputting a comparison result code_e to the condition checker 56. More specifically, the motion compensator 55 compares codes representing edge directions for a pixel e_pr and a pixel e_de, and outputs to the condition checker 56 a comparison result code_e=1 when these codes match while outputting a comparison result code_e=0 when these codes do not match.

By the process described above, the motion compensator 55 outputs to the condition checker 56, together with difference data for each of the block motion vectors of the subject block and adjacent blocks as candidates, results of comparison of codes representing edge directions between pixels used for inter-frame interpolation for the respectively associated block motion vectors.

Now, the description returns to the flowchart shown in FIG. 17.

In step S74, the condition checker 56 executes a condition checking process.

Figure 22:
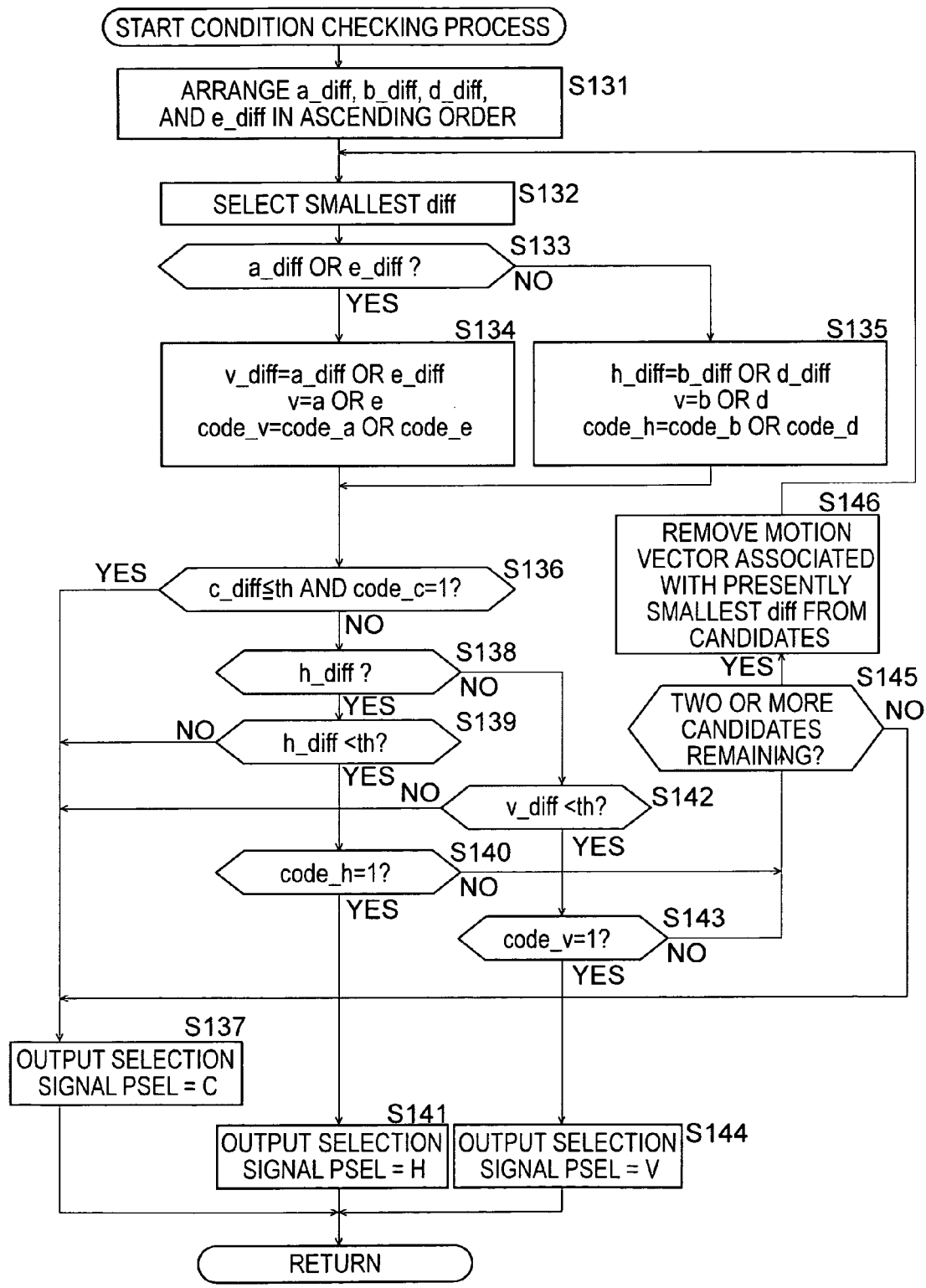
FIG. 22 is a flowchart of a condition checking process in step S74 shown in FIG. 17.

Now, the condition checking process executed by the condition checker 56 will be described with reference to a flowchart shown in FIG. 22.

In step S131, the condition checker 56 sorts the differences a_diff, b_diff, d_diff, and e_diff in ascending order. In the following description, it is assumed that the differences are sorted as a_diff, b_diff, d_diff, and e_diff in ascending order. However, it is to be understood that the order is not limited to this order.

In step S132, the condition checker 56 selects the smallest difference from the differences a_diff, b_diff, d_diff, and e_diff sorted in step S131. In this case, the difference a_diff is selected.

In step S133, the condition checker 56 determines whether the difference selected is the difference a_diff or e_diff, i.e., a difference associated with one of the blocks vertically adjacent to the subject block. In this case, it is determined that the difference selected is the difference a_diff, and the process proceeds to step S134.

In step S134, the condition checker 56 sets the value selected, i.e., the difference a_diff or e_diff, as a vertical difference v_diff (i.e., v_diff=a_diff or e_diff), sets the motion vector a or e in association with the difference as a representative motion vector v for the vertically adjacent blocks (i.e., v=a or e), and sets the comparison result code_a or code_e in association with the difference as a comparison result code_v (i.e., code_v=code_a or code_e). In this case, since the difference a_diff is selected, the difference a_diff is set as the vertical difference v_diff, the motion vector a is set as the representative motion vector v for the vertically adjacent blocks, and the comparison result code_a is set as the comparison result code_v.

On the other hand, when it is determined in step S133 that the difference a_diff or e_diff is not selected, in step S135, the condition checker 56 sets the value selected, i.e., the difference b_diff or d_diff, as a horizontal difference h_diff (i.e., h_diff=b_diff or d_diff), sets the motion vector b or d in association with the difference as a representative motion vector h for the horizontally adjacent blocks (i.e., h=b or d), and sets the comparison result code_b or code_d in association with the difference as a comparison result code_h (i.e., code_h=code_b or code_d).

In step S136, the condition checker 56 determines whether the difference c_diff is less than a predetermined threshold th and the comparison result code_c is 1. When the difference c_diff is less than the predetermined threshold th and the comparison result code_c is 1, in step S137, the condition checker 56 supplies the block motion vector c to the pixel-vector selector 38 together with a selection signal PSEL having a value C indicating that the difference c_diff has been selected. That is, when the difference c_diff of the subject block is less than the predetermined threshold th and the comparison result code_c is 1 (i.e., when the directions of edges coincide between pixels corresponding to points on the previous delayed field and the present field where the block motion vector c starts and ends when the block motion vector c passes through the subject pixel), the block motion vector c of the subject block is selected.

When it is determined in step S137 that the difference c_diff is not less than the predetermined threshold th or that the comparison result code_c is not 1, in step S138, the condition checker 56 determines whether the difference selected is the difference h_diff. In this case, the difference v_diff is the difference a_diff, not the difference h_diff, so that the process proceeds to step S142.

In step S142, the condition checker 56 determines whether the difference v_diff is less than the predetermined threshold th. When the difference v_diff is less than the predetermined threshold th, in step S143, the condition checker 56 determines whether the code_v is 1. When it is determined that the code_v is 1, in step S144, the condition checker 56 supplies the block motion vector v to the pixel-vector selector 38 together with a selection signal PSEL having a value V indicating that the difference v_diff has been selected. When it is determined in step S142 that the difference v_diff is not less than the predetermined threshold th, the process proceeds to step S137.

When it is determined in step S138 that the difference selected is the difference h_diff, in step S139, the condition checker 56 determines whether the difference h_diff is less than the predetermined threshold th. When it is determined the difference h_diff is less than the predetermined threshold th, in step S140, the condition checker 56 determines whether code_h is 1. When it is determined that code_h is 1, in step S141, the condition checker 56 supplies the block motion vector h to the pixel-vector selector 38 together with a selection signal PSEL having a value H indicating that the difference h_diff has been selected. When it is determined in step S139 that the difference h_diff is not less than the predetermined threshold th, the process proceeds to step S137.

When it is determined in step S140 that code_h is not 1 or when it is determined in step S143 that code_v is not 1, in step S145, the condition checker 56 determines whether two or more candidate block motion vectors are remaining. In this case, four block motion vectors a, b, d, and e associated with the differences a_diff, b_diff, d_diff, and e_diff are remaining, so that it is determined that two or more candidates are remaining, and the process proceeds to step S146.

In step S146, the condition checker 56 removes a motion vector associated with the currently smallest difference from the candidates, and the process returns to step S132. In this case, since the difference a_diff is smallest, the associated motion vector a is removed from the candidates.

In step S132, since the motion vector a has been removed from the candidates, the difference b_diff, which is smallest next to the difference a_diff, is selected, and the subsequent steps are repeated. Then, steps S132 to S136, S138 to S140, S142, S143, S145, and S146 are executed in order, whereby the candidate motion vector b is removed. Then, in step S132, the difference d_diff is selected, and the subsequent steps are repeated.

Then, steps S132 to S136, S138 to S140, S142, S143, and S145 are executed in order, whereby it is determined in step S145 that two or more candidates are not remaining. Then, the process proceeds to step S137.

That is, when the difference c_diff of the subject block is less than the predetermined threshold th and the comparison result code_c is 1, the condition checker 56 outputs a selection signal PSEL=C. When the difference c_diff of the subject block is less than the predetermined threshold th and the comparison result code_c is not 1, the condition checker 56 outputs a selection signal PSEL=H or V corresponding to one of the differences a_diff, b_diff, d_diff, and e_diff that has a comparison result of 1 and that is smallest. When the difference c_diff of the subject block is less than the predetermined threshold th, the comparison result is not 1, and none of the comparison results of the other candidates is 1, the condition checker 56 outputs a selection signal PSEL=C.

Thus, in addition to difference between pixel values of pixels corresponding to the points on the previous delayed field and the present field where each of the block motion vectors as candidates of a pixel motion vector starts and ends when the block motion vector passes through the subject pixel, whether edge directions of the pixels match is considered when selecting an optimal block motion vector as a pixel motion vector from the block motion vectors of the subject block and the adjacent blocks as candidates. Thus, even in an image including delicate shapes or a repetition of shapes, motion vectors can be determined accurately on a pixel-by-pixel basis.

In the example described above, in addition to difference between pixel values of pixels corresponding to the points on the previous delayed field and the present field where each of the block motion vectors as candidates of a pixel motion vector starts and ends when the block motion vector passes through the subject pixel, whether edge directions of the pixels match is considered when selecting an optimal block motion vector as a pixel motion vector from the block motion vectors of the subject block and the adjacent blocks as candidates. According to the method described above, however, motion vectors that can be selected as pixel motion vectors are restricted. Thus, although it is possible to reduce the possibility of generating unnatural pixels in image processing such as resolution conversion or conversion of an interlaced image into a progressive image, in the case of image processing in which a field that does not originally exist is generated, such as conversion of field frequency or conversion of the number of frames, the accuracy of motion vectors is directly reflected on an image generated. This could prohibit generating a field accurately when some motion vectors cannot be detected accurately.

In order to avoid such a situation, a motion vector of each pixel may be calculated based on correlation with a peripheral image by smoothing candidate motion vectors around a subject pixel in accordance with respective distances from the subject pixel.

Figure 23:
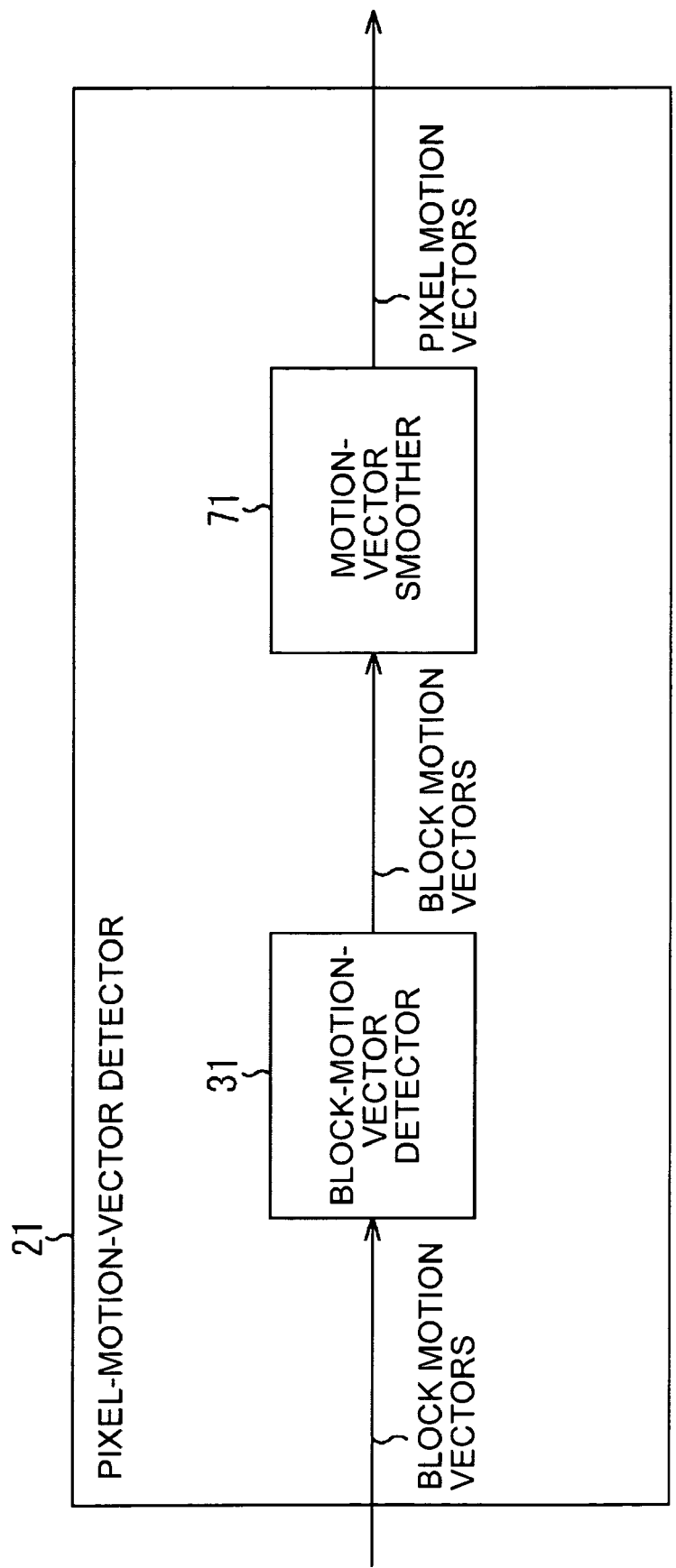
FIG. 23 is a diagram showing yet another construction of the pixel-motion-vector detector.

FIG. 23 shows the construction of a pixel-motion-vector detector 21 that calculates a motion vector of each pixel by smoothing candidate motion vectors around a subject pixel in accordance with respective distances from the subject pixel and, thereby generating a pixel based on correlation with a peripheral image. Parts of the pixel-motion-vector detector 21 shown in FIG. 23 corresponding to those of the pixel-motion-vector detector 21 shown in FIG. 3 or FIG. 16 are designated by the same numerals, and descriptions thereof will be omitted as appropriate.

The pixel-motion-vector detector 21 shown in FIG. 23 includes the block-motion-vector memory 31 and a motion-vector smoother 71.

The motion-vector smoother 71 assumes respective block motion vectors of a subject block and adjacent blocks as vectors having start points at the centers of the respective blocks (need not necessarily be the centers but may be other positions that serve as reference positions). For each pixel on a generated field, the motion-vector smoother 71 takes a linear combination of the block motion vectors of the adjacent blocks multiplied by coefficients in accordance with distances from the respective start positions of the block motion vectors to smooth the block motion vectors of the blocks adjacent to the subject pixel and generate a pixel motion vector, outputting the pixel motion vector to the image synthesizer 22.

Figure 24:
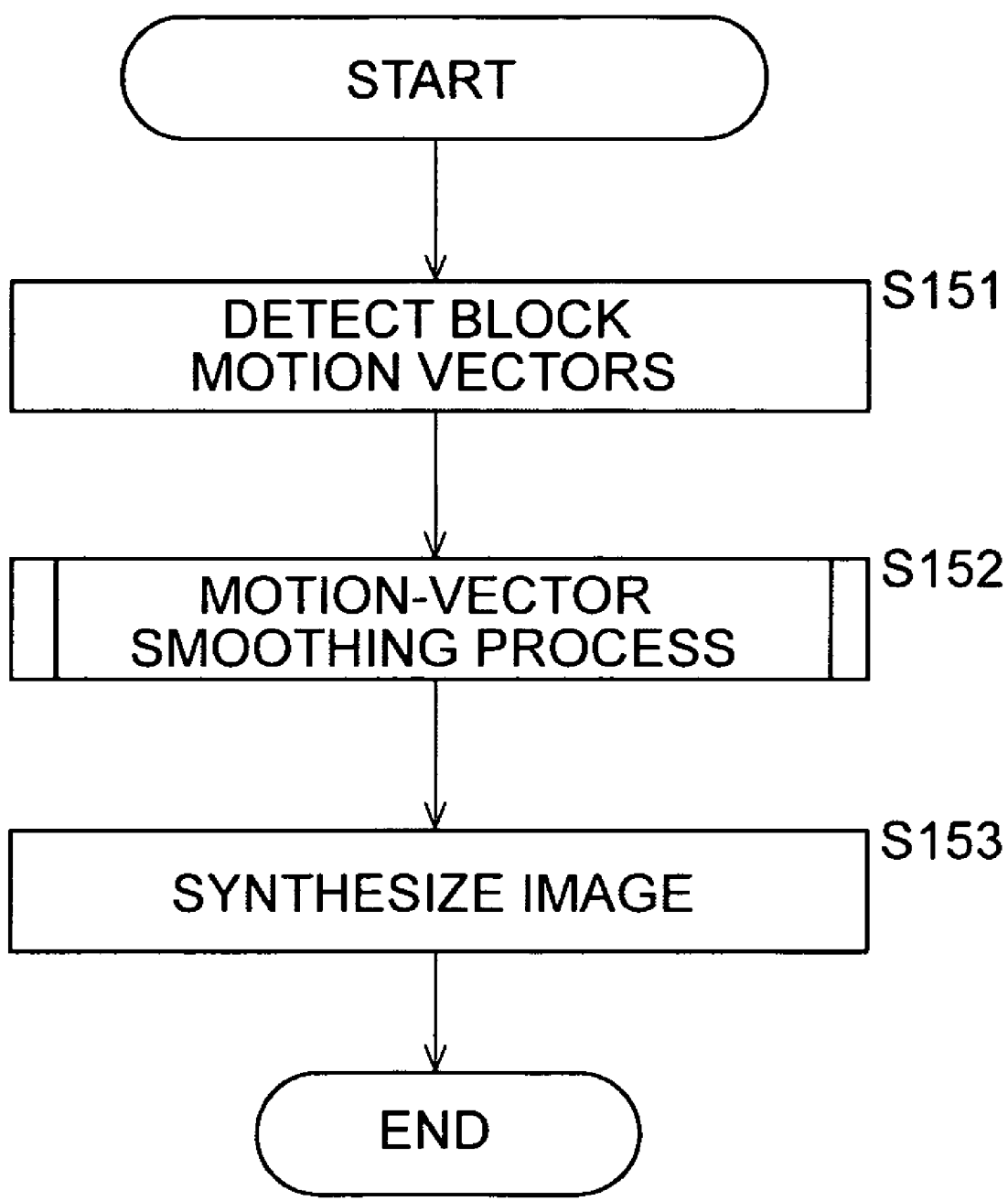
FIG. 24 is a flowchart of image processing executed by an image processing apparatus including the pixel-motion-vector detector shown in FIG. 23.
Figure 25:
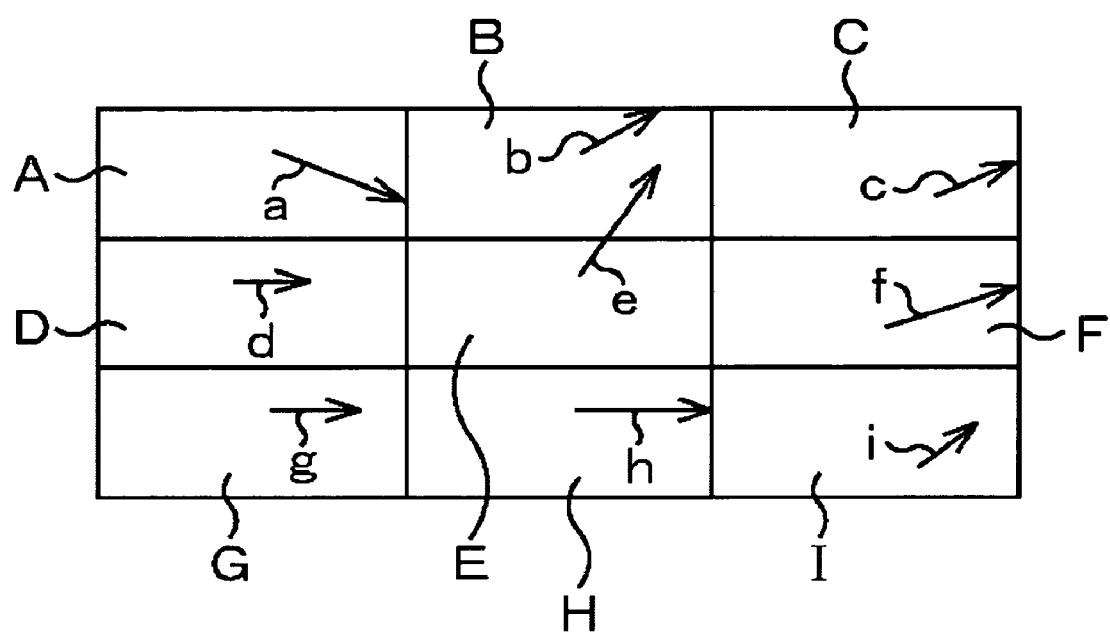
FIG. 25 is a diagram showing another example of block motion vectors.

Next, image processing executed by an image processing apparatus 20 including the pixel-motion-vector detector 21 shown in FIG. 23 will be described with reference to a flowchart shown in FIG. 24. Steps S151 and S153 in the flowchart shown in FIG. 24 correspond to steps S1 and S5 in the flowchart shown in FIG. 4, so that descriptions thereof will be omitted. Furthermore, for the convenience of description, it is assumed that a subject block and adjacent blocks are chosen as shown in FIG. 25. That is, the subject block is a block E, and the adjacent blocks are A to D and F to I, and respective block motion vectors of these blocks A to I are denoted by a to i.

In step S152, the motion-vector smoother 71 reads motion vectors stored in the block-motion-vector memory 31, and executes a motion-vector smoothing process.

Figure 26:
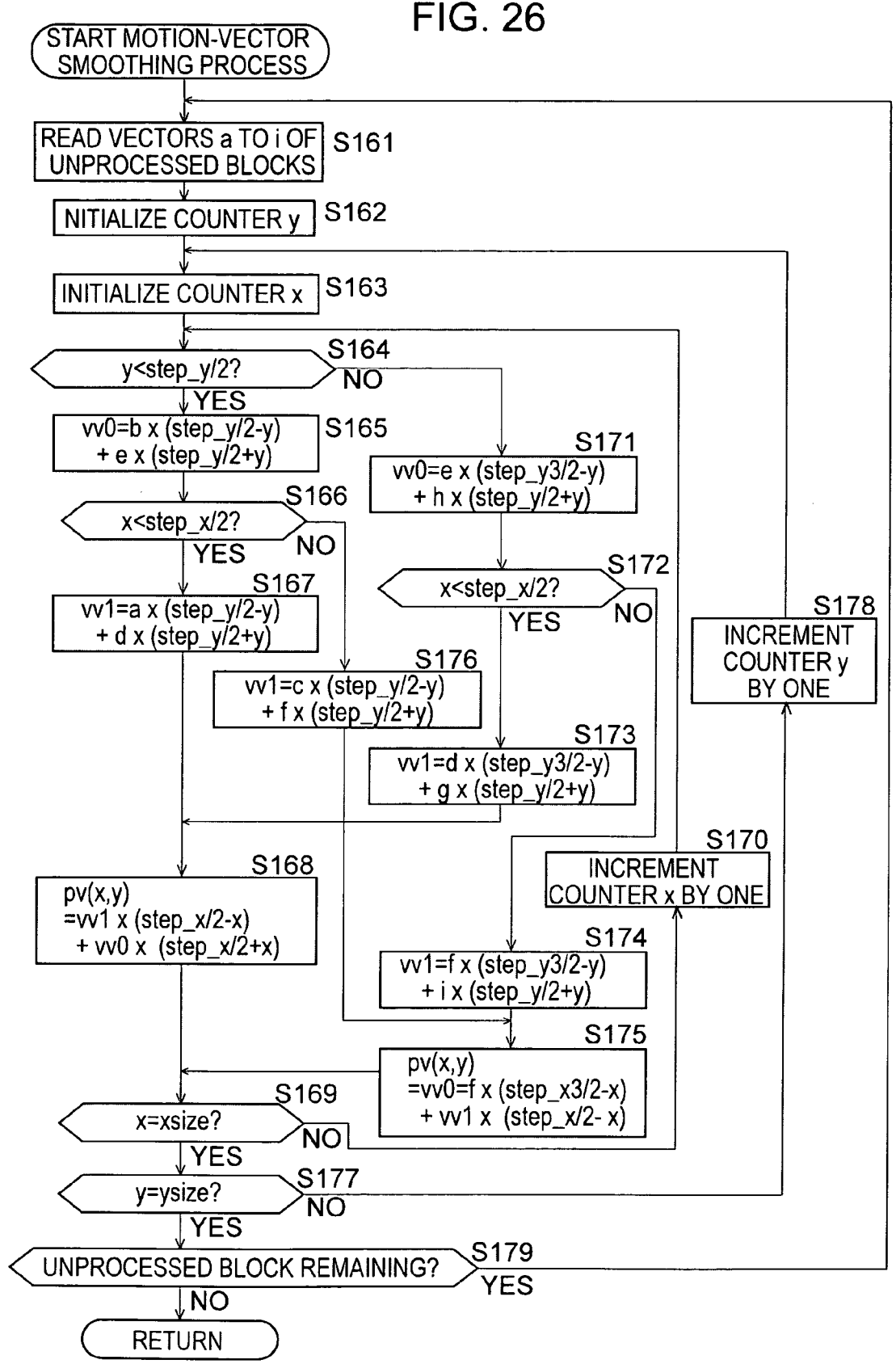
FIG. 26 is a flowchart of a motion-vector smoothing process in step S152 shown in FIG. 24.

Now, the motion-vector smoothing process executed by the motion-vector smoother 71 will be described with reference to a flowchart shown in FIG. 26.

Figure 27:
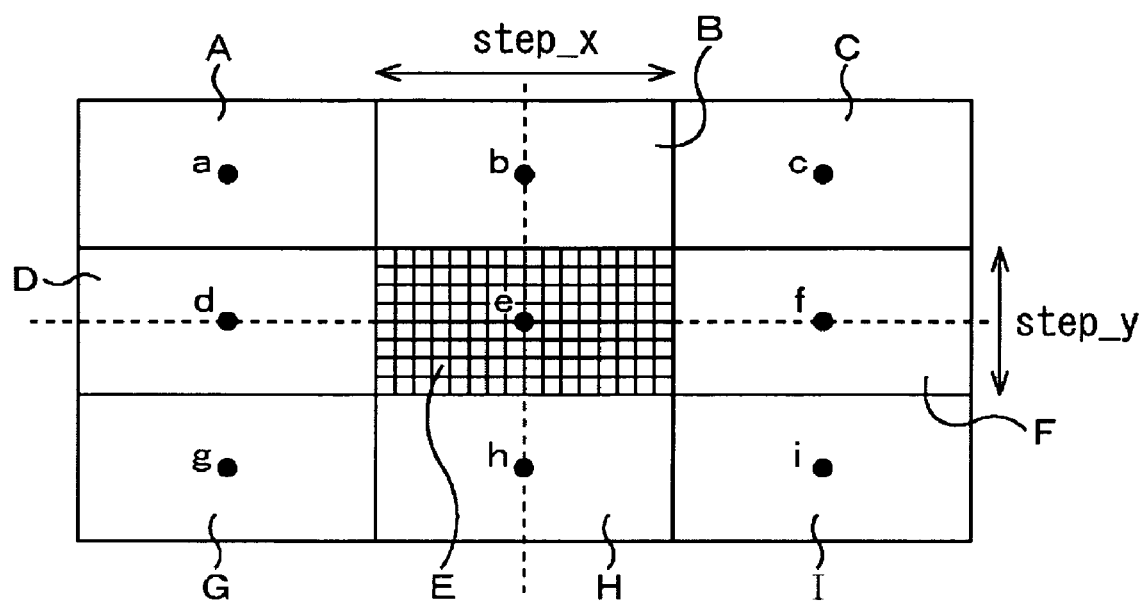
FIG. 27 is a diagram for explaining the motion-vector smoothing process.

In step S161, the motion-vector smoother 71 selects, as a subject block, a block in which pixel motion vectors of the respective pixels have not been calculated, and reads block motion vectors a to i associated with adjacent blocks A to I from the block-motion-vector memory 31. For example, it is assumed herein that the subject block and the adjacent blocks are 3 blocks×3 blocks as shown in FIG. 27, and the size of each of the blocks is step_x×step_y. The top left corner of the subject block, i.e., the block E, as viewed in FIG. 27 serves as the origin, with the x direction extending horizontally rightward and the y direction extending vertically downward. In FIG. 27, black dots at the centers of the respective blocks indicate the center positions of the respective blocks. This process will be described in the context of calculating pixel motion vectors of the respective pixels in the subject block.

In step S162, the motion-vector smoother 71 initializes a counter y (not shown). In step S163, the motion-vector smoother 71 initializes a counter x (not shown).

In step S164, the motion-vector smoother 71 determines whether the value of the counter y is less than step_y/2. When it is determined that the value of the counter y is less than step_y/2, i.e., when the subject pixel (x, y) exists above the vertical center of the subject block, in step S165, the motion-vector smoother 71 calculates equation (1) below:

$$vv0 = b \times (step\_y/2 - y) + e \times (step\_y/2 + y) \quad (1)$$

where b and e denote the block motion vectors b and e, respectively. That is, in equation (1), the linear combination vv0 of the block motion vectors b and e is calculated using weight coefficients in accordance with vertical distances between the subject pixel and the respective centers of the blocks B and E.

In step S166, the motion-vector smoother 71 determines whether the value of the counter x is less than step_x/2. When it is determined that the value of the counter x is less than step_x/2, i.e., when the subject pixel exists on the left side with respect to the horizontal center of the subject block, in step S167, the motion-vector smoother 71 calculates equation (2) below:

$$vv1 = a \times (step\_y/2 - y) + d \times (step\_y/2 + y) \quad (2)$$

where a and d denote the block motion vectors a and d, respectively. That is, in equation (2), the linear combination vv1 of the block motion vectors a and d is calculated using weight coefficients in accordance with vertical distances between the subject pixel and the respective centers of the blocks A and D.

In step S168, the motion-vector smoother 71 calculates equation (3) below:

$$pv(x, y) = vv1 \times (step\_x/2 - x) + vv0 \times (step\_x/2 + x) \quad (3)$$

That is, in equation (3), the linear combination of the block motion vectors vv0 and vv1 is calculated as a pixel motion vector pv(x, y) of the subject pixel using weight coefficients in accordance with horizontal distances between the subject pixel and the respective centers of the blocks E and D (equal to distances between the subject pixel and the respective centers of the blocks A and B). In this case, the linear combination of the linear combination vv0 of the block motion vectors b and e and the linear combination vv1 of the block motion vectors a and d is calculated using weight coefficients in accordance with horizontal distances between the subject pixel and the respective centers of the blocks A and B.

Thus, when the subject block exists in the upper left part of the subject block, by steps S165, S167, and S168, the pixel motion vector of each of the pixels is calculated as a linear combination of the vectors a, b, d, and e with weight coefficients in accordance with distances between the pixel and the respective centers of the blocks A, B, D, and E.

When it is determined in step S164 that the value of the counter y is not less than step_y/2, i.e., when the subject pixel exits below the vertical center of the subject block, in step S171, the motion-vector smoother 71 calculates equation (4) below:

$$vv0 = e \times (step\_y \times 3/2 - y) + h \times (step\_y/2 + y) \quad (4)$$

where e and h denote the block motion vectors e and h, respectively. That is, in equation (4), the linear combination vv0 of the block motion vectors e and h is calculated using weight coefficients in accordance with distances between the subject pixel and the respective centers of the blocks E and H.

In step S172, the motion-vector smoother 71 determines whether the value of the counter x is less than step_x/2. When it is determined that the value of the counter x is less than step_x/2, that is, when the subject pixel exists on the left side with respect to the horizontal center of the subject block, in step S173, the motion-vector smoother 71 calculates equation (5) below, and the process then proceeds to step S168:

$$vv1 = d \times (step\_y \times 3/2 - y) + g \times (step\_y/2 + y) \qquad (5)$$

where d and g denote the block motion vectors d and g. That is, in equation (5), the linear combination vv1 of the block motion vectors d and g is calculated using weight coefficients in accordance with vertical distances between the subject pixel and respective centers of the blocks D and G.

Thus, when the subject pixel exists in the lower left part of the subject block, by steps S171, S173, and S168, the pixel motion vector of each of the pixels is calculated as a linear combination of the vectors d, e, g, and h with weight coefficients in accordance with distances between the pixel and the respective centers of the blocks D, E, G, and H.

When it is determined in step S166 that the value of the counter x is not less than step_x/2, that is, when the subject pixel exists on the right side with respect to the horizontal center of the subject block, in step S176, the motion-vector smoother 71 calculates equation (6) below:

$$vv1 = c \times (step\_y/2 - y) + f \times (step\_y/2 + y) \qquad (6)$$

where c and f denote the block motion vectors c and f. That is, in equation (6), the linear combination vv1 of the block motion vectors c and f is calculated using weight coefficients in accordance with vertical distances between the subject pixel and the respective centers of the blocks C and F.

In step S175, the motion-vector smoother 71 calculates equation (7) below:

$$pv(x, y) = vv0 \times (step\_x \times 3/2 - x) + vv1 \times (step\_x/2 + x) \qquad (7)$$

That is, in equation (7), the linear combination of the block motion vectors vv0 and vv1 is calculated in accordance with horizontal distances between the subject pixel and the respective centers of the blocks B and C (equal to horizontal distances between the subject pixel and the respective centers of the blocks E and F) as the pixel motion vector pv(x, y) of the subject pixel.

Thus, when the subject pixel exits in the upper right part of the subject block, by steps S165, S176, and S175, the pixel motion vector of each of the pixels is calculated as a linear combination of the vectors b, c, e, and f with weight coefficients in accordance with distances between the pixel and the respective centers of the blocks B, C, E, and F.

When it is determined in step S172 that the value of the counter x is not less than step_x/2, i.e., when the subject pixel exists on the right side with respect to the horizontal center of the subject block, in step S174, the motion-vector smoother 71 calculates equation (8) below, and the process proceeds to step S175:

$$vv1 = f \times (step\_y \times 3/2 - y) + i \times (step\_y/2 + y) \qquad (8)$$

where f and i denote block motion vectors f and i. That is, in equation (8), the linear combination vv1 of the block motion vectors f and i is calculated using weight coefficients in accordance with vertical distances between the subject pixel and the respective centers of the blocks F and I.

Thus, when the subject pixel exits in the lower right part of the subject block, by steps S171, S174, and S175, the pixel motion vector of each of the pixels is calculated as a linear combination of the vectors e, f, h, and i with weights in accordance with distances between the pixel and the respective centers of the blocks E, F, H, and I.

In step S169, it is determined whether the value of the counter x is xsize corresponding to the horizontal size of the field image. When it is determined that the value of the counter x is not xsize, the process proceeds to step S170, in which the motion-vector smoother 71 increments the counter x by one. The process then returns to step S164.

On the other hand, when it is determined in step S169 that the value of the counter x is xsize, i.e., when it is determined that pixel motion vectors of the respective pixels on one horizontal line of the subject block have been calculated, the process proceeds to step S177, in which the motion-vector smoother 71 determines whether the value of the counter y is ysize corresponding to the vertical size of the field image. When it is determined that the value of the counter y is not ysize, in step S178, the motion-vector smoother 71 increments the counter y by one. The process then returns to step S163.

On the other hand, when it is determined in step S177 that the value of the counter y is ysize, i.e., when it is determined that pixel motion vectors have been calculated for all the pixels in the block, in step S179, the motion-vector smoother 71 determines whether pixel motion vectors have been calculated for all the blocks. When it is determined that the process has not been finished for all the blocks, the process returns to step S161, and the subsequent steps are repeated. When it is determined in step S177 that the process has been finished for all the blocks, the process is exited.

By the process described above, the pixel motion vector of each of the pixels in the upper right part of the subject block is determined by smoothing motion vectors of the subject block and blocks adjacent above, diagonally right above, and rightward by calculating the linear combination of the motion vectors multiplied by coefficients in accordance with distances between the pixel and the respective centers of these blocks. The pixel motion vector of each of the pixels in the lower right part of the subject block is determined by smoothing motion vectors of the subject block and blocks adjacent below, diagonally right below, and rightward by calculating the linear combination of the motion vectors multiplied by coefficients in accordance with distances between the pixel and the respective centers of these blocks. The pixel motion vector of each of the pixels in the upper left part of the subject block is determined by smoothing motion vectors of the subject block and blocks adjacent above, diagonally left above, and leftward by calculating the linear combination of the motion vectors multiplied by coefficients in accordance with distances between the pixel and the respective centers of these blocks. The pixel motion vector of each of the pixels in the lower left part of the subject block is determined by smoothing motion vectors of the subject block and blocks adjacent below, diagonally left below, and leftward by calculating the linear combination of the motion vectors multiplied by coefficients in accordance with distances between the pixel and the respective centers of these blocks.

Thus, a pixel motion vector is generated by combining spatially distributed block motion vectors in accordance with respective distances. Therefore, a pixel motion vector can be generated with little detection error while reducing computational cost.

Although block motion vectors of four blocks are combined to generate a single pixel motion vector in the example described above, the linear combination of block motion vectors of a larger number of blocks, multiplied by coefficients in accordance with distances, may be calculated.

Although block motion vectors in the same field are combined in the example described above, block motion vectors in fields other than a field including a subject block may be used. For example, the linear combination of block motion vectors of blocks at corresponding positions in a field including a subject block and fields preceding and succeeding it by two fields, multiplied by coefficients in accordance with field intervals, may be calculated.

Furthermore, the construction of the pixel-motion-vector detector 21 shown in FIG. 3 or FIG. 16 and the construction of the pixel-motion-vector detector 21 shown in FIG. 23 may be combined. In that case, for example, when block motion vectors as candidates become exhausted in step S145 in the flowchart shown in FIG. 22 so that it is not possible to select a pixel motion vector, the pixel motion vector is calculated by smoothing.

Figure 28:
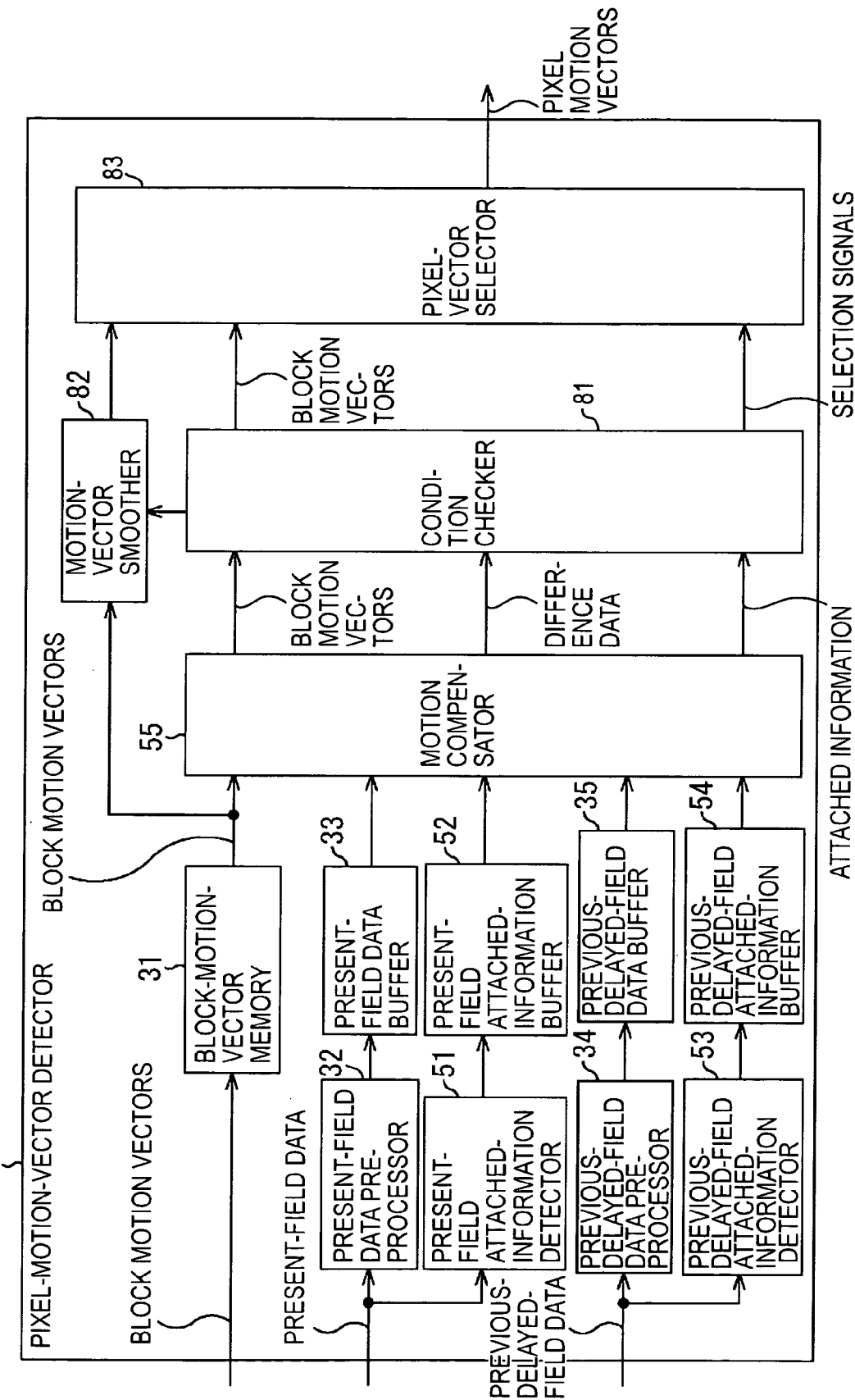
FIG. 28 is a diagram showing still another construction of the pixel-motion-vector detector.

FIG. 28 shows the construction of a pixel-motion-vector detector 21 implemented by combining the construction of the pixel-motion-vector detector 21 shown in FIG. 16 and the construction of the pixel-motion-vector detector 21 shown in FIG. 23.

The construction of the pixel-motion-vector detector 21 shown in FIG. 28 is basically the same as that of the pixel-motion-vector detector 21 shown in FIG. 16. However, a motion-vector smoother 82 is provided additionally, and a condition checker 81 and a pixel-vector selector 83 are provided instead of the condition checker 56 and the pixel-vector selector 57. The condition checker 81 is basically the same as the condition checker 56. However, when block motion vectors as candidates are exhausted so that it is not possible to select a pixel motion vector, the motion-vector smoother 82 is activated for the pixel motion vector. The motion-vector smoother 82 is basically the same as the motion-vector smoother 71. The pixel-vector selector 82 is basically the same as the pixel-vector selector 57. However, when selecting a pixel motion vector, the pixel-vector selector 83 is allowed to select a motion vector smoothed by the motion-vector smoother 82.

Figure 29:
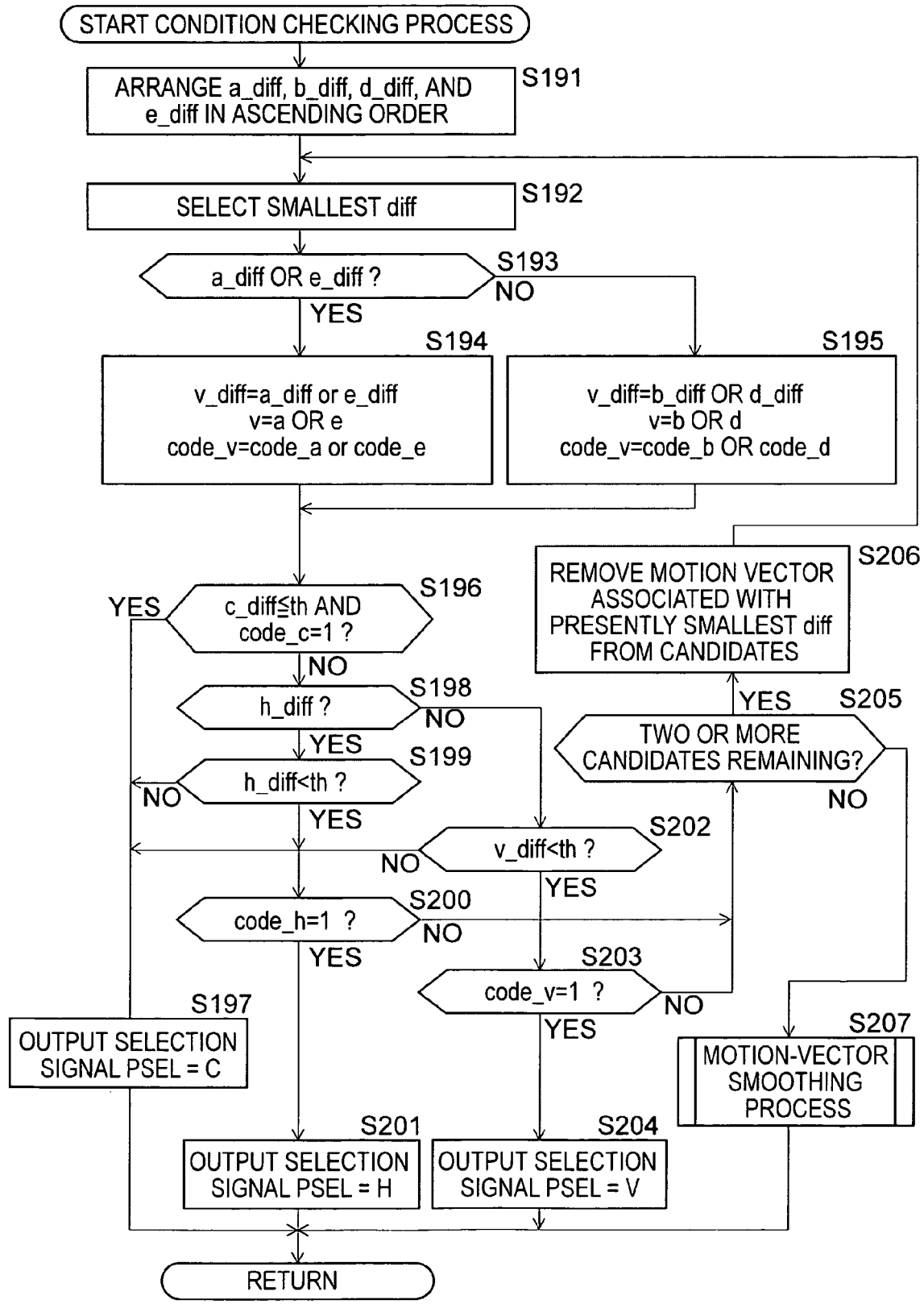
FIG. 29 is a flowchart of a condition checking process executed by the pixel-motion-vector detector shown in FIG. 28.

Image processing executed by an image processing apparatus 20 including the pixel-motion-vector detector 21 shown in FIG. 28 is the same as that in the flowchart shown in FIG. 4 except for the condition checking process and the selecting process. Thus, only a condition checking process and a selecting process executed by the pixel-motion-vector detector 21 shown in FIG. 28 will be described with reference to flowcharts shown in FIG. 29 to 31. Steps S191 to S206 in the flowchart shown in FIG. 29 correspond to steps S131 to A146 in the flowchart shown in FIG. 22, so that descriptions thereof will be omitted.

In step S207, the motion-vector smoother 82 executes a motion-vector smoothing process based on an instruction received from the condition checker 81.

Figure 30:
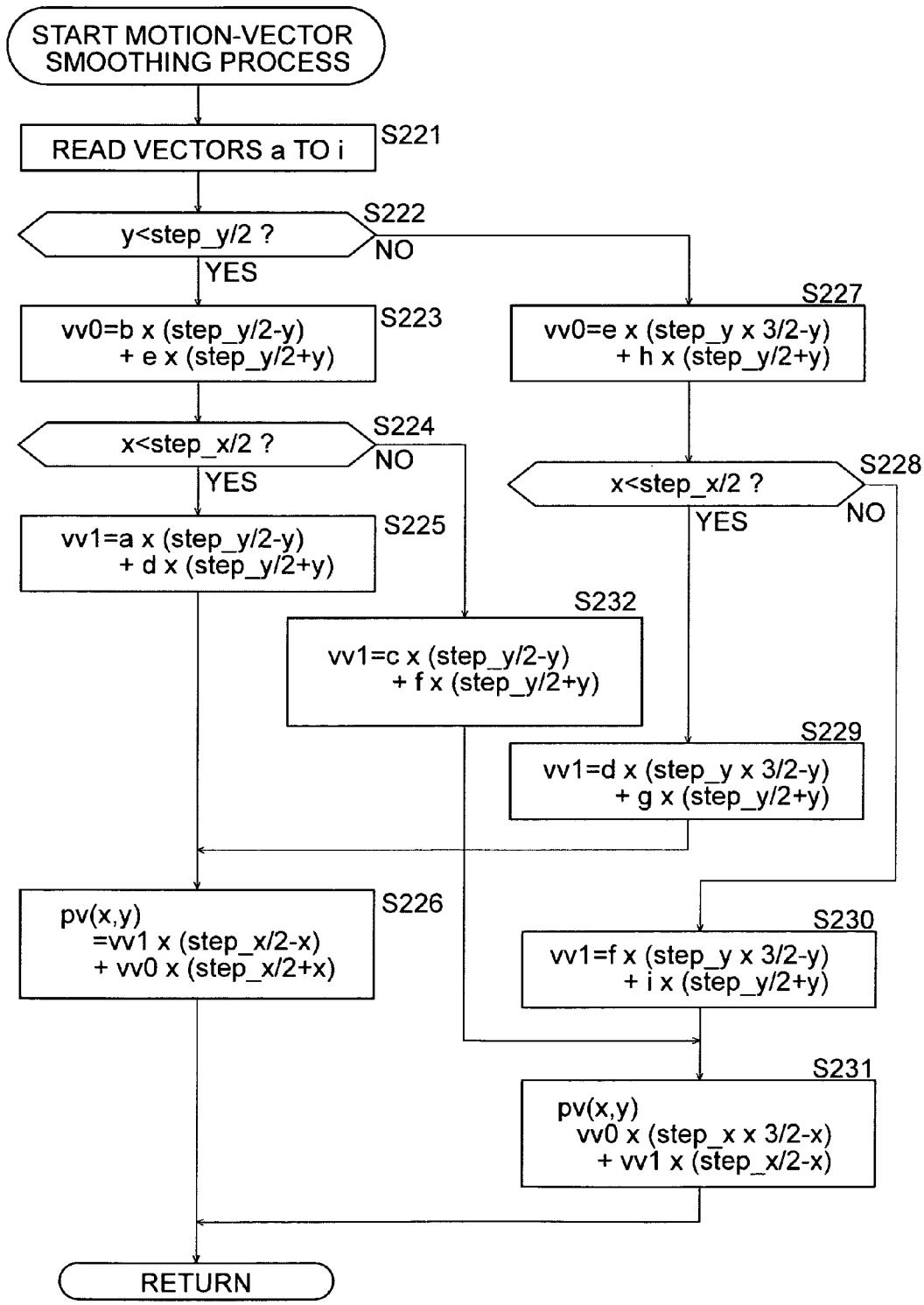
FIG. 30 is a flowchart of a motion-vector smoothing process in step S207 shown in FIG. 29.

The flowchart shown in FIG. 30 shows the motion-vector smoothing process executed by the motion-vector smoother 82. Steps S221 to S231 in the flowchart shown in FIG. 30 correspond to steps S161 and S164 to S175 in the flowchart shown in FIG. 26, so that descriptions thereof will be omitted.

Figure 31:
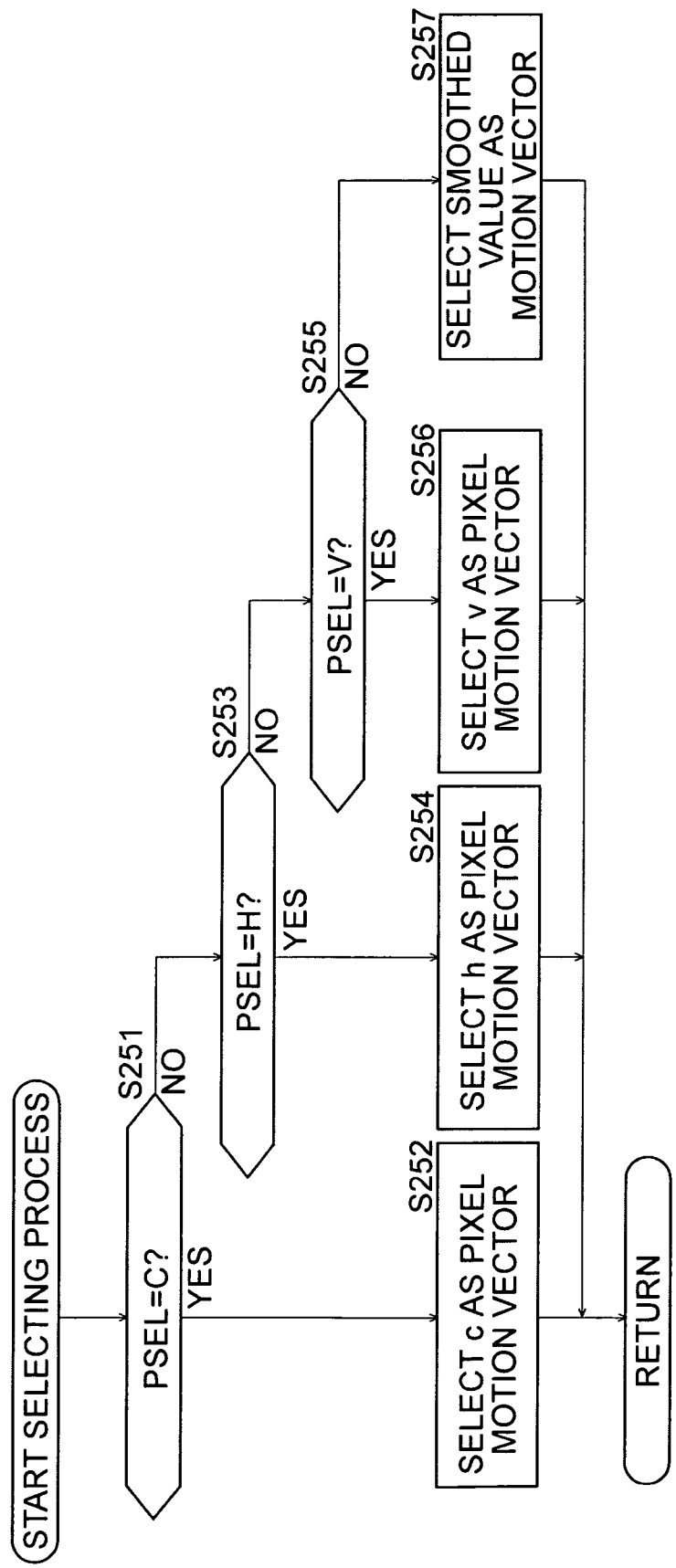
FIG. 31 is a flowchart of a selecting process executed by the pixel-motion-vector detector shown in FIG. 28.

Next, the selecting process executed by the pixel-motion-vector detector 21 shown in FIG. 28 will be described with reference to the flowchart shown in FIG. 31. Steps S251 to S254 and S256 in the flowchart shown in FIG. 31 correspond to steps S61 to S65 in the flowchart shown in FIG. 12, so that descriptions thereof will be omitted.

In step S255, the pixel-vector selector 83 determines whether the selection signal PSEL has the value V. When it is determined that the selection signal PSEL has the value V, the process proceeds to step S256. On the other hand, when it is determined in step S255 that the selection signal PSEL does not have the value V, in step S257, the pixel-vector selector 83 selects a motion vector supplied from the motion-vector smoother 82 as a pixel motion vector.

By the process described above, when block motion vectors as candidates are exhausted so that it is not possible to select a pixel motion vector, the pixel motion vector is calculated by smoothing, so that pixel motion vectors can be obtained more stably.

In the example described above, a method for accurately calculating motion vectors and accurately generating pixels by inter-field interpolation has been described. This method serves to achieve improved naturalness of a generated image by improving the reliability of motion vectors. Alternatively, for example, it is possible to switch interpolation method after finding amounts of error by evaluating pixels generated by a plurality of interpolation methods based on motion vectors detected.

Figure 32:
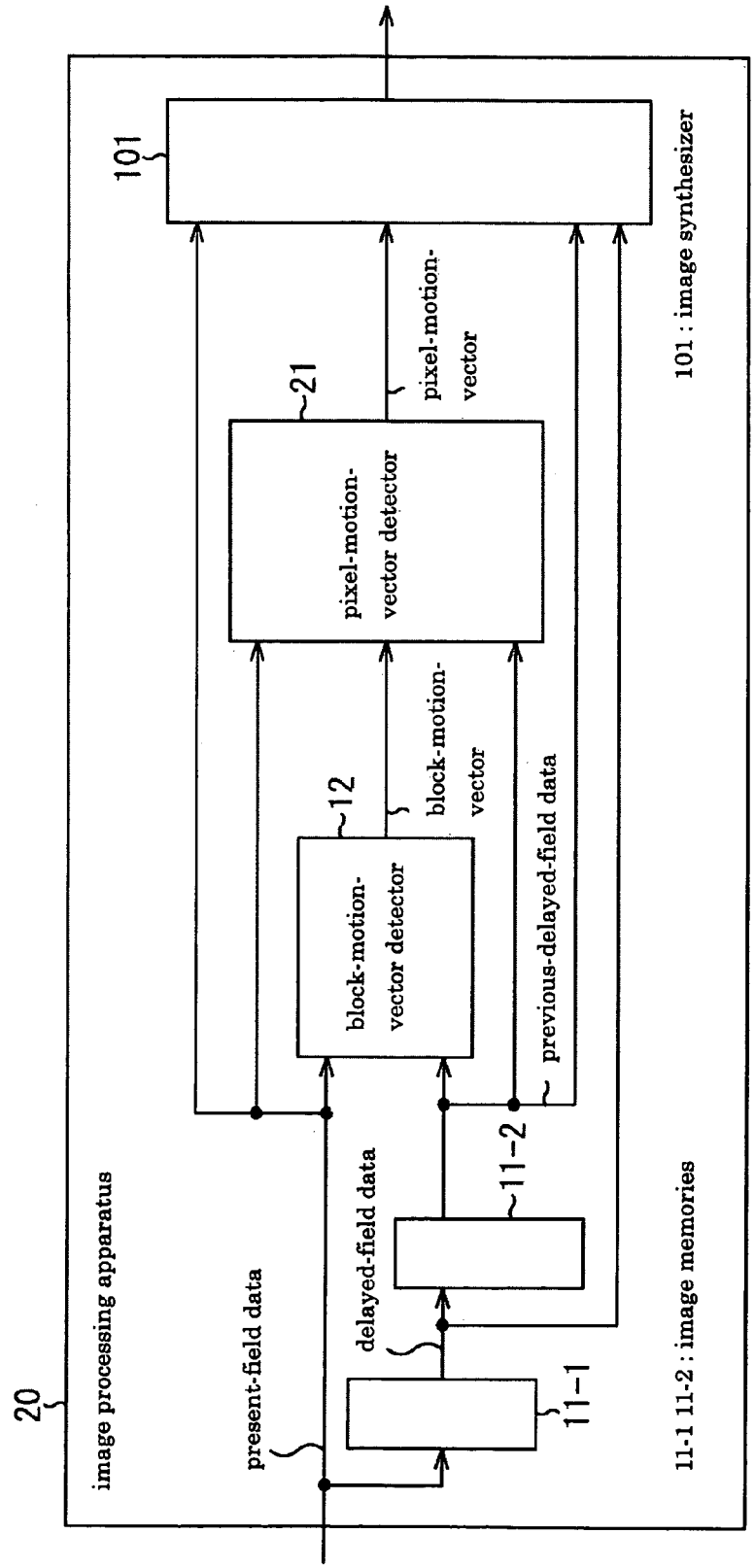
FIG. 32 is a block diagram showing the construction of an image processing apparatus according to another embodiment of the present invention.

FIG. 32 shows the construction of an image processing apparatus 20 including an image synthesizer 101 instead of the image synthesizer 22. In contrast to the image synthesizer 22, which generates an image by inter-field interpolation, the image synthesizer 101 is capable of generating pixels by either inter-field interpolation or intra-field interpolation. The image synthesizer 101 evaluates pixels generated by the respective methods, calculates amounts of error, and switches between inter-field interpolation and intra-field interpolation in accordance with the amounts of error to generate output.

Figure 33:
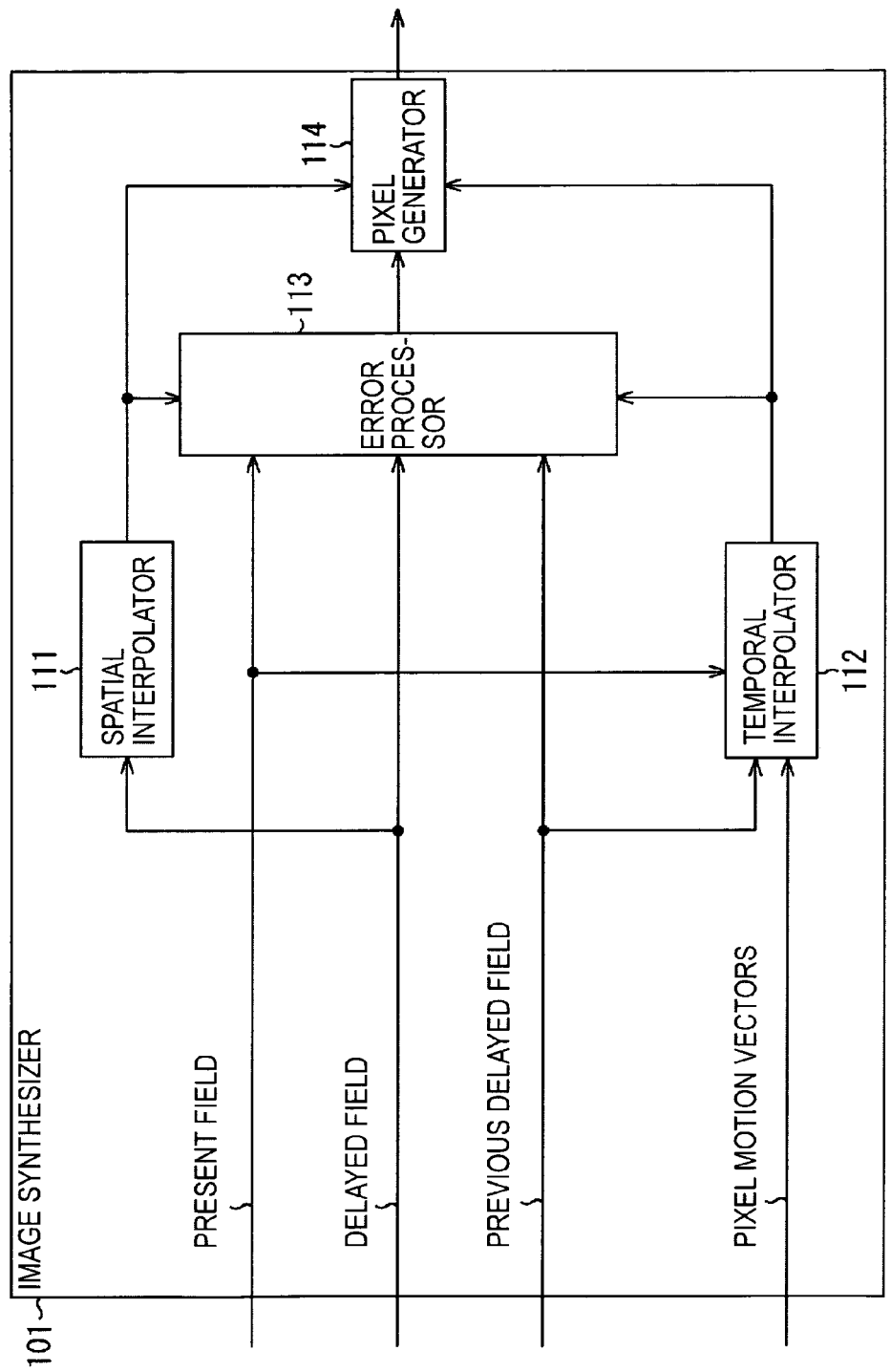
FIG. 33 is a block diagram showing the construction of an image synthesizer shown in FIG. 32.

FIG. 33 shows the construction of the image synthesizer 101.

A spatial interpolator 111 generates pixels by intra-field interpolation based on delayed-field data using pixels in an image of the delayed field, and supplies the pixels to an error processor 113 and a pixel generator 114.

A temporal interpolator 112 generates new pixels by inter-field interpolation based on pixel motion vectors using present-field data and previous-delayed-field data, and supplies the pixels to the error processor 113 and the pixel generator 114.

The error processor 113 calculates the amount of error (a value that allows the amount of error to be calculated qualitatively, not a value representing the amount of error that is strictly defined) based on present-field data, delayed-field data, and previous-delayed-field data input thereto and based on intra-field-interpolated data supplied from the spatial interpolator 111 and the inter-field-interpolated data supplied from the temporal interpolator 112, and supplies the amount of error to the pixel generator 114.

The pixel generator 114 switches between intra-field-interpolated pixel data supplied from the spatial interpolator 111 and inter-field-interpolated pixel data supplied from the temporal interpolator 112 to generate output.

Next, the construction of the error processor 113 will be described with reference to FIG. 34.

An intra-field-interpolation temporal-transition analyzer 131 calculates transition representing temporal change in the pixel values of intra-field-interpolated pixels based on an intra-field-interpolated image consisting of the intra-field-interpolated pixels and based on present-field data and previous-delayed-field data, and supplies the transition to a mixer 134.

An inter-field-interpolation temporal-transition analyzer 132 calculates transition representing temporal change in the pixel values of inter-field-interpolated pixels based on an inter-field-interpolated image consisting of the inter-field-interpolated pixels and based on present-field data and previous-delayed-field data, and supplies the transition to the mixer 134.

An inter-field-interpolation spatial-transition analyzer 133 calculates transition representing spatial change in the pixel values of inter-field-interpolated pixels based on an inter-field-interpolated image consisting of the inter-field-interpolated pixels and based on present-field data and previous-delayed-field data, and supplies the transition to the mixer 134.

The mixer 134 calculates the amount of error based on the result of intra-field-interpolation temporal-transition analysis, the result of inter-field-interpolation temporal-transition analysis, and the result of inter-field-interpolation spatial-transition analysis, supplied from the intra-field-interpolation temporal-transition analyzer 131, the inter-field-interpolation temporal-transition analyzer 132, and the inter-field-interpolation spatial-transition analyzer 133, respectively, and supplies the amount of error to the pixel generator 114.

Figure 35:
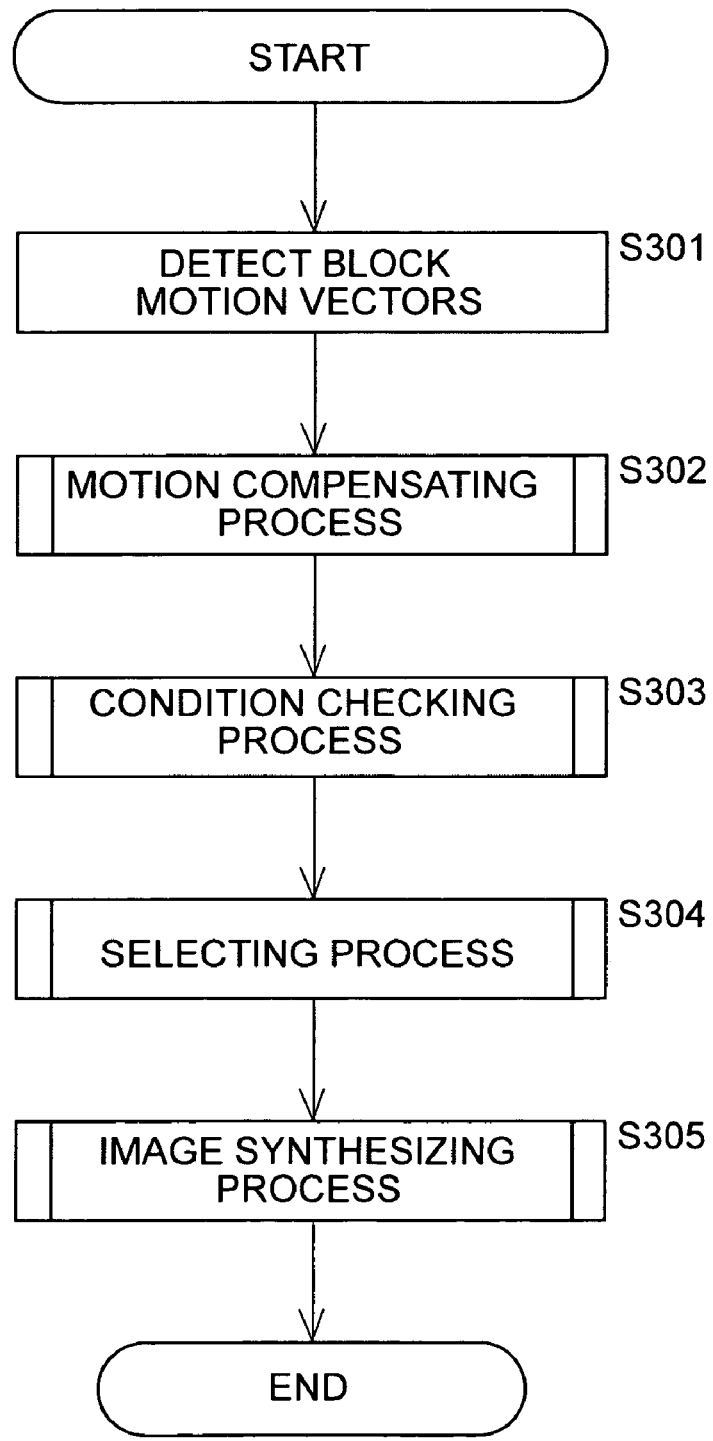
FIG. 35 is a flowchart of image processing executed by the image processing apparatus shown in FIG. 32.

Next, image processing executed by the image processing apparatus 20 shown in FIG. 32 will be described with reference to a flowchart shown in FIG. 35. Steps S301 to S304 in the flowchart shown in FIG. 35 correspond to steps S1 to S4 in the flowchart shown in FIG. 4, so that descriptions thereof will be omitted.

In step S305, the image synthesizer 101 executes an image synthesizing process.

Now, the image synthesizing process executed by the image synthesizer 101 will be described with reference to a flowchart shown in FIG. 36.

In step S321, the spatial interpolator 111 generates an intra-field-interpolated image using delayed-field data input thereto. That is, the spatial interpolator 111 generates a subject pixel on the delayed field by intra-field interpolation using pixels in the same field, and supplies the subject pixel to the error processor 113 and the pixel generator 114.

Figure 37:
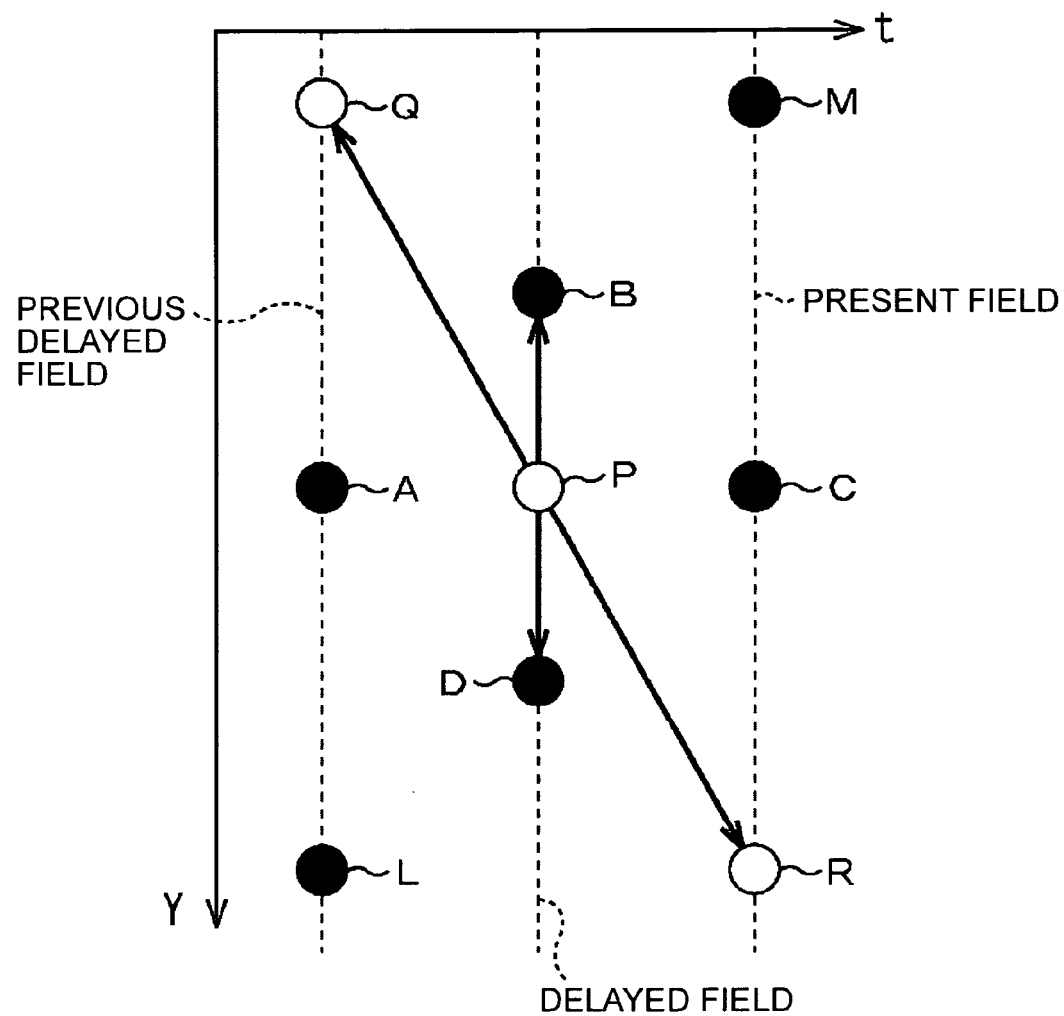
FIG. 37 is a flowchart of an image synthesizing process in step S305 in the flowchart shown in FIG. 35.

For example, when pixels are arranged on the previous delayed field, the delayed field, and the present field as shown in FIG. 37, the spatial interpolator 111 generates a pixel Ps as a subject pixel at an intermediate position between pixels B and D in the delayed field, the pixel Ps having an average pixel value between the pixel values of the pixels B and D.

In FIG. 37, the arrangements of pixels with respect to the vertical direction (i.e., Y direction) on the previous delayed field, the delayed field, and the present field are shown in that order along the temporal direction (the t axis in FIG. 37). On the previous delayed field, pixels Q, A, and L are arranged from the top as viewed in FIG. 37. On the delayed field, pixels B and D are arranged from the top as viewed in FIG. 37. On the present field, pixels M, C, and R are arranged from the top as viewed in FIG. 37. The previous delayed field and the present field have the same phase, so that pixels are arranged at corresponding positions with respect to the vertical direction. The delayed field has a different phase, so that the arrangement of pixels is shifted by one line. The same applies to subsequent similar figures.

In step S232, the temporal interpolator 112 generates a pixel on the delayed field by inter-field interpolation using pixels on the previous delayed field and the present field preceding and succeeding the delayed field, based on a motion vector supplied thereto, and supplies the pixel to the error processor 113 and the pixel generator 114. For example, when the motion vector has a start point at the pixel R and an end point at the pixel Q in FIG. 37, the temporal interpolator 112 generates a pixel Pt on the delayed field by taking an average pixel value between the pixel R on the preceding previous delayed field and the pixel Q on the succeeding present field. In FIG. 37, the pixels Ps and Pt are an intra-field-interpolated pixel and an inter-field-interpolated pixel, respectively, different from each other but located at the same position.

In step S323, the error processor 113 executes an error detecting process to calculate the amount of error, and supplies the amount of error to the pixel generator 114.

Now, the error detecting process executed by the error processor 113 will be described with reference to a flowchart shown in FIG. 38.

In step S341, the inter-field-interpolation spatial-transition analyzer 133 of the error processor 113 executes an inter-field-interpolation spatial-transition analyzing process to supply inter-field spatial-transition information obtained by the analysis to the mixer 134.

Figure 39:
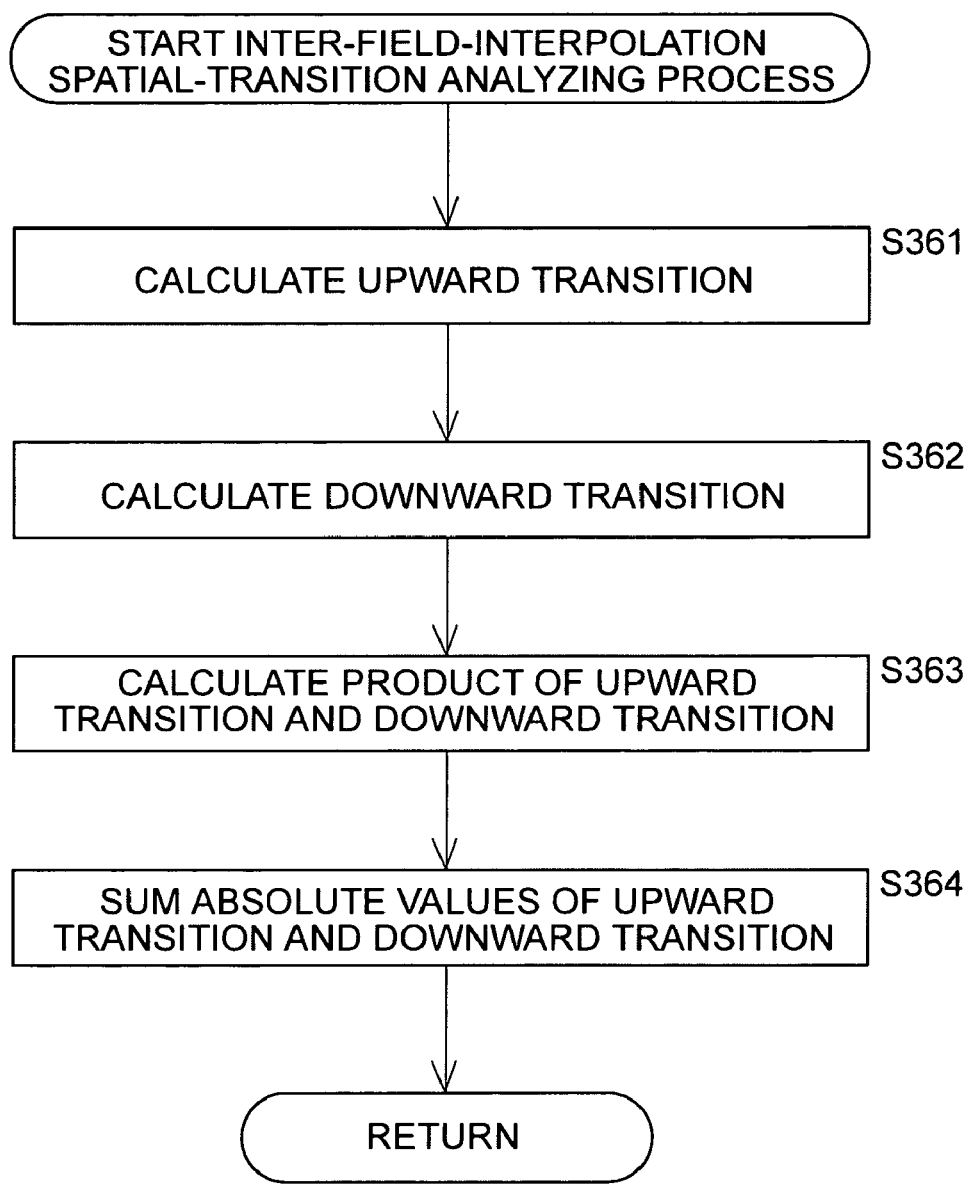
FIG. 39 is a flowchart of an inter-field-interpolation spatial-transition analyzing process in step S341 in the flowchart shown in FIG. 38.

Now, the inter-field-interpolation spatial-transition analyzing process executed by the inter-field-interpolation spatial-transition analyzer 133 will be described with reference to a flowchart shown in FIG. 39.

Figure 40:
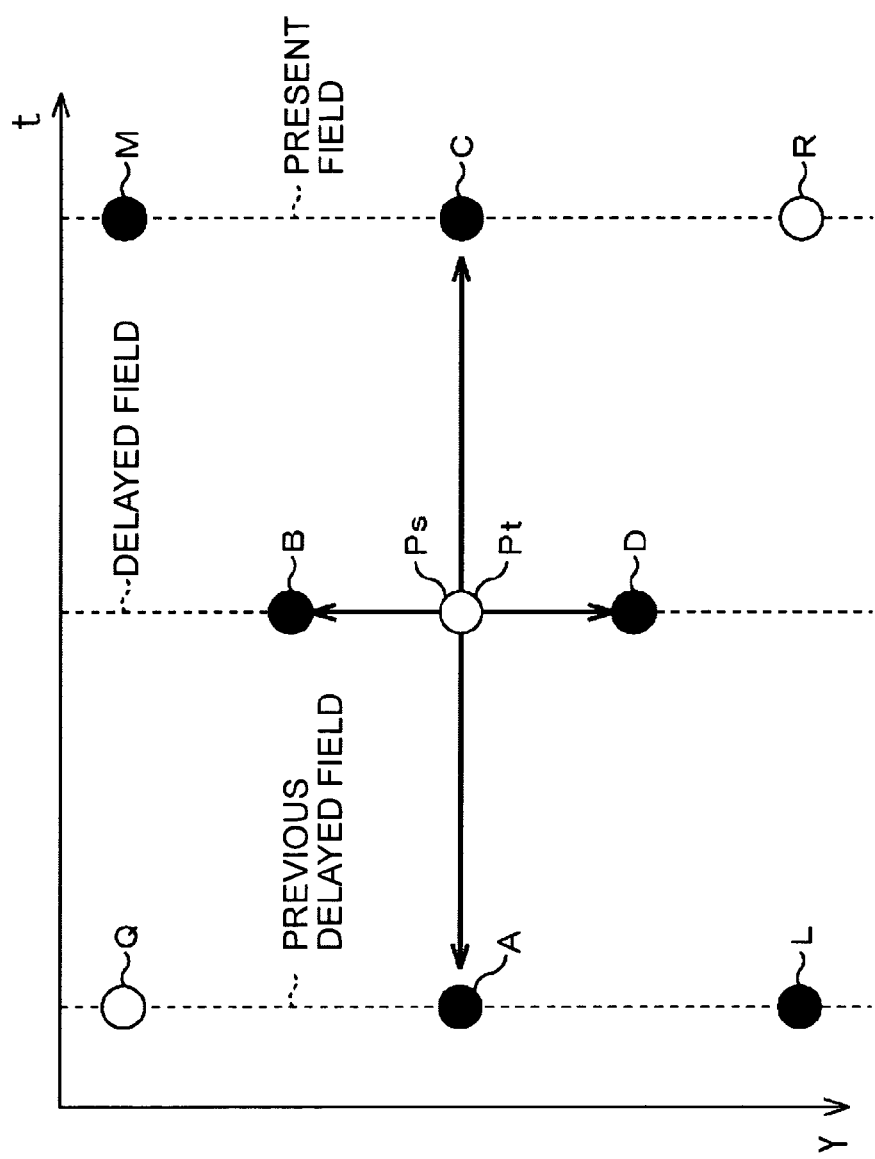
FIG. 40 is a flowchart of an inter-field-interpolation spatial-transition analyzing process in step S341 in the flowchart shown in FIG. 38.

In step S361, the inter-field-interpolation spatial-transition analyzer 133 calculates, as an upward transition, the difference between the pixel values of an inter-field-interpolated pixel on the delayed field, supplied from the spatial interpolator 111, and a spatially upward pixel on the delayed field. That is, when the inter-field-interpolated pixel Ps exists on the delayed field as shown in FIG. 40, the inter-field-interpolation spatial-transition analyzer 133 calculates the difference in pixel value with the spatially upward pixel B as an upward transition (Pt−B).

In step S362, the inter-field-interpolation spatial-transition analyzer 133 calculates, as a downward transition, the difference between the pixel values of the inter-field-interpolated pixel on the delayed field, supplied from the spatial interpolator 111, and a spatially downward pixel on the delayed field. That is, when the inter-field-interpolated pixel Ps exists on the delayed field as shown in FIG. 40, the inter-field-interpolation spatial-transition analyzer 133 calculates the difference in pixel value with the spatially downward pixel D as a downward transition (D−Pt).

In step S363, the inter-field-interpolation spatial-transition analyzer 133 calculates the product of the upward transition and the downward transition. That is, in the case of the example shown in FIG. 40, the inter-field-interpolation spatial-transition analyzer 133 calculates (D−Pt)×(Pt−B) as the product of the upward transition and the downward transition, and outputs the product to the mixer 134.

In step S364, the inter-field-interpolation spatial-transition analyzer 133 calculates the sum of the absolute values of the upward transition and the downward transition, and outputs the sum to the mixer 134. That is, in the case of the example shown in FIG. 40, the inter-field-interpolation spatial-transition analyzer 133 outputs to the mixer 134 a result of inter-field-interpolation spatial-transition analysis, expressed by equation (9) below:

$$\text{Result of inter-field-interpolation spatial-transition analysis} = |D-Pt| + |Pt-B| \qquad (9)$$

The inter-field-interpolation spatial-transition analyzer 133 outputs to the mixer 134 the sum of the absolute values of the upward transition and the downward transition and the product of the upward transition and the downward transition as a result of inter-field-interpolation spatial-transition analysis.

Figure 41:
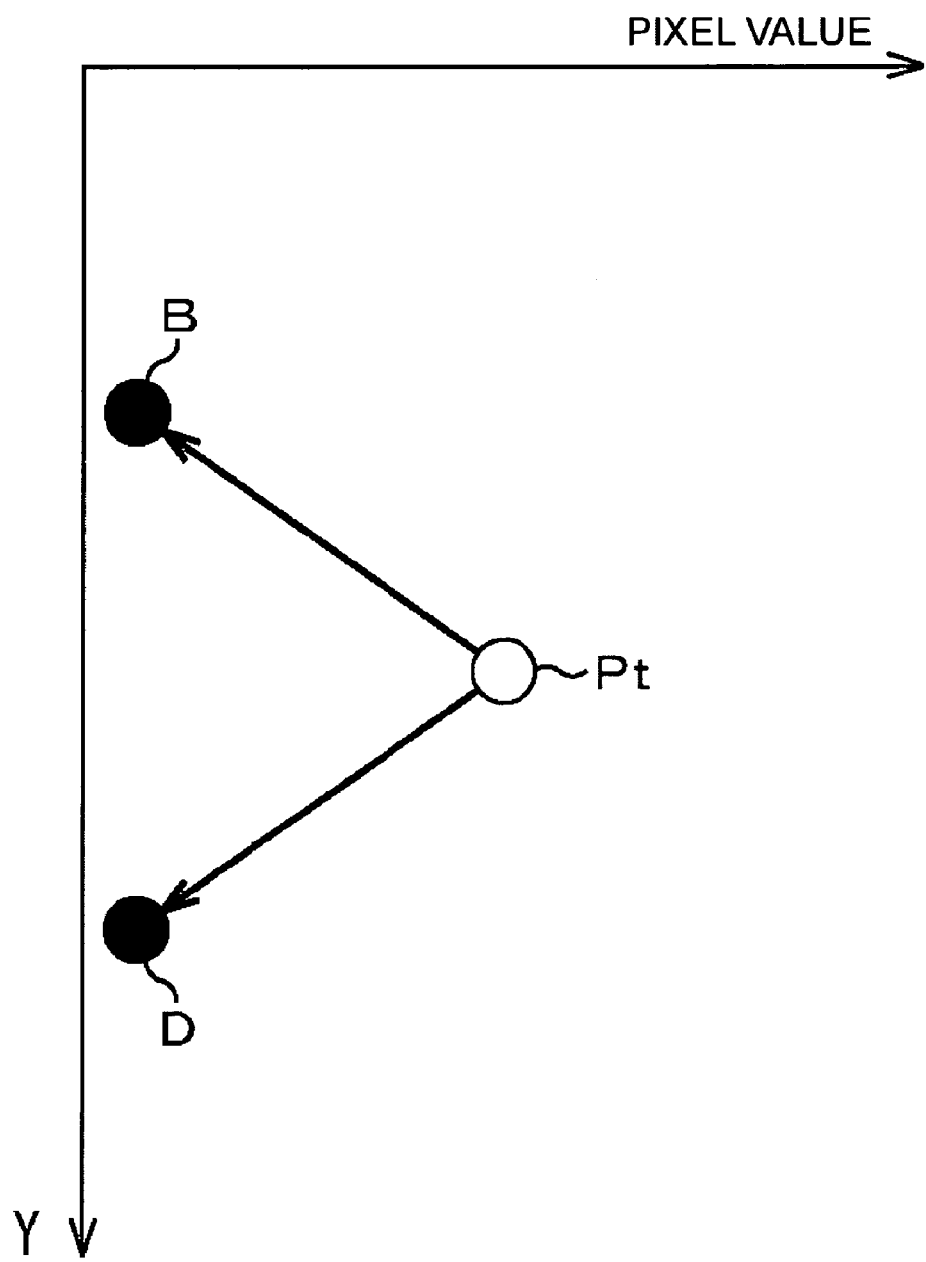
FIG. 41 is a flowchart of an inter-field-interpolation spatial-transition analyzing process in step S341 in the flowchart shown in FIG. 38.

That is, for example, as shown in FIG. 41, when change in the pixel values of the pixels B and D on the delayed field and the pixel value of the inter-field-interpolated pixel Pt is not a monotonic increase or a monotonic decrease, it is presumably probable that an unnatural pixel has been generated. Thus, when (D−Pt)×(Pt−B) as the product of the upward transition and the downward transition is a negative value, it is predicted that transition relating to the pixel generated could be unnatural. Furthermore, when the sum of the absolute values of the upward transition and the downward transition becomes larger, it is presumably probable that a more unnatural pixel has been generated. In FIG. 41, the vertical axis represents positions of pixels with respect to the spatial direction, and the horizontal axis represents pixel values.

Figure 38:
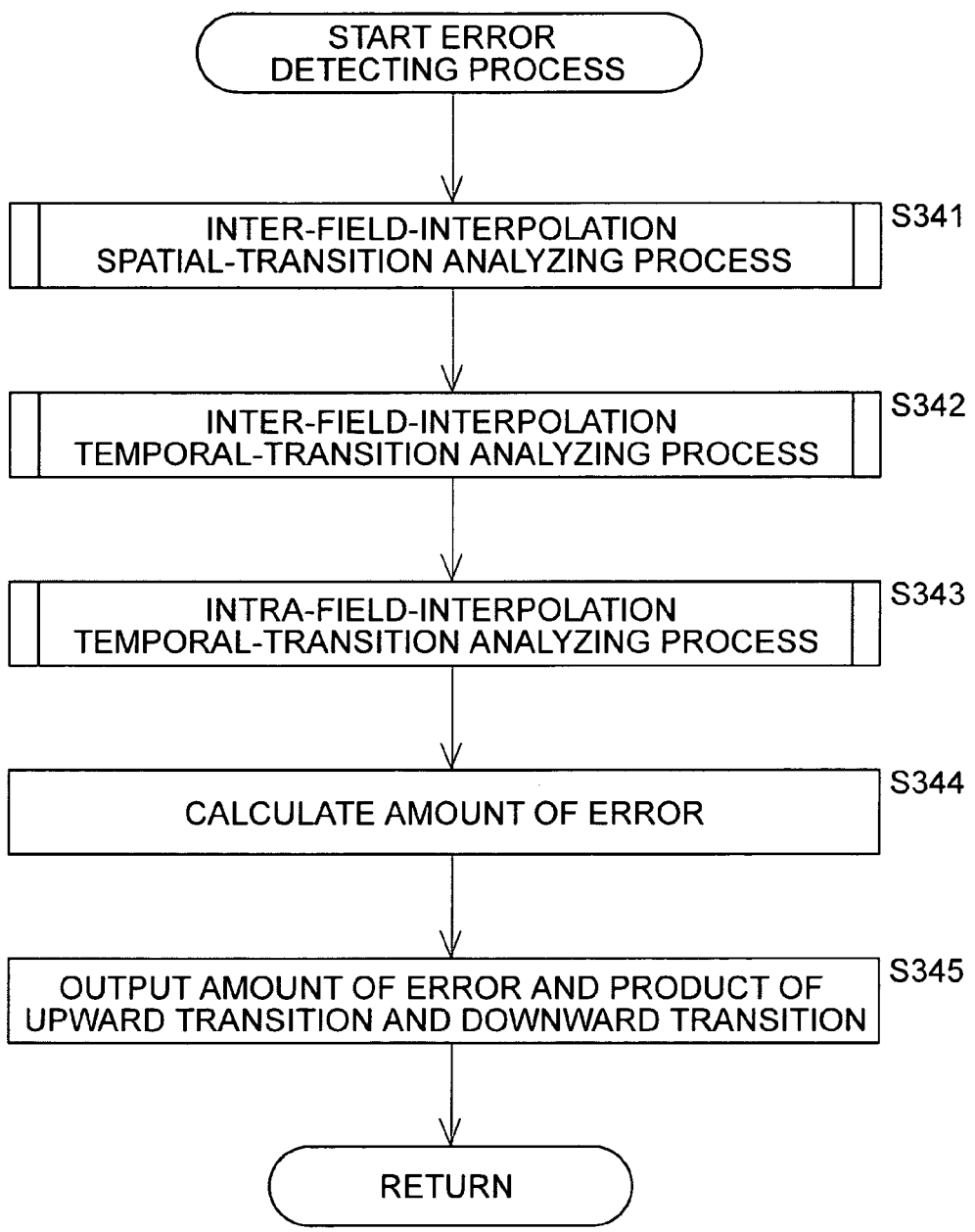
FIG. 38 is a flowchart of an error detecting process in step S323 in the flowchart shown in FIG. 36.

Now, the description returns to the flowchart shown in FIG. 38.

In step S342, the inter-field-interpolation temporal-transition analyzer 132 executes an inter-field-interpolation temporal-transition analyzing process to output a result of inter-field-interpolation temporal-transition analysis to the mixer 134.

Figure 42:
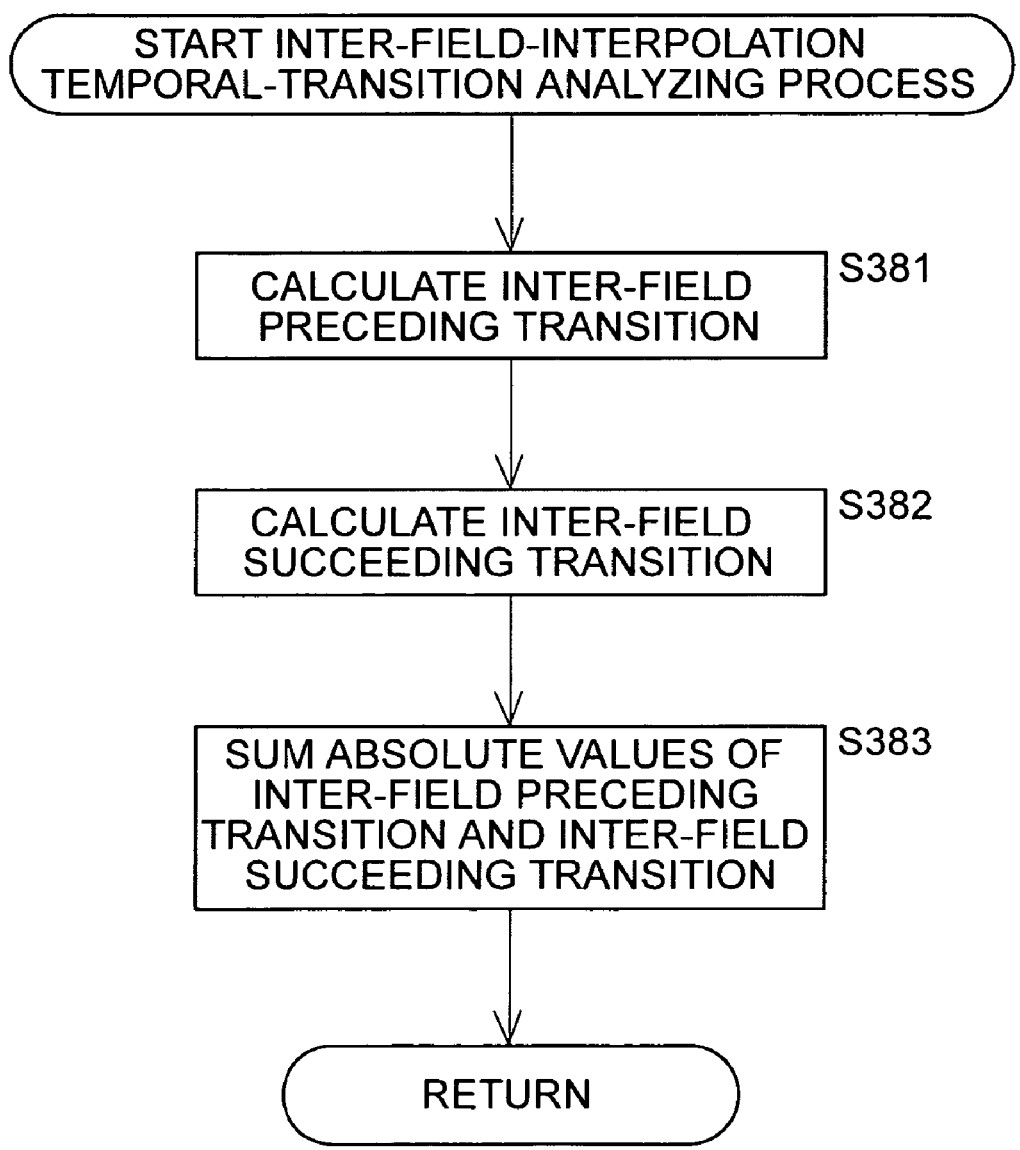
FIG. 42 is a flowchart of an inter-field-interpolation temporal-transition analyzing process in step S342 in the flowchart shown in FIG. 38.

Now, the inter-field-interpolation temporal-transition analyzing process executed by the inter-field-interpolation temporal-transition analyzer 132 will be described with reference to a flowchart shown in FIG. 42.

Figure 43:
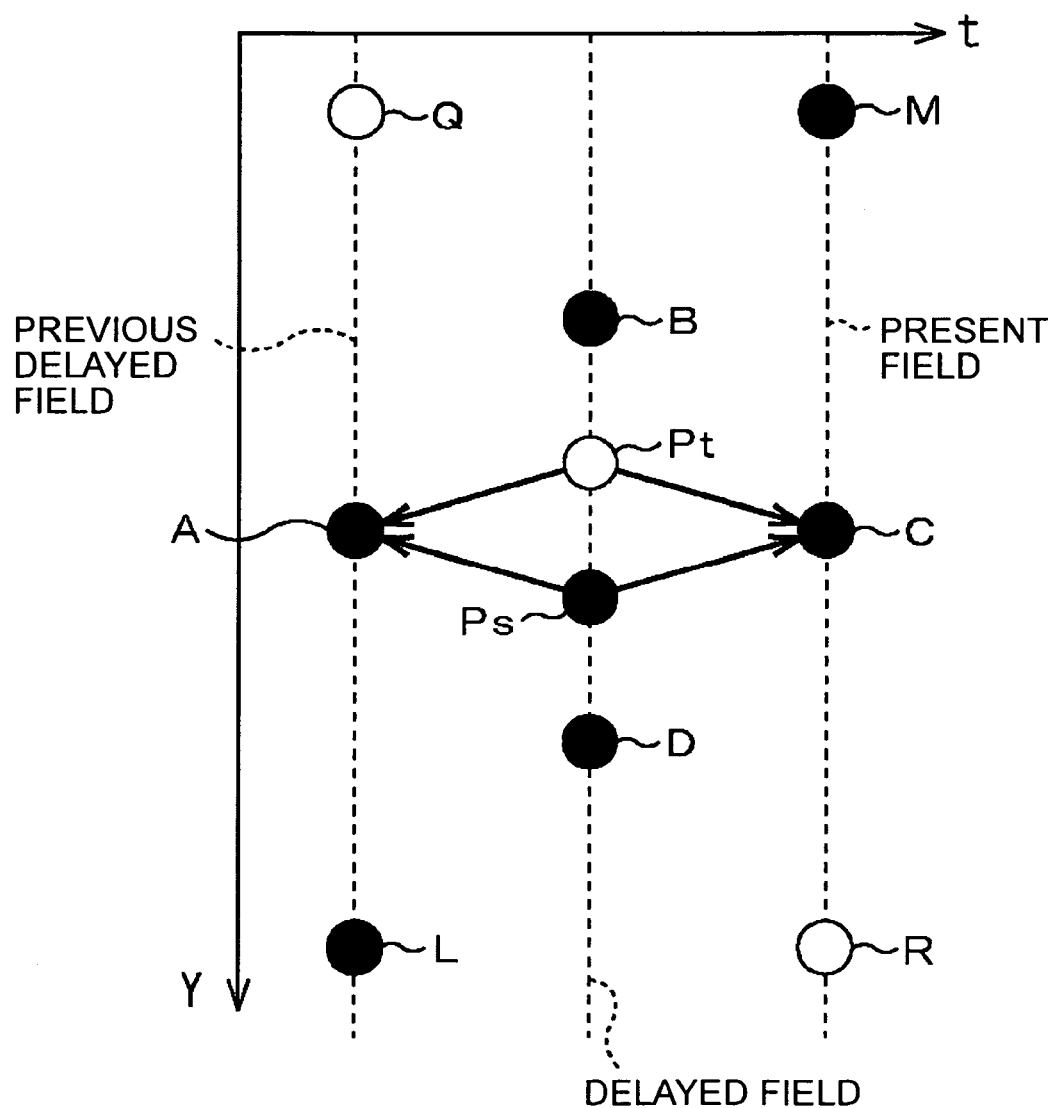
FIG. 43 is a flowchart of an inter-field-interpolation temporal-transition analyzing process in step S342 in the flowchart shown in FIG. 38.

In step S381, the inter-field-interpolation temporal-transition analyzer 132 calculates inter-field preceding transition. For example, the inter-field-interpolation temporal-transition analyzer 132 calculates the difference between the pixel values of the pixel Pt on the delayed field, generated by inter-field interpolation as a subject pixel, and the pixel A at the corresponding position on the temporally preceding previous delayed field, as an inter-field preceding transition (A−Pt), as shown in FIG. 43. In FIG. 43, the inter-field-interpolated pixel Pt and the intra-field-interpolated pixel Ps are shown at different positions for the convenience of description. Actually, however, the pixels Pt and Ps are both generated at the center between the pixels B and D on the delayed field.

In step S382, the inter-field-interpolation temporal-transition analyzer 132 calculates an inter-field succeeding transition. For example, the inter-field-interpolation temporal-transition analyzer 132 calculates the difference between the pixel values of the pixel Pt on the delayed field, generated by inter-field interpolation as a subject pixel, and the pixel C at the corresponding position on the temporally succeeding present field, as an inter-field succeeding transition (Pt−C), as shown in FIG. 43.

In step S383, the inter-field-interpolation temporal-transition analyzer 132 calculates the sum of the absolute values of the inter-field preceding transition and the inter-field succeeding transition, and supplies the sum to the mixer 134 as a result of inter-field-interpolation temporal-transition analysis.

That is, in the case of the example shown in FIG. 43, the inter-field-interpolation temporal-transition analyzer 132 calculates and supplies to the mixer 134, as a result of inter-field-interpolation temporal-transition analysis, the sum of the absolute values of the inter-field preceding transition and the inter-field succeeding transition, expressed by equation (10) below:

$$\text{Result of inter-field-interpolation temporal-transition analysis} = |A-Pt|+|Pt-C| \quad (10)$$

Figure 44:
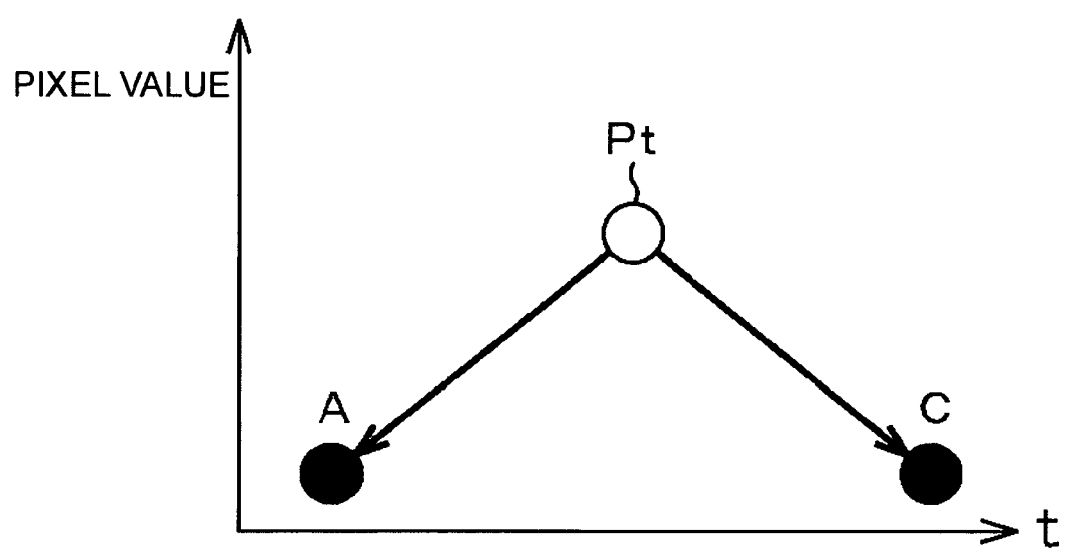
FIG. 44 is a flowchart of an inter-field-interpolation temporal-transition analyzing process in step S342 in the flowchart shown in FIG. 38.

For example, as shown in FIG. 44, when temporal change in the pixel values of the pixel A on the previous delayed field, the pixel Pt on the delayed field, and the pixel C is not a monotonic increase or a monotonic decrease, it is presumably probable that an unnatural pixel has been generated. Thus, when (A−Pt)×(Pt−C) as the product of the inter-field preceding transition and the inter-field succeeding transition is a negative value, it is predicted that transition relating to the pixel generated could be unnatural. Furthermore, when the sum of the absolute values of the inter-field preceding transition and the inter-field succeeding transition becomes larger, it is presumably probable that a more unnatural pixel has been generated. In FIG. 44, the vertical axis represents pixel values, and the horizontal axis represents positions with respect to the temporal direction.

Now, the description returns to the flowchart shown in FIG. 38.

In step S343, the intra-field-interpolation temporal-transition analyzer 131 executes an intra-field-interpolation temporal-transition analyzing process to output a result of intra-field-interpolation temporal-transition analysis to the mixer 134.

Figure 45:
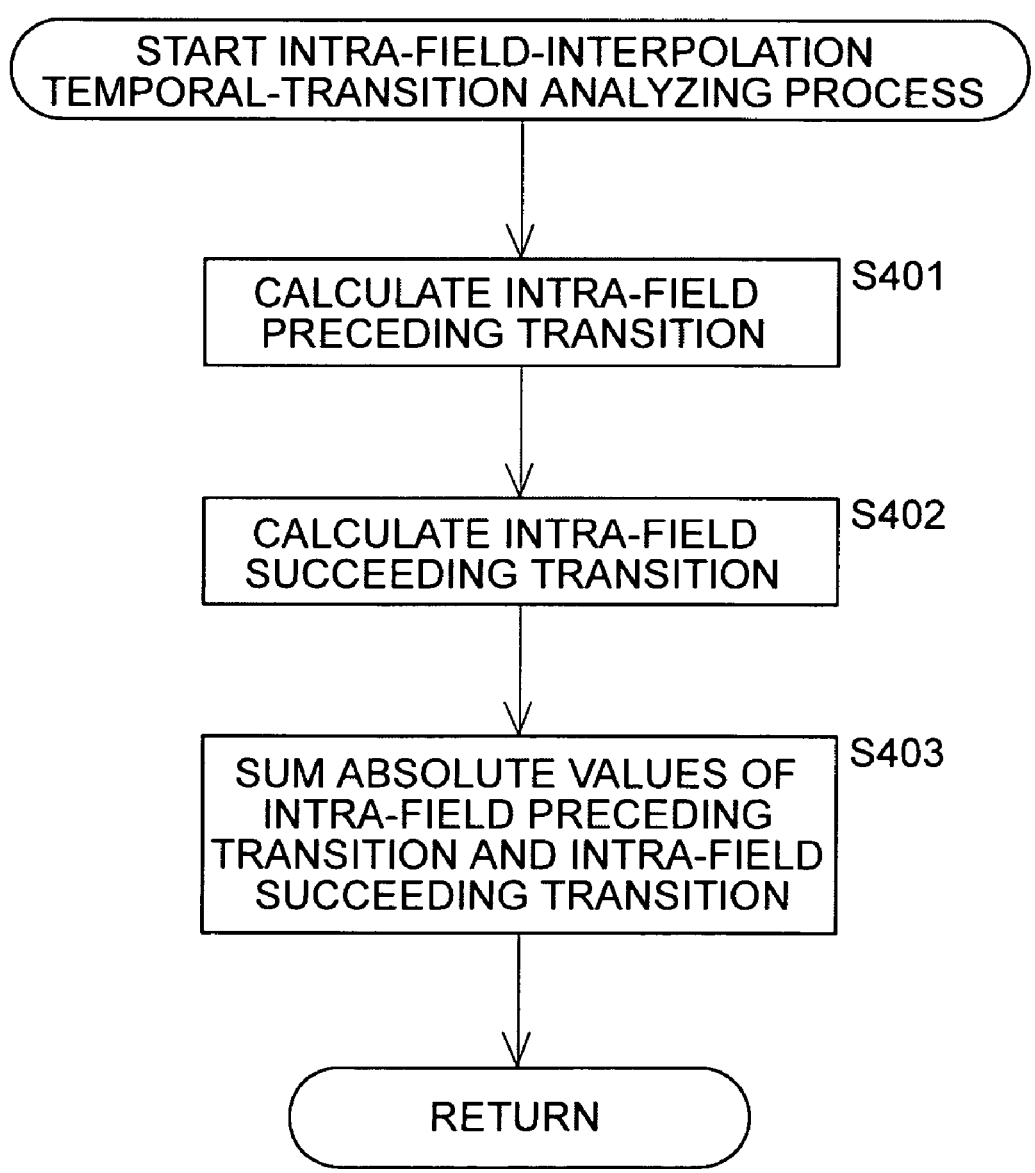
FIG. 45 is a flowchart of an intra-field-interpolation temporal-transition analyzing process in step S343 in the flowchart shown in FIG. 38.

Now, the intra-field-interpolation temporal-transition analyzing process executed by the intra-field-interpolation temporal-transition analyzer 131 will be described with reference to a flowchart shown in FIG. 45.

In step S401, the intra-field-interpolation temporal-transition analyzer 131 calculates an intra-field preceding transition. For example, the intra-field-interpolation temporal-transition analyzer 131 calculates the difference between the pixel values of the pixel Ps on the delayed field, generated by intra-field interpolation as a subject pixel, and the pixel A at the corresponding position on the temporally preceding previous delayed field, as an intra-field preceding transition (A−Ps), as shown in FIG. 43.

In step S402, the intra-field-interpolation temporal-transition analyzer 131 calculates an intra-field succeeding transition. For example, the intra-field-interpolation temporal-transition analyzer 131 calculates the difference between the pixel values of the pixel Ps on the delayed field, generated by intra-field interpolation as a subject pixel, and the pixel C at the corresponding position on the temporally succeeding present field, as an intra-field succeeding transition (Ps−C), as shown in FIG. 43.

In step S403, the intra-field-interpolation temporal-transition analyzer 131 calculates the sum of the absolute values of the intra-field preceding transition and the intra-field succeeding transition, and supplies the sum to the mixer 134 as a result of intra-field-interpolation temporal-transition analysis.

That is, in the case of the example shown in FIG. 43, the intra-field-interpolation temporal-transition analyzer 131 calculates and outputs to the mixer 134, as a result of intra-field-interpolation temporal-transition analysis, the sum of the absolute values of the intra-field preceding transition and the intra-field succeeding transition, expressed by equation (11) below:

$$\text{Result of intra-field-interpolation temporal-transition analysis} = |A-Ps|+|Ps-C| \quad (11)$$

Figure 46:
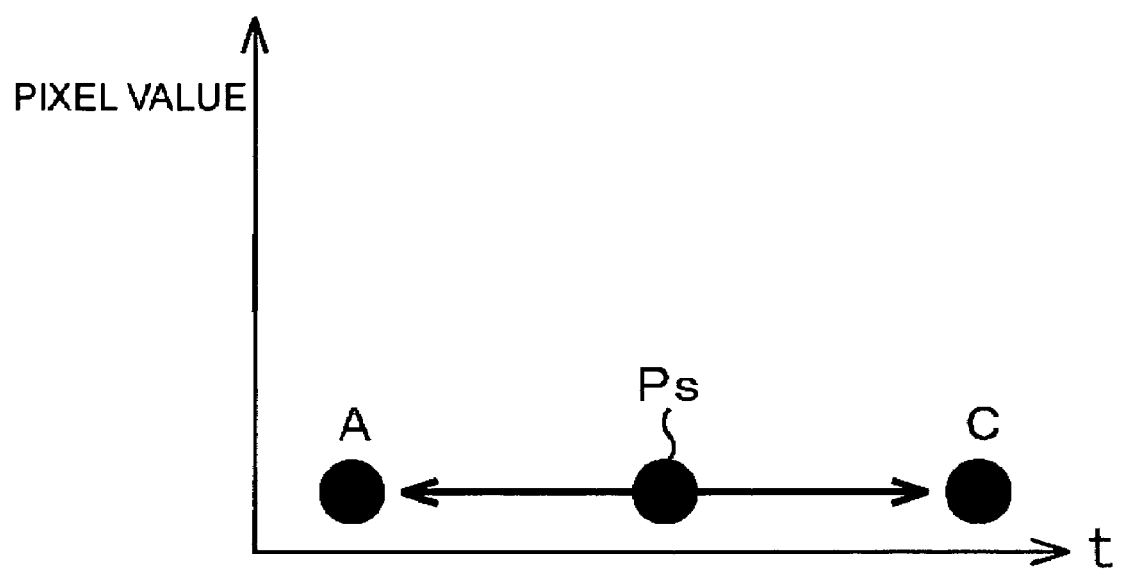
FIG. 46 is a flowchart of an intra-field-interpolation temporal-transition analyzing process in step S343 in the flowchart shown in FIG. 38.

For example, as shown in FIG. 46, when temporal change in the pixel values of the pixel A on the previous delayed field, the pixel Ps on the delayed field, and the pixel C is a monotonic increase or a monotonic decrease, it is presumably probable that change in the pixel values is small and that a temporally natural pixel has been generated. Thus, when (A−Ps)×(Ps−C) as the product of the intra-field preceding transition and the intra-field succeeding transition is a positive value, it is predicted that transition relating to the pixel generated could be natural. Furthermore, when the sum of the absolute values of the intra-field preceding transition and the intra-field succeeding transition becomes larger, it is presumably probable that a more unnatural pixel has been generated. In FIG. 46, the vertical axis represents pixel values, and the horizontal axis represents positions with respect to the temporal direction.

Now, the description returns to the flowchart shown in FIG. 38.

In step S344, the mixer 134 calculates the amount of error based on the result of intra-field-interpolation temporal-transition analysis, the result of inter-field-interpolation temporal-transition analysis, and the result of inter-field-interpolation spatial-transition analysis supplied thereto, by equation (12) below:

$$\text{Amount of error} = \frac{K \times ((\text{Result of inter-field-interpolation temporal-transition analysis}) \times (\text{Result of inter-field-interpolation spatial-transition analysis}))}{(\text{result of intra-field-interpolation temporal-transition analysis})} \quad (12)$$

where K is a constant that changes the amount of error. For example, the reliability of motion vectors is chosen as the constant K.

The amount of error expressed by equation (12) indicates a ratio of the reliability of inter-field-interpolated pixels to the reliability of intra-field-interpolated pixels, and it qualitatively indicates the degree of error, not the number of occurrences of error in actual image processing. However, as the amount of error expressed by equation (12) increases, the reliability of inter-field-interpolated pixels decreases, and as the amount of error decreases, the reliability of inter-field-interpolated pixels increases.

Thus, by switching to use inter-field-interpolated pixels or intra-field-interpolated pixels based on the amount of error, an image generated becomes more natural.

In step S345, the mixer 134 outputs the product of the upward transition and the downward transition calculated in the inter-field-interpolation spatial-transition analyzing process, together with the amount of error calculated in step S344, to the pixel generator 114.

By the process described above, the amount of error that occurs in each pixel due to interpolation of an image consisting of inter-field-interpolated pixels and an image consisting of intra-field-interpolated pixels is calculated.

Figure 36:
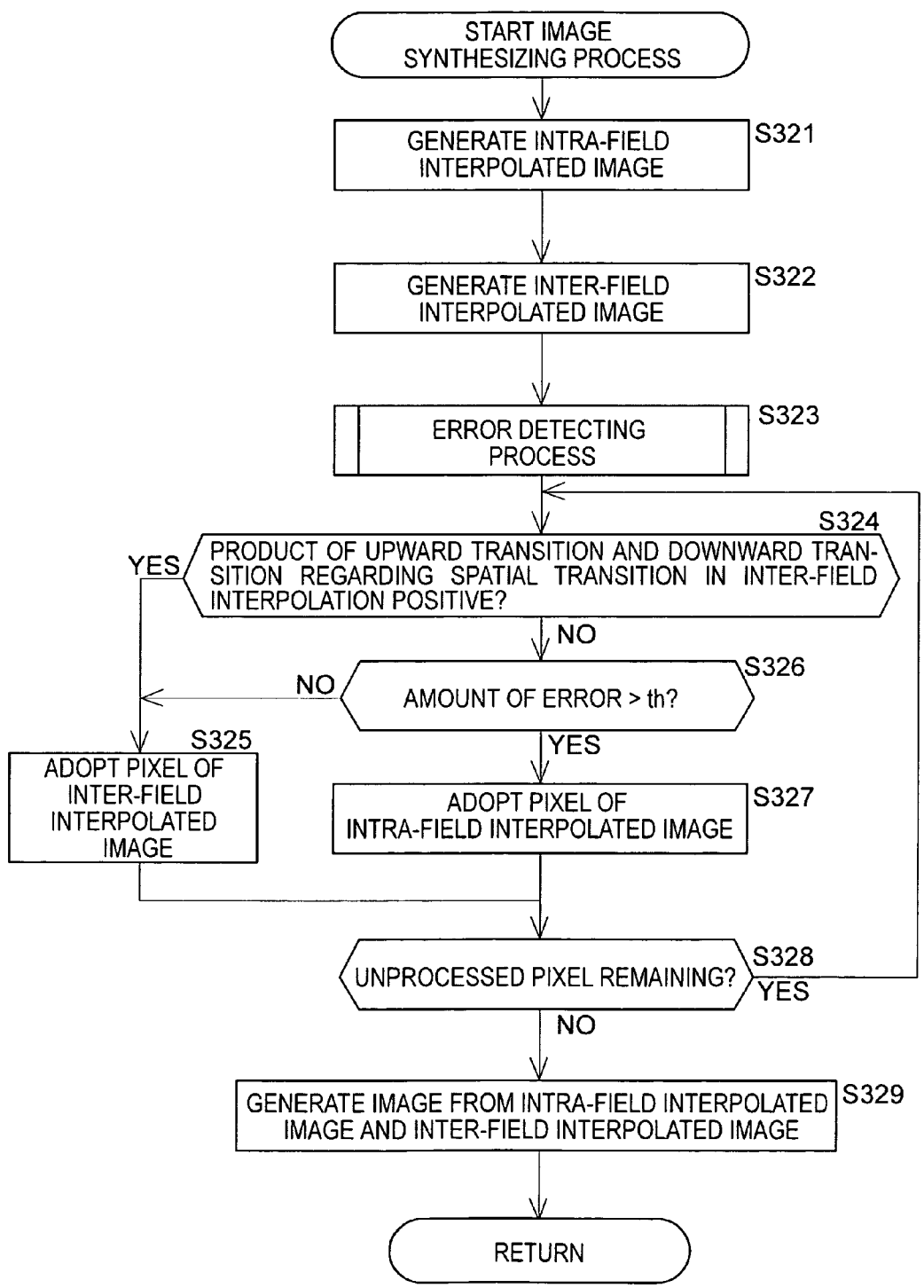
FIG. 36 is a flowchart of an image synthesizing process in step S305 in the flowchart shown in FIG. 35.

Now, the description returns to the flowchart shown in FIG. 36.

In step S324, with regard to an unprocessed pixel, the pixel generator 114 determines whether the product of the upward transition and the downward transition in inter-field spatial transition, supplied from the inter-field-interpolation spatial-transition analyzer 133, is positive. When it is determined that the product is positive, in step S325, the pixel generator 114 adopts the pixel of the inter-field-interpolated image, supplied from the temporal interpolator 112. That is, since the pixel value of the inter-field-interpolated pixel monotonically increases or monotonically decreases in relation to the pixel values of spatially adjacent pixels, it is probable that a spatially natural pixel has been generated, so that the inter-field-interpolated pixel is used as it is.

On the other hand, when it is determined in step S324 that the product of the upward transition and the downward transition is not positive, in step S326, the pixel generator 114 determines whether the amount of error is greater than the threshold th. When it is determined that the amount of error is greater than the threshold th, the process proceeds to step S327.

In step S327, the pixel generator 114 adopts the intra-field-interpolated pixel supplied from the spatial interpolator 111. That is, the amount of error being greater than the predetermined threshold th indicates that the amount of error of inter-field-interpolated pixels exhibits a greater ratio than the amount of error of intra-field-interpolated pixels, so that the intra-field-interpolated pixel is adopted.

On the other hand, when it is determined in step S326 that the amount of error is not greater than the predetermined threshold th, it is indicated that the amount of error of inter-field-interpolated pixels is not greater than the amount of error of intra-field-interpolated pixels. Thus, the process proceeds to step S325, in which the pixel generator 114 adopts the inter-field-interpolated pixel as the subject pixel.

In step S328, the pixel generator 114 determines whether an unprocessed pixel that has not yet been generated exists. When it is determined that an unprocessed pixel exists, the process returns to step S324, and the subsequent steps are repeated. On the other hand, when it is determined that an unprocessed pixel does not exists, in step S329, the pixel generator 114 outputs an image consisting of pixels generated.

Figure 47:
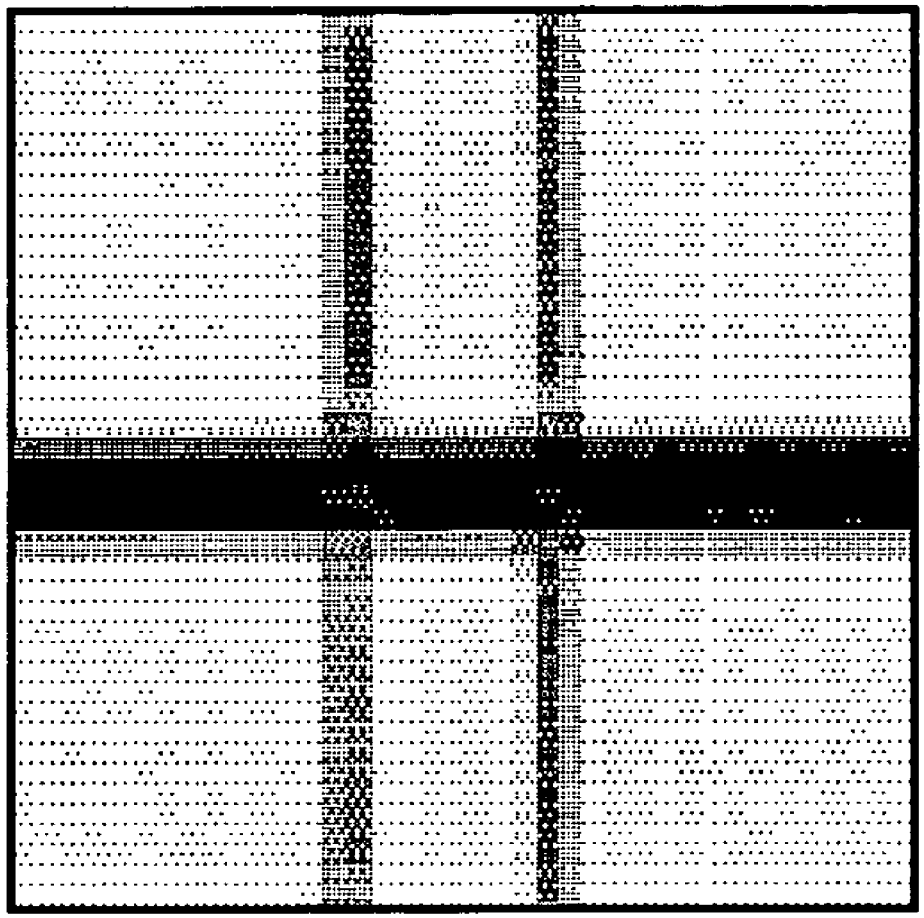
FIG. 47 is a diagram showing an example of image input to the image processing apparatus shown in FIG. 32.

By calculating the amount of error based on temporal or spatial relationship of a pixel generated, it is possible to adaptively switch interpolation method. This serves to suppress generation of unnatural pixels. For example, when a grating-like image shown in FIG. 47 is enlarged by converting resolution, according to the related art, pixel values of pixels generated by inter-field interpolation are unnatural, as shown in FIG. 48, exhibiting pixels with mottle error.

Figure 48:
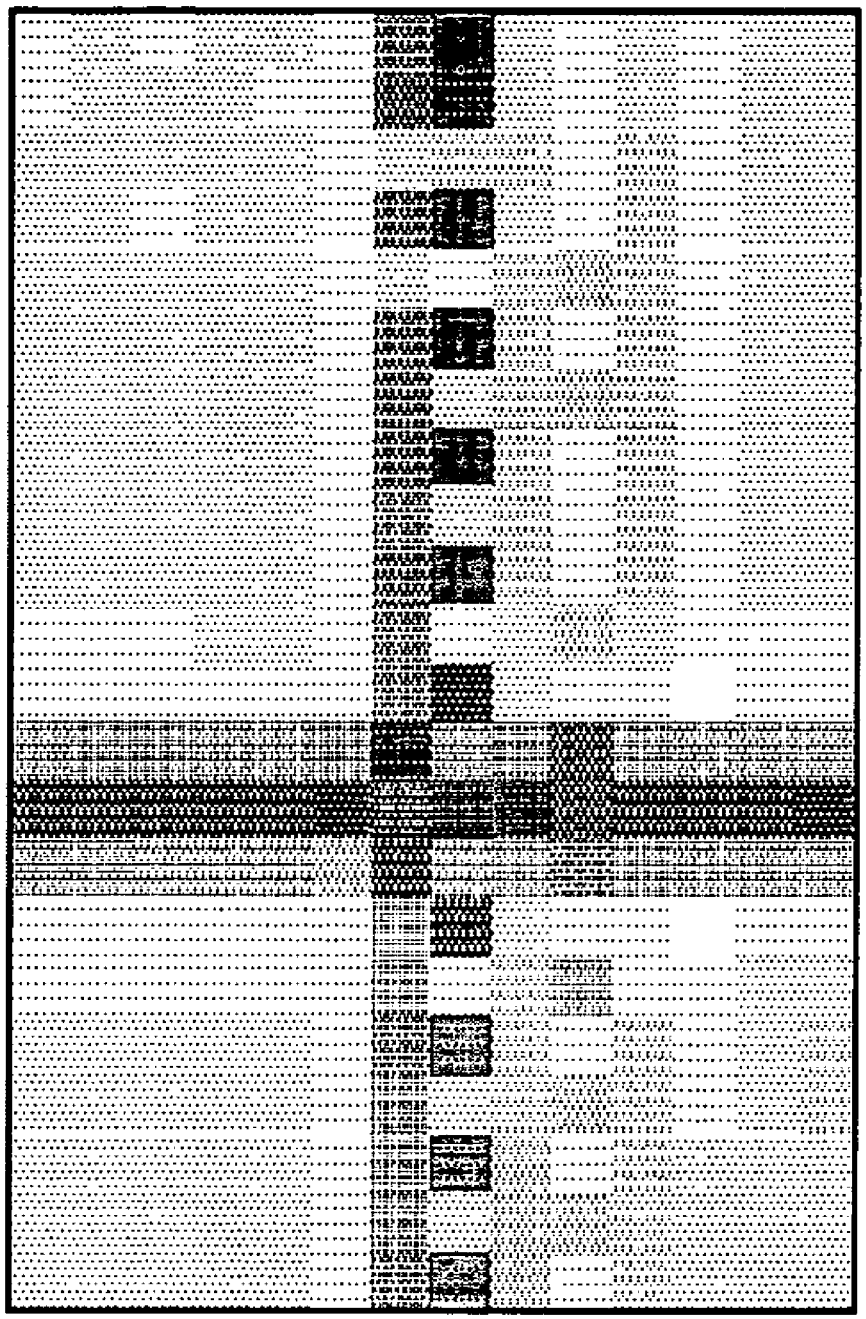
FIG. 48 is a diagram showing an example of image obtained by converting the resolution of the image shown in FIG. 47 by a processing method according to the related art.
Figure 49:
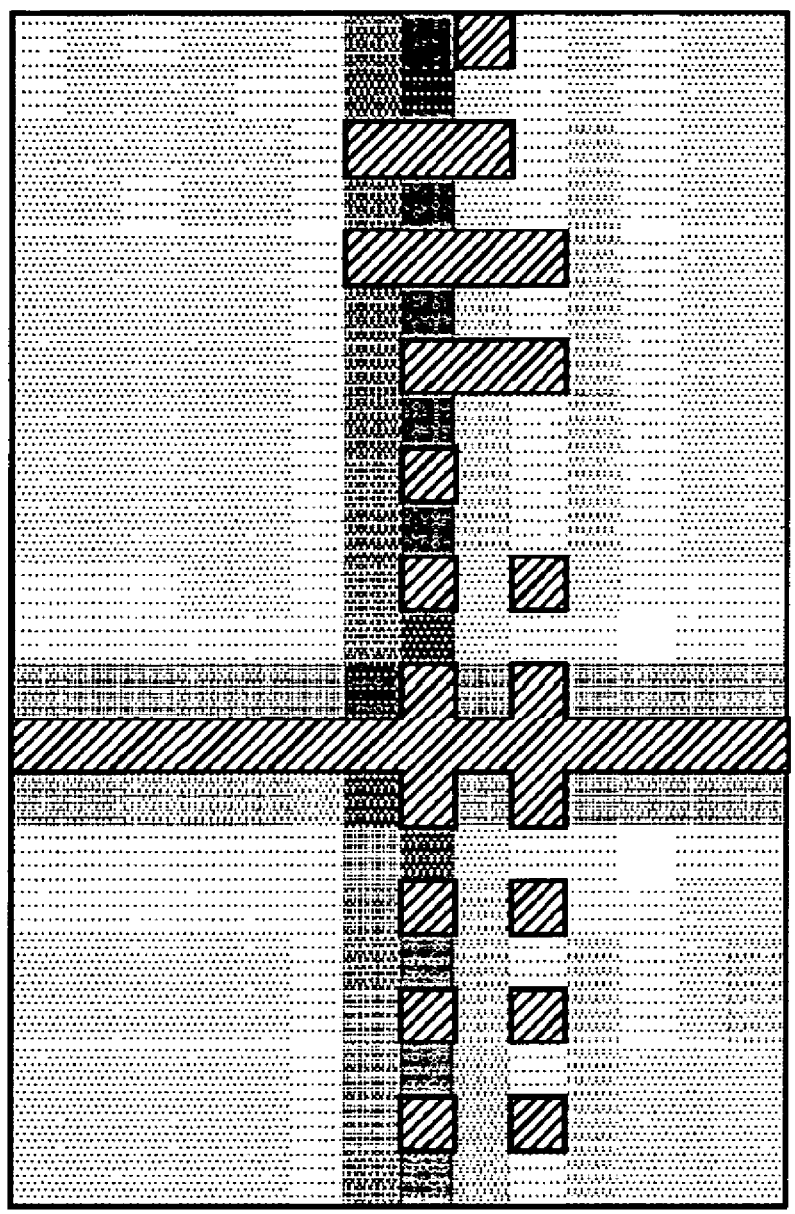
FIG. 49 is a diagram showing an example of processed image indicating pixels having amounts of error exceeding a predetermined value when the inter-field-interpolation spatial-transition analyzing process is executed by the image processing apparatus shown in FIG. 32.
Figure 50:
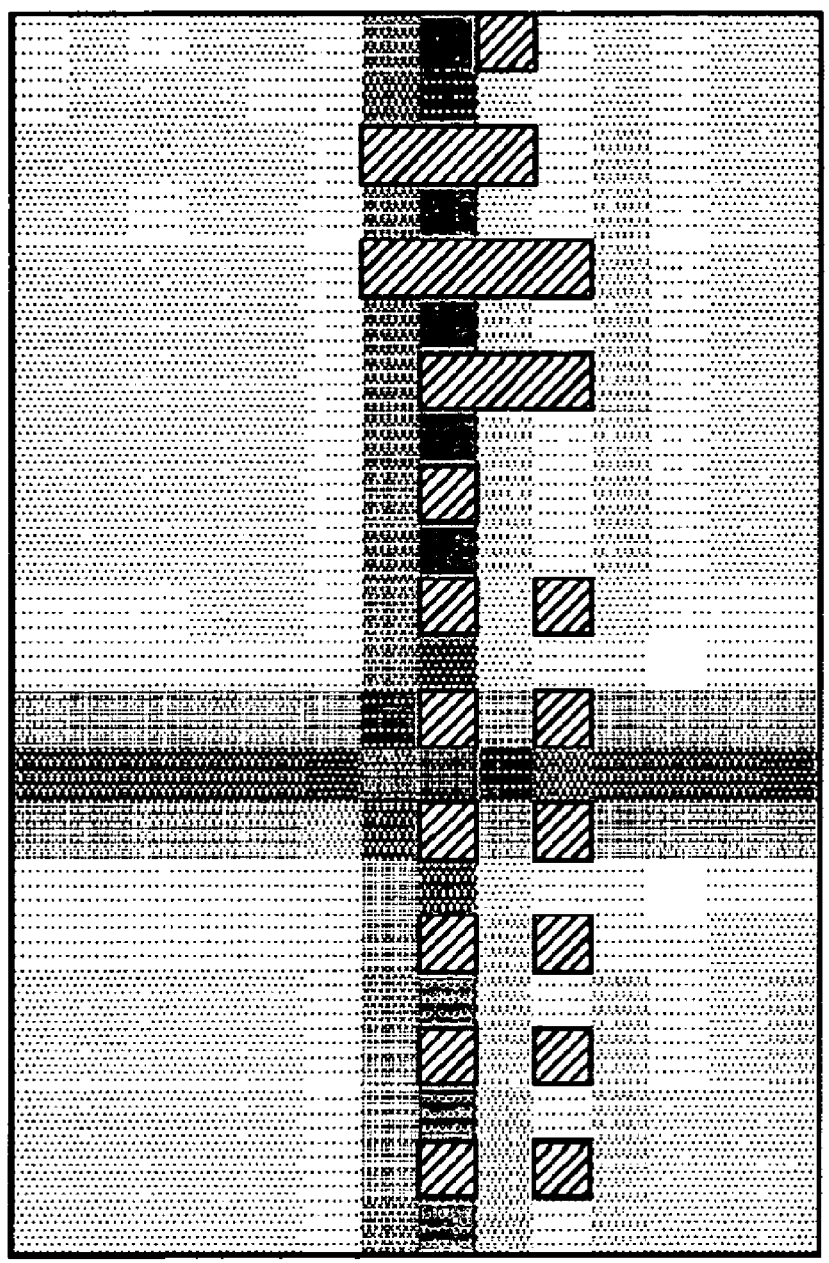
FIG. 50 is a diagram showing an example of processed image indicating pixels having amounts of error exceeding a predetermined value when the inter-field-interpolation temporal-transition analyzing process is executed by the image processing apparatus shown in FIG. 32.

FIG. 49 shows the distribution of pixels exceeding the predetermined threshold (i.e., for which error has occurred) among the pixels in the image shown in FIG. 48 according to the result of inter-field-interpolation spatial transition. In FIGS. 49 and 50, hatched regions indicate pixels for which error has occurred.

FIG. 50 shows the distribution of pixels exceeding the predetermined threshold (i.e., for which error has occurred) among the pixels in the image shown in FIG. 48 according to the result of inter-field-interpolation temporal transition.

Figure 51:
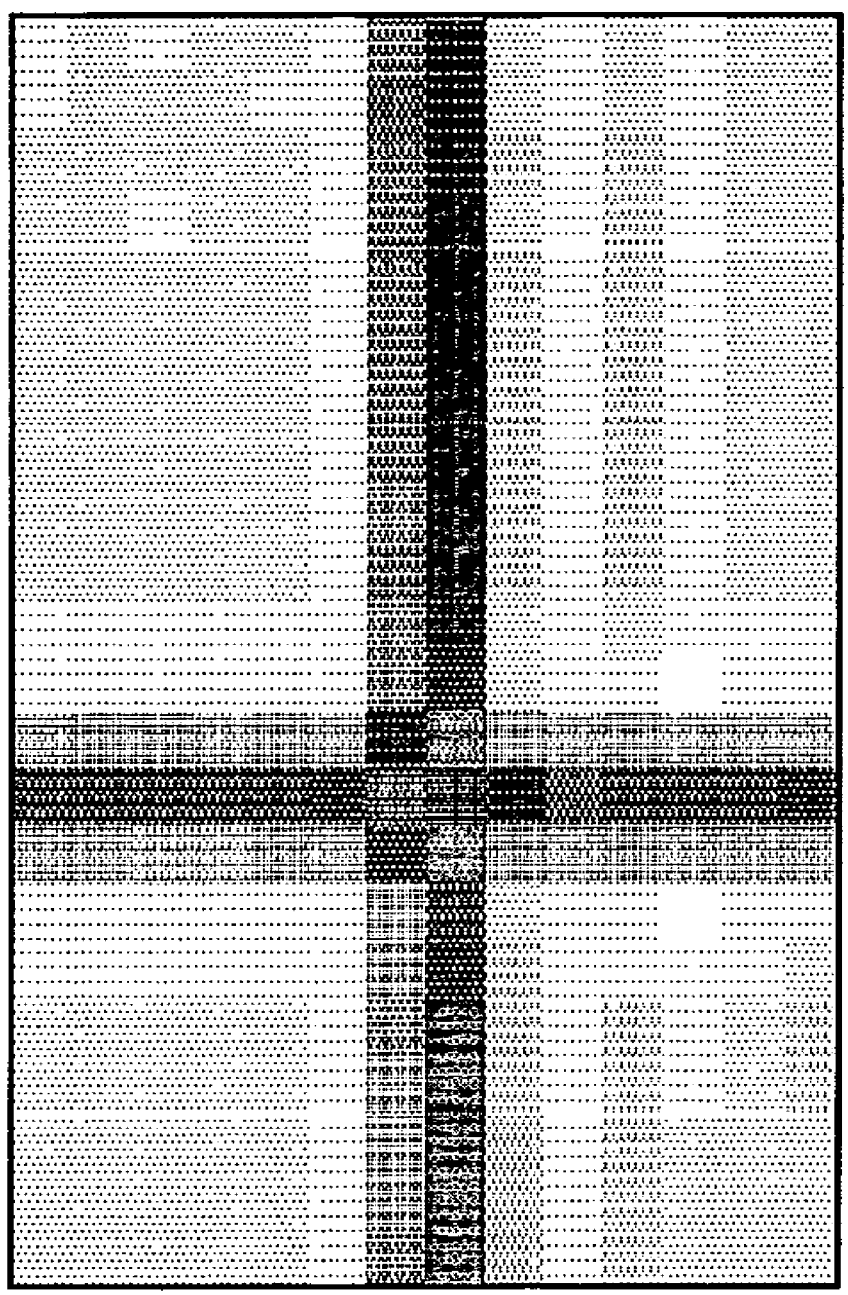
FIG. 51 is a diagram showing an example of image obtained by converting resolution by adopting pixels obtained by different interpolation methods based on the amount of error by the image processing apparatus shown in FIG. 32.

Thus, the amount of error is considered as exceeding the threshold th for each of the pixels indicating error in FIGS. 49 and 50. Thus, in either of the cases shown in FIGS. 49 and 50, by generating the pixels by intra-field interpolation, mottle error is suppressed, for example, as shown in FIG. 51.

Although the above example has been described in the context of switching between intra-field-interpolated pixels and inter-field-interpolated pixels based on the amount of error, alternatively, for example, pixels may be generated by mixing intra-field-interpolated pixels and inter-field-interpolated pixels at varying ratios based on the amount of error.

Furthermore, although two fields are used when generating pixels by inter-field interpolation in the example described above, a large number of fields may be used for inter-field interpolation.

According to what has been described above, it is possible to calculate the amount of error in each inter-field-interpolated pixel or intra-field-interpolated pixel. Furthermore, it is possible to generate pixels by switching the method of generating pixels (i.e., interpolating method) based on the amount of error calculated.

The series of processes described above can be executed either by hardware or by software. When the series of processes is executed by software, programs constituting the software are installed on a computer embedded in special hardware, or are installed from a recording medium to a general-purpose personal computer or the like that allows executing various functions with various programs installed thereon.

FIG. 52 shows the construction of a personal computer according to an embodiment of the present invention, in which the electrical construction of the image processing apparatus 20 shown in FIG. 2 or FIG. 32 is implemented in software. A central processing unit (CPU) 501 of the personal computer controls the overall operation of the personal computer. The CPU 501, upon receiving a command entered by a user from an input unit 506 including, for example, a keyboard and a mouse, via a bus 504 and an input/output interface 505, executes a corresponding program stored in a read-only memory (ROM) 502. Alternatively, the CPU 501 loads into a random access memory (RAM) 503 and executes a program read from a magnetic disk 521, an optical disk 522, a magneto-optical disk 523, or a semiconductor memory 524 connected to a drive 510 and installed in a storage unit 508. Thus, the functions of the image processing apparatus 20 shown in FIG. 2 or FIG. 32 are implemented in software. Furthermore, the CPU 501 controls a communication unit 509 to communicate and exchange data with external devices.

The programs are recorded on a recording medium that is distributed separately from the computer to provide the programs to a user, for example, a package medium such as the magnetic disk 521 (e.g., a flexible disk), the optical disk 522 (e.g., a compact disc read-only memory (CD-ROM) or a digital versatile disk (DVD)), the magneto-optical disk 523 (e.g., a mini disc (MD)), or the semiconductor memory 524, as shown in FIG. 52. Alternatively, the recording medium carrying the programs may be the ROM 502 or a hard disk included in the storage unit 508, provided to the user as included in the computer.

Steps that are executed according to the programs recorded on the recording medium need not necessarily be executed sequentially in the order described, and may include steps that are executed in parallel or individually.

What is claimed is:

1. An image processing apparatus comprising:
   block-motion-vector detecting means for detecting, by block matching, respective block motion vectors of a block including a subject pixel and a plurality of blocks adjacent to the block including the subject pixel;
   difference calculating means for calculating difference between pixel values of a pixel on a first field and a pixel on a second field, these pixels being used to generate the subject pixel, based on each of the block motion vectors detected by the block-motion-vector detecting means;
   pixel-motion-vector selecting means for selecting, as a pixel motion vector of the subject pixel, one of the block motion vectors that minimizes the difference calculated by the difference calculating means;
   inter-field-interpolation pixel generating means for generating a pixel value of the subject pixel by inter-field interpolation using the pixel on the first field and the pixel on the second field, based on the pixel motion vector selected by the pixel-motion-vector selecting means;
   intra-field-interpolation pixel generating means for generating a pixel value of the subject pixel by intra-field interpolation using pixels vertically or horizontally adjacent to the subject pixel;
   amount-of-error calculating means for calculating an amount of error that occurs, based on the pixel value of the subject pixel generated by the inter-field-interpolation pixel generating means, pixel values of the pixels vertically or horizontally adjacent to the subject pixel, the pixel value of the subject pixel generated by the intra-field-interpolation pixel generating means, and pixel values of pixels on fields temporally preceding and succeeding a field where the subject pixel exists, the pixels being located at positions corresponding to the subject pixel; and
   pixel-value determining means for determining a pixel value of the subject pixel based on the amount of error calculated by the amount-of-error calculating means, using the pixel value generated by the intra-field-interpolation pixel generating means and the pixel value generated by the inter-field-interpolation pixel generating means.

2. The image processing apparatus according to claim 1, further comprising auxiliary-information generating means for generating respective pieces of auxiliary information for the pixel on the first field and the pixel on the second field, wherein the pixel-motion-vector selecting means selects, as a pixel motion vector of the subject pixel, one of the block motion vectors with which the piece of auxiliary information for the pixel on the first field and the piece of auxiliary information for the pixel on the second field coincide with each other and with which the difference calculated by the difference calculating means is minimized.

3. The image processing apparatus according to claim 2, wherein the respective pieces of auxiliary information are codes representing directions of edges for the respective pixels.

4. The image processing apparatus according to claim 2, further comprising pixel-motion-vector calculating means for calculating a pixel motion vector of the subject pixel by smoothing the block motion vectors of the plurality of blocks in accordance with distances between the subject pixel and respective reference positions of the plurality of blocks when the piece of auxiliary information for the pixel on the first field and the piece of auxiliary information for the pixel on the second field do not coincide with each other.

5. The image processing apparatus according to claim 1, further comprising:
   inter-field-interpolated-pixel spatial-transition-information calculating means for calculating, as inter-field-interpolated-pixel spatial-transition information, a sum of absolute values of differences between the pixel value of the subject pixel generated by the inter-field-interpolation pixel generating means and the pixel values of the pixels vertically or horizontally adjacent to the subject pixel;
   inter-field-interpolated-pixel temporal-transition-information calculating means for calculating, as inter-field-interpolated-pixel temporal-transition information, a sum of absolute values of differences between the pixel value of the subject pixel generated by the inter-field-interpolation pixel generating means and the pixel values of the pixels on the fields temporally preceding and succeeding the field where the subject pixel exists, the pixels being located at the positions corresponding to the subject pixel; and intra-field-interpolated-pixel temporal-transition-information calculating means for calculating, as intra-field-interpolated-pixel temporal-transition information, a sum of absolute values of differences between the pixel value of the subject pixel generated by the intra-field-interpolation pixel generating means and the pixel values of the pixels on the fields temporally preceding and succeeding the field where the subject pixel exists, the pixels being located at the positions corresponding to the subject pixel;

wherein the amount-of-error calculating means calculates an amount of error based on the inter-field-interpolated-pixel spatial-transition information, the inter-field-interpolated-pixel temporal-transition information, and the intra-field-interpolated-pixel temporal-transition information.

6. An image processing method comprising:

a block-motion-vector detecting step of detecting, by block matching, respective block motion vectors of a block including a subject pixel and a plurality of blocks adjacent to the block including the subject pixel;

a difference calculating step of calculating difference between pixel values of a pixel on a first field and a pixel on a second field, these pixels being used to generate the subject pixel, based on each of the block motion vectors detected in the block-motion-vector detecting step;

a pixel-motion-vector selecting step of selecting, as a pixel motion vector of the subject pixel, one of the block motion vectors that minimizes the difference calculated in the difference calculating step;

an inter-field-interpolation pixel generating step of generating a pixel value of the subject pixel by inter-field interpolation using the pixel on the first field and the pixel on the second field, based on the pixel motion vector selected in the pixel-motion-vector selecting step;

an intra-field-interpolation pixel generating step of generating a pixel value of the subject pixel by intra-field interpolation using pixels vertically or horizontally adjacent to the subject pixel;

an amount-of-error calculating step of calculating an amount of error that occurs, based on the pixel value of the subject pixel generated in the inter-field-interpolation pixel generating step, pixel values of the pixels vertically or horizontally adjacent to the subject pixel, the pixel value of the subject pixel generated in the intra-field-interpolation pixel generating step, and pixel values of pixels on fields temporally preceding and succeeding a field where the subject pixel exists, the pixels being located at positions corresponding to the subject pixel; and a pixel-value determining step of determining a pixel value of the subject pixel based on the amount of error calculated in the amount-of-error calculating step, using the pixel value generated in the intra-field-interpolation pixel generating step and the pixel value generated in the inter-field-interpolation pixel generating step.

7. A recording medium having recorded thereon a computer-readable program for causing a computer to execute an image processing method, the method comprising:

a block-motion-vector detection controlling step of controlling detection, by block matching, of respective block motion vectors of a block including a subject pixel and a plurality of blocks adjacent to the block including the subject pixel;

a difference calculation controlling step of controlling calculation of difference between pixel values of a pixel on a first field and a pixel on a second field, these pixels being used to generate the subject pixel, based on each of the block motion vectors detected in the block-motion-vector detection controlling step;

a pixel-motion-vector selection controlling step of controlling selection, as a pixel motion vector of the subject pixel, one of the block motion vectors that minimizes the difference calculated in the difference calculation controlling step;

an inter-field-interpolation pixel generation controlling step of controlling generation of a pixel value of the subject pixel by inter-field interpolation using the pixel on the first field and the pixel on the second field, based on the pixel motion vector selected in the pixel-motion-vector selection controlling step;

an intra-field-interpolation pixel generation controlling step of controlling generation of a pixel value of the subject pixel by intra-field interpolation using pixels vertically or horizontally adjacent to the subject pixel;

an amount-of-error calculation controlling step of controlling calculation of an amount of error that occurs, based on the pixel value of the subject pixel generated in the inter-field-interpolation pixel generation controlling step, pixel values of the pixels vertically or horizontally adjacent to the subject pixel, the pixel value of the subject pixel generated in the intra-field-interpolation pixel generation controlling step, and pixel values of pixels on fields temporally preceding and succeeding a field where the subject pixel exists, the pixels being located at positions corresponding to the subject pixel; and a pixel-value determination controlling step of controlling determination of a pixel value of the subject pixel based on the amount of error calculated in the amount-of-error calculation controlling step, using the pixel value generated in the intra-field-interpolation pixel generation controlling step and the pixel value generated in the inter-field-interpolation pixel generation controlling step.

8. A program stored in a computer readable medium that allows a computer to execute processing image comprising:

a block-motion-vector detection controlling step of controlling detection, by block matching, of respective block motion vectors of a block including a subject pixel and a plurality of blocks adjacent to the block including the subject pixel;

a difference calculation controlling step of controlling calculation of difference between pixel values of a pixel on a first field and a pixel on a second field, these pixels being used to generate the subject pixel, based on each of the block motion vectors detected in the block-motion-vector detection controlling step;

a pixel-motion-vector selection controlling step of controlling selection, as a pixel motion vector of the subject pixel, one of the block motion vectors that minimizes the difference calculated in the difference calculation controlling step;

an inter-field-interpolation pixel generation controlling step of controlling generation of a pixel value of the subject pixel by inter-field interpolation using the pixel on the first field and the pixel on the second field, based on the pixel motion vector selected in the pixel-motion-vector selection controlling step;

an intra-field-interpolation pixel generation controlling step of controlling generation of a pixel value of the subject pixel by intra-field interpolation using pixels vertically or horizontally adjacent to the subject pixel;

an amount-of-error calculation controlling step of controlling calculation of an amount of error that occurs, based on the pixel value of the subject pixel generated in the inter-field-interpolation pixel generation controlling step, pixel values of the pixels vertically or horizontally adjacent to the subject pixel, the pixel value of the subject pixel generated in the intra-field-interpolation pixel generation controlling step, and pixel values of pixels on fields temporally preceding and succeeding a field where the subject pixel exists, the pixels being located at positions corresponding to the subject pixel; and a pixel-value determination controlling step of controlling determination of a pixel value of the subject pixel based on the amount of error calculated in the amount-of-error calculation controlling step, using the pixel value generated in the intra-field-interpolation pixel generation controlling step and the pixel value generated in the inter-field-interpolation pixel generation controlling step.

9. An image processing apparatus comprising:

a block-motion-vector detecting unit for detecting, by block matching, respective block motion vectors of a block including a subject pixel and a plurality of blocks adjacent to the block including the subject pixel;

a difference calculating unit for calculating difference between pixel values of a pixel on a first field and a pixel on a second field, these pixels being used to generate the subject pixel, based on each of the block motion vectors detected by the block-motion-vector detecting unit;

a pixel-motion-vector selecting unit for selecting, as a pixel motion vector of the subject pixel, one of the block motion vectors that minimizes the difference calculated by the difference calculating unit;

an inter-field-interpolation pixel generating unit for generating a pixel value of the subject pixel by inter-field interpolation using the pixel on the first field and the pixel on the second field, based on the pixel motion vector selected by the pixel-motion-vector selecting unit;

an intra-field-interpolation pixel generating unit for generating a pixel value of the subject pixel by intra-field interpolation using pixels vertically or horizontally adjacent to the subject pixel;

an amount-of-error calculating unit for calculating an amount of error that occurs, based on the pixel value of the subject pixel generated by the inter-field-interpolation pixel generating unit, pixel values of the pixels vertically or horizontally adjacent to the subject pixel, the pixel value of the subject pixel generated by the intra-field-interpolation pixel generating unit, and pixel values of pixels on fields temporally preceding and succeeding a field where the subject pixel exists, the pixels being located at positions corresponding to the subject pixel; and a pixel-value determining unit for determining a pixel value of the subject pixel based on the amount of error calculated by the amount-of-error calculating unit, using the pixel value generated by the intra-field-interpolation pixel generating unit and the pixel value generated by the inter-field-interpolation pixel generating unit.

* * * * *